US012767003B2

(12) United States Patent
Aymon-Demont et al.

(10) Patent No.: US 12,767,003 B2
(45) Date of Patent: Oct. 20, 2026

(54) MULTIFUNCTIONAL ELECTRIC POWER SUPPLY COMPONENT AND SYSTEM, PROPULSION SYSTEM, METHOD FOR CONTROLLING THE SAME, AND ELECTRIC OR HYBRID AIRCRAFT COMPRISING THE COMPONENT AND SYSTEMS

(71) Applicant: H55 SA, Sion (CH)

(72) Inventors: Sébastien Aymon-Demont, Les Agettes (CH); Milan Utvic, Sion (CH)

(73) Assignee: H55 SA (CH)

(*) Notice: Subject to any disclaimer, the term of this patent is extended or adjusted under 35 U.S.C. 154(b) by 0 days.

(21) Appl. No.: 19/301,818

(22) Filed: Aug. 15, 2025

(65) Prior Publication Data

US 2025/0376075 A1 Dec. 11, 2025

Related U.S. Application Data

(63) Continuation of application No. PCT/IB2024/060641, filed on Oct. 29, 2024.

(30) Foreign Application Priority Data

Oct. 30, 2023 (CH) .................................. 1207/2023

(51) Int. Cl.
*B60L 58/18* (2019.01)
*B60L 1/00* (2006.01)
(Continued)

(52) U.S. Cl.
CPC ................. *B60L 58/18* (2019.02); *B60L 1/00* (2013.01); *B64D 27/357* (2024.01); *H02J 4/00* (2013.01);
(Continued)

(58) Field of Classification Search
CPC .......... B60L 58/18; B60L 1/00; B64D 27/357
(Continued)

(56) References Cited

U.S. PATENT DOCUMENTS 10,131,246 B2 11/2018 Demont
10,322,824 B1 6/2019 Demont et al.
(Continued)

FOREIGN PATENT DOCUMENTS

DE 102012203309 A1 9/2013
WO WO 2022/237970 A1 11/2022

OTHER PUBLICATIONS

Channegowda et al., "Megawatt Class Ultra High Density DC-DC Converters for Future Electric Aircraft Systems", AIAA Propulsion and Energy Forum, pp. 1-11 (2019).
(Continued)

*Primary Examiner* — Rexford N Barnie
*Assistant Examiner* — Terrence R Willoughby
(74) *Attorney, Agent, or Firm* — Knobbe, Martens, Olson & Bear, LLP

(57) ABSTRACT

An electrical power supply system for an aircraft comprising: a string of a plurality of connected smart battery modules, wherein the string is configured to provide a common output voltage; wherein each of the smart battery modules comprises, terminals for outputting an output voltage to a device external to the smart battery module; a battery assembly configured to supply a DC voltage between two poles; a power converter electrically connected to the terminals and the poles, and a controller operably coupled to the semiconductor stage and configured to control the semiconductor stage for regulating the voltage conversation of the DC voltage into the output voltage a control unit operably coupled to the controller of each smart battery module and configured to set an output voltage and/or
(Continued)

current setpoint or limit for each controller individually or configured to set an output voltage and/or current setpoint or limit for all controllers collectively.

31 Claims, 34 Drawing Sheets

(51) Int. Cl.
*B64D 27/357* (2024.01)
*H02J 4/00* (2006.01)
(52) U.S. Cl.
CPC ....... *B60L 2200/10* (2013.01); *B64D 2221/00* (2013.01)
(58) Field of Classification Search
USPC .................................................. 307/9.1–10.2
See application file for complete search history.

(56) References Cited

U.S. PATENT DOCUMENTS

| | | | |
|---|---|---|---|
| 10,479,223 | B2 | 11/2019 | Demont |
| 10,576,843 | B2 | 3/2020 | Demont et al. |
| 10,854,866 | B2 | 12/2020 | Demont et al. |
| 11,059,386 | B2 | 7/2021 | Demont et al. |
| 11,063,323 | B2 | 7/2021 | Demont et al. |
| 11,065,979 | B1 | 7/2021 | Demont et al. |
| 11,148,819 | B2 | 10/2021 | Demont et al. |
| 11,456,511 | B2 | 9/2022 | Demont et al. |
| 11,634,231 | B2 | 4/2023 | Demont et al. |
| 11,685,290 | B2 | 6/2023 | Demont |
| 11,697,358 | B2 | 7/2023 | Demont et al. |
| 11,929,516 | B2 | 3/2024 | Demont et al. |
| 11,962,147 | B2 | 4/2024 | Demont et al. |
| 12,246,607 | B2 | 3/2025 | Demont et al. |
| 12,409,756 | B2 | 9/2025 | Demont |
| 2014/0084817 | A1 | 3/2014 | Bhavaraju et al. |
| 2019/0126774 | A1 | 5/2019 | Demont |
| 2020/0231047 | A1 | 7/2020 | Demont |
| 2021/0237615 | A1* | 8/2021 | Long ................ G01R 19/16542 |
| 2022/0393486 | A1* | 12/2022 | Mousavi ................. B60L 58/21 |
| 2022/0396156 | A1 | 12/2022 | Cho |
| 2023/0249563 | A1 | 8/2023 | Demont et al. |
| 2024/0317109 | A1 | 9/2024 | Demont et al. |
| 2026/0034913 | A1 | 2/2026 | Aymon-Demont |

OTHER PUBLICATIONS

International Search Report issued in application No. PCT/IB2024/060641 on Mar. 6, 2025.
Oliveira et al., "A GaN-based DC/DC converter for e-vehicles applications", EPE'20 ECCE Europe, pp. 1-10 (2020).
Search Report issued in Swiss application No. CH12072023 on Apr. 3, 2024.

* cited by examiner

MULTIFUNCTIONAL ELECTRIC POWER SUPPLY COMPONENT AND SYSTEM, PROPULSION SYSTEM, METHOD FOR CONTROLLING THE SAME, AND ELECTRIC OR HYBRID AIRCRAFT COMPRISING THE COMPONENT AND SYSTEMS

CROSS-REFERENCE TO RELATED APPLICATIONS

This application is a continuation of, and claims priority to, International Patent Application No. PCT/IB2024/060641, filed Oct. 29, 2024, which claims priority to Swiss Application No. CH001207/2023, filed on Oct. 30, 2023, each of which are hereby incorporated by reference herein in their entirety.

FIELD

The present disclosure concerns a smart battery module, an electrical power supply system, a propulsion system, and an electric or hybrid aircraft comprising the module, the supply and/or propulsion system. The present disclosure also concerns methods for controlling the smart battery module, electrical supply and propulsion system. The disclosure further concerns a flexibly configurable electrical power supply or propulsion system and the use of the smart battery module or the electrical power supply system.

BACKGROUND

Electric and hybrid vehicles have become increasingly significant for the transportation of people and goods. Such vehicles can desirably provide energy efficiency advantages over combustion-powered vehicles and may cause less air pollution than combustion-powered vehicles during operation.

Although the technology for electric and hybrid automobiles has significantly developed in recent years, many of the innovations that enabled a transition from combustion-powered to electric-powered automobiles unfortunately do not directly apply to the development of electric or hybrid aircraft. The functionality of automobiles and the functionality of aircraft are sufficiently different in many aspects so that many of the design elements for electric and hybrid aircraft must be uniquely developed separate from those of electric and hybrid automobiles.

Moreover, any changes to an aircraft's design, such as to enable electric or hybrid operation, also require careful development and testing to ensure safety and reliability. If an aircraft experiences a serious failure during flight, the potential loss and safety risk from the failure may be very high as the failure could cause a crash of the aircraft and pose a safety or property damage risk to passengers or cargo, as well as individuals or property on the ground.

The certification standards for electric or hybrid aircraft are further extremely stringent because of the risks posed by new aircraft designs. Designers of aircraft have struggled to find ways to meet the certification standards and bring new electric or hybrid aircraft designs to market.

In view of these challenges, attempts to make electric and hybrid aircraft commercially viable have been largely unsuccessful. New approaches for making and operating electric and hybrid aircraft thus continue to be desired.

Flying a manned or unmanned aircraft such an airplane can be dangerous. Problems with the aircraft may result in injury or loss of life for passengers in the aircraft or individuals on the ground, as well as damage to goods being transported by the aircraft or other items around the aircraft.

The reliability of systems can be improved with redundant subsystems. Various designs have been suggested in order to replace a faulty subsystem with a backup subsystem. For example, in the context of electric powered object or vehicles, US20171210229 A1 and US20111254502A1 both describe a fault-tolerant battery management system in which the state of battery cells is monitored and/or controlled by redundant battery management systems (BMS), such that a default in one BMS does not prevent the battery from functioning as long as the redundant BMS performs properly. However, if the two BMS are identical, they are more likely to present the same defaults or conception problems, and are also more likely to have failure simultaneously or at short interval. Moreover, those solutions have not been designed with the aim of certification for aircraft; adding additional components increase the complexity of the system and makes the certification even more difficult.

In order to attempt to mitigate potential problems associated with an aircraft, numerous organisations have developed certification standards for ensuring that aircraft designs and operations satisfy threshold safety requirements. The certification standards may be stringent and onerous when the degree of safety risk is high, and the certification standards may be easier and more flexible when the degree of safety risk is low.

As an example, the FAA advisory circular AC 25.1309-1 describes acceptable means for showing compliance with the airworthiness requirements of US Federal Aviation Regulations defines different levels of failure conditions according to their severity:

- Failure Conditions with No Safety Effect.
- Minor Failure Conditions.
- Major Failure Conditions.
- Hazardous Failure Conditions must be no more frequent than Extremely Remote.
- Catastrophic Failure Conditions must be Extremely Improbable.

While airplanes must be designed so that hazardous and catastrophic failure conditions are extremely remote or even extremely improbable, those severe failure conditions must nevertheless be monitored, so that warning signals are sent to the pilot and driver who may attempt to remedy to the condition or try to land the aircraft. The monitoring and warning systems must be reliable and also requires certification.

Such certification standards have, unfortunately, had the effect of slowing commercial adoption and production of electric or hybrid aircraft. Electrical hybrid aircraft may, for example, utilise new aircraft designs relative to traditional aircraft designs to account for differences in operations of electric or hybrid aircraft versus traditional aircraft. The new designs however may be significantly different from the traditional aircraft designs. These differences may subject the new designs to extensive testing prior to certification. The need for extensive testing can take many resources, time and significantly drive up the ultimate cost of the aircraft.

Compliance of a monitoring and warning subsystem with the certification standard depends on the severity of the monitored failure condition. Therefore, a hazardous or catastrophic failure condition requires a strict level of certification of the corresponding monitoring and warning system, while a minor failure condition or a condition without any safety effect have lower safety requirements and requires a monitoring and warning system that is easier to certify, or requires no certification.

There is therefore a need for simplified, yet robust, components and systems for an electric-powered aircraft that simplify and streamline certification requirements and reduce the cost and time required to produce a commercially viable electric aircraft.

Battery modules, such as those disclosed in WO2022074429A1, have been developed to provide a light-weight and efficient power source for electric or hybrid aircraft, which also exhibit exceptionally high reliability and safety.

However, in order to generate a high supply voltage, it is necessary to connect the battery modules in series, which requires increased wiring and is associated with additional weight and complexity. Extra weight can reduce the range of the aircraft significantly, whereas additional complexity may come with further efforts for production and/or certification. Both are not desirable at all.

In addition, all electrical subsystems connected to the high voltage generated by the series-connected battery modules must be designed to cope with the fluctuating state of charge of the battery modules. In particular, the electrical efficiency of said electrical subsystems may depend on the level of the voltage supplied. To maintain the converted, or supplied power, the input current of the electrical subsystems must be increased when the input voltage decreases. This inevitably leads to additional losses and a decrease in efficiency.

Finally, energy sources featuring in-series connected battery modules have further severe disadvantages, which become apparent in the course of the present disclosure.

SUMMARY

The systems, methods, and devices described herein each have several aspects, no single one of which is solely responsible for its desirable attributes. Without limiting the scope of this disclosure, several non-limiting features will now be discussed briefly.

In some aspects, the techniques described herein relate to an electrical power supply system for an electric or hybrid aircraft including: a string of a plurality in series connected smart battery modules, wherein the string is configured to provide a common output voltage; wherein each of said smart battery modules includes, terminals for outputting an output voltage to a device external to the smart battery module; a battery assembly configured to supply a DC voltage between two poles; a power converter electrically connected to the terminals and the poles, wherein the power converter is configured to convert the DC voltage into the output voltage and is adapted to provide said output voltage to the terminals, wherein a voltage average of the output voltage can be different from a DC voltage level of the DC voltage, and a controller operably coupled to the semiconductor stage and configured to control the semiconductor stage for regulating the voltage conversation of the DC voltage into the output voltage a control unit operably coupled to the controller of each smart battery module and configured to set an output voltage and/or current setpoint or limit for each controller individually or configured to set an output voltage and/or current setpoint or limit for all controllers collectively.

In some aspects, the techniques described herein relate to an electrical power supply system (500, 600, 700, 800, 800', 1500*a,b*, 1501-1504), wherein the common output voltage (VDC*, Vph) corresponds to a sum of output voltages (Vpls) outputted by each smart battery module (300).

In some aspects, the techniques described herein relate to an electrical power supply system (500, 600, 700, 800, 800', 1500*a,b*, 1501-1504), including an inductance (511, 521, 531) connected in series with the string.

In some aspects, the techniques described herein relate to an electrical power supply system (500, 600, 700, 800, 800', 1500*a,b*, 1501-1504) wherein the inductance (511, 521, 531) is provided in the form of a conductor or cable of which a given parasitic inductance and resistance are used to establish a required impedance.

In some aspects, the techniques described herein relate to an electrical power supply system (500, 600, 1500*a,b*, 1501-1504), including a plurality of strings connected in parallel, wherein the parallel connected strings are configured to supply a common output current corresponding to a sum of output currents outputted by each string.

In some aspects, the techniques described herein relate to an electrical power supply system (500, 600, 700, 800, 800', 1500*a,b*, 1501-1504), including a plurality of inductances (511, 521, 531), at least one inductance (511, 521, 531) is connected in series with a corresponding string.

In some aspects, the techniques described herein relate to an electrical power supply system (500, 600, 700, 800, 800', 1500*a,b*, 1501-1504), wherein the control unit (400) is configured to set the output voltage and/or current setpoint or limit to a predetermined fixed value, or the control unit (400) is configured to vary the output voltage and/or current setpoint or limit or setpoints in dependency of a control value provided by a control instance (410) external to the electrical power supply system (500, 600).

In some aspects, the techniques described herein relate to an electrical power supply system (500, 600, 700, 800, 800', 1500*a,b*, 1501-1504), wherein the control unit (400) is configured to provide a synchronisation signal to the controllers (314) of the smart battery modules (300) for synchronising the timing of the consecutive switching cycles of the smart battery modules (300), and/or the control unit (400) is configured to provide a timing setpoint to the controllers (314) of the smart battery modules (300) for varying the timing of each switching cycle with reference to the timing synchronised.

In some aspects, the techniques described herein relate to an electrical power supply system (500, 600, 700, 800, 800', 1500*a,b*, 1501-1504), wherein a control value of the output voltage setpoint and/or current provided by a control instance (410) external to the electrical power supply system (500, 600) is a time-invariant control value.

In some aspects, the techniques described herein relate to an electrical power supply system (500, 600, 700, 800, 800', 1500*a,b*, 1501-1504), wherein the common output voltage (VDC*, Vph) is a DC voltage (VDC*) with a residual periodic variation of the DC voltage level for supplying a DC load external to the electrical power supply system (500, 600,700, 800, 800').

In some aspects, the techniques described herein relate to an electrical power supply system (500, 600, 700, 800, 800', 1500*a,b*, 1501-1504), wherein a control value of the output voltage and/or current setpoint provided by the control instance (410) external to the electrical power supply system (500, 600) is a time-variant control value.

In some aspects, the techniques described herein relate to an electrical power supply system (500, 600, 700, 800, 800', 1500*a,b*, 1501-1504), wherein the common output voltage (VDC*, Vph) is an AC voltage (Vph) for supplying an AC load external to the electrical power supply system (500, 600,700, 800, 800').

In some aspects, the techniques described herein relate to an electrical power supply system (500, 600, 700, 800, 800', 1500*a,b*, 1501-1504), including at least three strings, wherein the strings are commonly connected at one end to form a star point (Sp) and configured to output the AC voltage (Vph) relative to the star point (Sp) at each end different from the one end, wherein the AC voltage (Vph) outputted at each end different from the one end having a mutually different phase.

In some aspects, the techniques described herein relate to the electrical power supply system (500, 600, 700, 800, 800', 1500*a,b*, 1501-1504) wherein the battery assembly (1400) of each respective smart battery module includes a plurality of battery cells (1440) and/or a plurality of ultracapacitors for storing and releasing electrical energy.

In some aspects, the techniques described herein relate to an electrical power supply system (500, 600, 700, 800, 800', 1500*a,b*, 1501-1504) wherein each respective smart battery module includes, at least one battery cell (1440) from the plurality of battery cells (1440) is configured with an energy density preferably greater than 250 Wh/kg, more preferably greater than 350 Wh/kg, most preferably greater than or equal to 450 Wh/kg.

In some aspects, the techniques described herein relate to an electrical power supply system (500, 600, 700, 800, 800', 1500*a,b*, 1501-1504) wherein in each respective smart battery module (300) the power converter (310) is configured to switchably connect one pole of the battery assembly (1400) to one of the terminals (318) for converting the DC voltage (VDC) into the output voltage (Vpls).

In some aspects, the techniques described herein relate to an electrical power supply system (500, 600, 700, 800, 800', 1500*a,b*, 1501-1504) wherein in each respective smart battery module (300) the power converter (310) is configured as a non-isolated DC/DC converter, including an input end arranged with an input filter stage (312), wherein the input end is connected to the poles of the battery assembly (1400) and the power converter (310) includes a semiconductor stage (311) configured to switchably connect the input filter stage (312) to one of the terminals (318).

In some aspects, the techniques described herein relate to an electrical power supply system (500, 600, 700, 800, 800', 1500*a,b*, 1501-1504) wherein in each respective smart battery module (300) the input filter stage (312) includes an inductor connected to one pole of the battery assembly (1400), wherein the semiconductor stage (311) is arranged to switchably connect the inductor to one of the terminals (318).

In some aspects, the techniques described herein relate to an electrical power supply system (500, 600, 700, 800, 800', 1500*a,b*, 1501-1504) wherein in each respective smart battery module (300) the semiconductor stage (311) includes a first Gallium Nitride (GaN) power semiconductor switch arranged to switchably connect the input filter stage (312) to one of the terminals (318).

In some aspects, the techniques described herein relate to an electrical power supply system (500, 600, 700, 800, 800', 1500*a,b*, 1501-1504) wherein in each respective smart battery module (300) the power converter (310) includes an output end connected to the terminals (318), wherein the power converter (310) includes an electrical bypass circuit (313) configured to short-circuit the terminals (318).

In some aspects, the techniques described herein relate to an electrical power supply system (500, 600, 700, 800, 800', 1500*a,b*, 1501-1504) wherein the electrical bypass circuit includes a switch (313) and/or a second GaN power semiconductor switch, interconnected between the terminals (318).

In some aspects, the techniques described herein relate to an electrical power supply system (500, 600, 700, 800, 800', 1500*a,b*, 1501-1504) 17-21, wherein the controller (314) of each respective smart battery module (300) is configured to control a duty cycle of the first GaN power semiconductor switch, and preferably of the second GaN power semiconductor switch, in dependency of a setpoint provided by a control unit (400) external to the smart battery module (300) for regulating the output voltage (Vpls).

In some aspects, the techniques described herein relate to an electrical power supply system (500, 600, 700, 800, 800', 1500*a,b*, 1501-1504), wherein the controller (314) is configured to operate the first GaN power semiconductor switch in consecutive switching cycles, wherein the controller (314) is adapted to synchronise the timing of each switching cycle in dependency of a synchronisation signal provided by a synchronisation unit external to the smart battery module (300).

In some aspects, the techniques described herein relate to an electrical power supply system (500, 600, 700, 800, 800', 1500*a,b*, 1501-1504), wherein the period of the consecutive switching cycles being preferably smaller than 10 μs, more preferably smaller than 5 μs, most preferably smaller than or equal to 4 μs.

In some aspects, the techniques described herein relate to an electrical power supply system (500, 600, 700, 800, 800', 1500*a,b*, 1501-1504), wherein the controller of each respective smart battery module (300) is arranged to vary the timing of each switching cycle in dependency on a timing setpoint provided by the unit external to the smart battery module (300).

In some aspects, the techniques described herein relate to an electrical power supply system (500, 600, 700, 800, 800', 1500*a,b*, 1501-1504), wherein varying includes delaying the timing of each switching cycle with reference to the timing synchronised.

In some aspects, the techniques described herein relate to an electrical power supply system (500, 600, 700, 800, 800', 1500*a,b*, 1501-1504) 22-26, wherein, the controller (314) of each respective smart battery module (300) is arranged to control the switch (313) and/or the second GaN power semiconductor switch from a non-conductive state into a conductive state in response of a failure condition detectable by the controller (314) in the smart battery module (300).

In some aspects, the techniques described herein relate to an electrical power supply system (500, 600, 700, 800, 800', 1500*a,b*, 1501-1504) wherein the output voltage (Vpls) of each respective smart battery module (300) is provided in the form of a pulsed DC voltage (Vpls).

In some aspects, the techniques described herein relate to the electrical supply system (500, 600, 1500*a,b*, 1501-1504) urther including a by-pass switch (313) for each of the respective smart battery modules (300) in the string (510), wherein each respective by-pass switch (313) may be selectively closed to by-pass a smart battery module (300).

In some aspects, the techniques described herein relate to an electrical supply system (500, 600, 700, 800, 800', 1500*a,b*, 1501-1504) wherein the respective controller (314) of each smart battery module in the string (510) is configured to detect a fault the respective smart battery module (300) and in response to detecting a fault will close the by-pass switch (313) corresponding to that faulty smart batter module (300), so that faulty smart battery module (300) is by-passed, or the control unit (400), is configured to detect a fault in a smart battery modules (300) in the string (510) and in response to detecting a fault in one of the smart battery modules (300) and in response to detecting a fault will close the by-pass switch (313) corresponding to that faulty smart batter module (300), so that faulty smart battery module (300) is by-passed.

In some aspects, the techniques described herein relate to an electrical supply system (500, 600, 700, 800, 800', 1500*a,b*, 1501-1504) wherein the control unit (400) is further configured to send a modified voltage setpoint to the other smart battery modules (300) in the string (510) which maintains the total voltage/string current at the output at the level prior to the fault occurring.

In some aspects, the techniques described herein relate to an electrical supply system (500, 600, 700, 800, 800', 1500*a,b*, 1501-1504), wherein the respective controller (314) of each smart battery module in the string (510) is configured to detect a state of health of the respective smart battery module (300), or the control unit (400), is configured to detect a state of health of each smart battery module (300) in the string (510).

In some aspects, the techniques described herein relate to an electrical supply system (500, 600, 700, 800, 800', 1500*a,b*, 1501-1504) wherein the controllers (314) the smart battery modules are configured to operate the smart battery modules (300) which have a higher state of health to provide a higher voltage at their respective output terminals, than the smart battery modules (300) that have a lower state of health, so that the voltage provided by the smart battery modules (300) which have a higher state of health at least partially compensates the lower voltage provide by the smart battery modules (300) that have a lower state of health; or wherein the control unit 400 is configured to operate the smart battery modules (300) which have a higher state of health to provide a higher voltage at their respective output terminals, than the smart battery modules (300) that have a lower state of health, so that the voltage provided by the smart battery modules (300) which have a higher state of health at least partially compensates the lower voltage provide by the smart battery modules (300) that have a lower state of health.

In some aspects, the techniques described herein relate to an electrical supply system (500, 600, 700, 800, 800', 1500*a,b*, 1501-1504) wherein the controllers (314) the smart battery modules are configured to set the output voltage of the smart battery modules (300) that have a low state of health to zero, and operate the smart battery modules (300) which have a higher state of health to provide a higher voltage at their respective output terminals to at least partially compensate for the smart battery modules whose output have been set to zero, or wherein the control unit 400 is configured to set the output voltage of the smart battery modules (300) that have a low state of health to zero, and operate the smart battery modules (300) which have a higher state of health to provide a higher voltage at their respective output terminals to at least partially compensate for the smart battery modules whose output have been set to zero.

In some aspects, the techniques described herein relate to an electrical supply system (500, 600, 700, 800, 800', 1500*a,b*, 1501-1504), wherein the control unit (400) is configured to further detect when a smart battery module (300) in the string (510) is fully charged, and to selectively stop further charging of a detected fully charged battery module without stopping the further charging of the other battery modules in the string (510) which have not yet been fully charged.

In some aspects, the techniques described herein relate to an electrical supply system (500, 600, 700, 800, 800', 1500*a,b*, 1501-1504), wherein each of the respective controllers (314) of the smart battery modules is configured to redistribute any surplus of power of its respective smart battery module (300) to one or more other smart battery modules in the string (510); or wherein the control unit (400) is configured to redistribute any surplus of power of one or more individual smart battery modules (300) in the string (510) to the other smart battery modules (300) in the string (510).

In some aspects, the techniques described herein relate to an electrical supply system (500, 600, 700, 800, 800', 1500*a,b*, 1501-1504), wherein each of the respective controllers (314) of the smart battery modules is configured to control the output voltage of its respective smart battery module so that the output voltage of the string (510) is independent of the state of charge of the smart battery modules (300) in the string (510), or the control unit (400) is configured to control the output voltage of the string (510) independently of the state of charge of the smart battery modules (300) in the string (510).

In some aspects, the techniques described herein relate to an electrical supply system (500, 600, 700, 800, 800', 1500*a,b*, 1501-1504), wherein each of the respective controllers (314) of the smart battery modules is configured to carry out real-time health monitoring of its respective smart battery module (300) in the string (510), or the control unit (400) is configured to carry out real-time health monitoring of each of the smart battery modules (300) in the string (510).

In some aspects, the techniques described herein relate to an electrical supply system (500, 600, 700, 800, 800', 1500*a,b*, 1501-1504), wherein each of the respective controllers (314) of the smart battery modules is configured to operate its smart battery modules (300) to output a voltage which is proportional to the state of health of that smart battery module (300); or the control unit (400) is configured to operate each of the smart battery modules (300) to output a volage which is proportional to the state of health of that smart battery module (300).

In some aspects, the techniques described herein relate to an electrical supply system (500, 600, 700, 800, 800', 1500*a,b*, 1501-1504), wherein the string (510) of smart battery modules (300) is directly connected to a motor so that the string (510) supplies a motor phase directly from the smart battery modules, without an inverter.

In some aspects, the techniques described herein relate to an electrical supply system (500, 600, 700, 800, 800', 1500*a,b*, 1501-1504), wherein the control unit (400) is configured to selectively operate the string (510) of smart battery modules (300) to generate a voltage containing two AC frequency components.

In some aspects, the techniques described herein relate to an electrical supply system (500, 600, 700, 800, 800', 1500*a,b*, 1501-1504), wherein the control unit (400) is configured to selectively disable any one or more of the smart battery modules (300) in the string 510.

In some aspects, the techniques described herein relate to a propulsion system (600, 700, 800) for an electric or hybrid aircraft (100) including: —the electrical power supply system (500, 600, 700, 800, 800', 1500*a,b*, 1501-1504) 1 to 42 and a DC load connected to the electrical power supply system (500, 600); or —the electrical power supply system (500, 600, 700, 800, 800', 1500*a,b*, 1501-1504) 1 to 42 and an AC load connected to the electrical power supply system (500, 600); or —at least one three-phase AC load, a three-phase AC source, and the electrical power supply system (500, 600, 700, 800, 800', 1500*a,b*, 1501-1504), wherein the electrical power supply system (500, 600, 700, 800, 800', 1500*a,b*, 1501-1504) is arranged to interconnect the three-phase AC load with the three-phase AC source for converting electrical energy supplied by the AC source into electrical energy receivable by the three-phase AC load.

In some aspects, the techniques described herein relate to a propulsion system (600, 700, 800), when including the electrical power supply system (500, 600, 700, 800, 800', 1500*a,b*, 1501-1504), the DC load including at least one motor controller (93) provided with a DC link circuit.

In some aspects, the techniques described herein relate to a propulsion system (600, 700, 800), when including the electrical power supply system (500, 600, 700, 800, 800', 1500*a,b*, 1501-1504), the AC load including at least one electric motor (94).

In some aspects, the techniques described herein relate to a propulsion system (600, 700, 800), wherein the electric motor (94) is configured as a single-phase or three-phase AC motor.

In some aspects, the techniques described herein relate to a propulsion system (600, 700, 800), wherein the single-phase or three-phase AC motor is configured with a stator, wherein the stator includes a set of main stator windings and a set of auxiliary stator windings.

In some aspects, the techniques described herein relate to a propulsion system (600, 700, 800), when including the electrical power supply system (500, 600, 700, 800, 800', 1500*a,b*, 1501-1504), wherein the three-phase AC source is configured as an electric generator (EG) and the at least one three-phase AC load is configured as a three-phase AC motor.

In some aspects, the techniques described herein relate to a propulsion system (600, 700, 800), wherein the electrical power supply system (500, 600, 700, 800, 800', 1500*a,b*, 1501-1504) is configured to convert the AC voltage supplied by the electric generator (EG) into an AC voltage with a different amplitude and/or frequency for supplying the at least one three-phase AC motor with a variable AC voltage having a time-variant voltage and/or frequency.

In some aspects, the techniques described herein relate to a smart battery module (300) for an electric or hybrid aircraft (100) including: —terminals (318) for outputting an output voltage (Vpls) to a device external to the smart battery module (300); —a battery assembly (1400) configured to supply a DC voltage (VDC) between two poles; —a power converter (310) electrically connected to the terminals (318) and the poles, wherein the power converter (310) is configured to convert the DC voltage (VDC) into the output voltage (Vpls) and is adapted to provide said output voltage (Vpls) to the terminals (318), wherein a voltage average of the output voltage (Vpls) is different from a DC voltage level of the DC voltage (VDC), wherein the power converter (310) is configured as a non-isolated DC/DC converter, including an input end arranged with an input filter stage (312), wherein the input end is connected to the poles of the battery assembly (1400) and the power converter (310) includes a semiconductor stage (311) which includes a first Gallium Nitride (GaN) power semiconductor switch arranged to switchably connect the input filter stage (312) to one of the terminals (318).

In some aspects, the techniques described herein relate to a smart battery module (300), the battery assembly (1400) including a plurality of battery cells (1440) and/or a plurality of ultracapacitors for storing and releasing electrical energy.

In some aspects, the techniques described herein relate to a smart battery module (300), at least one battery cell (1440) from the plurality of battery cells (1440) is configured with an energy density preferably greater than 250 Wh/kg, more preferably greater than 350 Wh/kg, most preferably greater than or equal to 450 Wh/kg.

In some aspects, the techniques described herein relate to a smart battery module (300) 50 to 52, the power converter (310) is configured to switchably connect one pole of the battery assembly (1400) to one of the terminals (318) for converting the DC voltage (VDC) into the output voltage (Vpls).

In some aspects, the techniques described herein relate to a smart battery module (300), the input filter stage (312) including an inductor connected to one pole of the battery assembly (1400), wherein the semiconductor stage (311) is arranged to switchably connect the inductor to one of the terminals (318).

In some aspects, the techniques described herein relate to a smart battery module (300) 50 to 54, the power converter (310) including an output end connected to the terminals (318), wherein the power converter (310) includes an electrical bypass circuit (313) configured to short-circuit the terminals (318).

In some aspects, the techniques described herein relate to a smart battery module (300), the electrical bypass circuit (313) includes a switch (313) and/or a second GaN power semiconductor switch, interconnected between the terminals (318).

In some aspects, the techniques described herein relate to a smart battery module (300), the electrical bypass circuit is included in the semiconductor stage (311).

In some aspects, the techniques described herein relate to a smart battery module (300) 50 to 58, including a controller (314) operably coupled to the semiconductor stage (311) and configured to control the semiconductor stage (311) for regulating the voltage conversion of the DC voltage (VDC) into the output voltage (Vpls).

In some aspects, the techniques described herein relate to a smart battery module (300), the controller (314) is configured to control a duty cycle of the first GaN power semiconductor switch, and preferably of the second GaN power semiconductor switch, in dependency of a setpoint provided by a control unit (400) external to the smart battery module (300) for regulating the output voltage (Vpls).

In some aspects, the techniques described herein relate to a smart battery module (300), the controller (314) is configured to operate the first GaN power semiconductor switch in consecutive switching cycles, wherein the controller (314) is adapted to synchronise the timing of each switching cycle in dependency of a synchronisation signal provided by a synchronisation unit external to the smart battery module (300).

In some aspects, the techniques described herein relate to a smart battery module (300), wherein the period of the consecutive switching cycles being preferably smaller than 10 μs, more preferably smaller than 5 μs, most preferably smaller than or equal to 4 μs.

In some aspects, the techniques described herein relate to a smart battery module (300), wherein the controller is arranged to vary the timing of each switching cycle in dependency on a timing setpoint provided by the unit external to the smart battery module (300).

In some aspects, the techniques described herein relate to a smart battery module (300), wherein varying includes delaying the timing of each switching cycle with reference to the timing synchronised.

In some aspects, the techniques described herein relate to a smart battery module (300), the controller (314) is arranged to control the switch (313) and/or the second GaN power semiconductor switch from a non-conductive state into a conductive state in response of a failure condition detectable by the controller (314) in the smart battery module (300).

In some aspects, the techniques described herein relate to a smart battery module (300), the output voltage (Vpls) is provided in the form of a pulsed DC voltage (Vpls).

In some aspects, the techniques described herein relate to electric or hybrid aircraft (100) including: —at least one smart battery module (300) 50 to 65, or —the electrical power supply system (500, 600, 1500*a,b*, 1501-1504) 1 to 42; or —a propulsion system (600, 700, 800) 43 to 49.

In some aspects, the techniques described herein relate to method for operating an electrical power supply system (500, 600, 1500*a,b*, 1501-1504) 1 to 42, including the step of: —transmitting a common setpoint or a plurality of individual setpoints to each controller (314) included in a plurality of smart battery modules (300) for providing common output voltage (VDC*, Vph).

In some aspects, the techniques described herein relate to a method, further including the step of: —transmitting a synchronisation signal to each controller (314) for synchronising the timing of each switching cycle of the plurality of smart battery modules (300).

In some aspects, the techniques described herein relate to a method, further including the step of: —transmitting a timing setpoint to each controller (314) for varying the timing of each switching cycle of the plurality of smart battery modules (300).

In some aspects, the techniques described herein relate to a method, further including the steps of: —determining one timing setpoint for each controller (314); —transmitting the time setpoint determined for each controller (314) to the respective controller (314).

In some aspects, the techniques described herein relate to a method 67 to 70, including the steps of: —setting the common setpoint or the plurality of individual setpoints to a time-invariant control value; or —varying a control value of the common setpoint or the plurality of individual setpoints over time.

In some aspects, the techniques described herein relate to a method, including the steps of: —receiving a notification on the detection of a failure from a smart battery module (300); —determining a new control value or values; —varying the control value of the common setpoint or the plurality of individual setpoints over time using the new control value or values.

In some aspects, the techniques described herein relate to method for operating a propulsion system (600, 700, 800) 67 to 72, including the steps of: —determining a common setpoint or a plurality of individual setpoints; —transmitting said setpoint or setpoints to the respective controller (314) included in a plurality of smart battery modules (300).

In some aspects, the techniques described herein relate to method, including the steps of: —setting the common setpoint or the plurality of individual setpoints to a time-invariant control value if a DC load is connected to the propulsion system (600, 700, 800); or —varying a control value of the common setpoint or the plurality of individual setpoints over time if an AC load and/or an AC source is connected to the propulsion system (600, 700, 800).

In some aspects, the techniques described herein relate to method, wherein said setpoint or setpoints are determined in dependency on a control value provided by a control instance (410) external to the propulsion system (600, 700, 800).

In some aspects, the techniques described herein relate to method for controlling a voltage average 50 to 65, including the steps of: —receiving a setpoint from a unit external to the smart battery module (300); —converting the DC voltage (VDC) into the output voltage (Vpls); —controlling the voltage average of the output voltage (Vpls) in dependency on the setpoint.

In some aspects, the techniques described herein relate to a method, further including the steps of: —receiving a synchronisation signal from the unit external to the smart battery module (300); —synchronising a timing of consecutive switching cycles in dependency of a synchronisation signal; —operating a first and preferably a second GaN power semiconductor switch based on the synchronised timing.

In some aspects, the techniques described herein relate to a method, further including the steps of: —receiving a timing setpoint from the unit external to the smart battery module (300); —varying the timing of consecutive switching cycles based on timing setpoint.

In some aspects, the techniques described herein relate to a method 76 to 78, further including the steps of: —detecting a failure in the smart battery module (300); —controlling a switch (313) and/or a second GaN power semiconductor switch from a non-conductive state into a conductive state-notifying the unit external to the smart battery module (300) on the detection of the failure.

In some aspects, the techniques described herein relate to flexibly configurable electrical power supply (500, 600, 1500*a,b*, 1501-1504) or propulsion system (600, 700, 800) including: —an electrical power supply (500, 600, 700, 800, 800', 1500*a,b*, 1501-1504) 1 to 42; or a propulsion system (600, 700, 800) 43 to 49, wherein a waveform of an output voltage (VDC*, Vph) supplied to a load connected to the electrical power supply (500, 600, 1500*a,b*, 1501-1504) or propulsion system (600, 700, 800) is configurable by reconfiguring at least one control parameter in the controller or is exclusively dependent on the control of the common setpoint or the plurality of individual setpoints and a timing setpoint.

In some aspects, the techniques described herein relate to use 50 to 65, in replacement of a battery module (1400) or a battery pack (1500A) configured to output an uncontrolled DC output voltage.

In some aspects, the techniques described herein relate to use 1 to 42 in replacement of a DC to DC, DC to AC, AC to AC converter or motor controller (94), each configured with an intermediate DC link.

In some aspects, the techniques described herein relate to a propulsion system (600, 700, 800) for an electric or hybrid aircraft (100) including: —at least one three-phase AC load, a high-voltage DC source, and the electrical power supply system (500, 600, 700, 800, 800', 1500*a,b*, 1501-1504) from any 1 to 42 wherein the electrical power supply system (500, 600, 700, 800, 800', 1500*a,b*, 1501-1504) is arranged to interconnect the three-phase AC load with the DC source for converting electrical energy supplied by the DC source into electrical energy receivable by the three-phase AC load.

In some aspects, the techniques described herein relate to a propulsion system (600, 700, 800) for an electric or hybrid aircraft (100) including: at least one three-phase AC source, a high-voltage DC load, and the electrical power supply system (500, 600, 700, 800, 800', 1500*a,b*, 1501-1504) from any 1 to 42, wherein the electrical power supply system (500, 600, 1500*a,b*, 700, 800, 800', 1501-1504) is arranged to interconnect the three-phase AC source with the DC load for converting electrical energy supplied by the AC source into electrical energy receivable by DC load.

In some aspects, the techniques described herein relate to an electrical power supply system for an electric or hybrid aircraft including: a string of a plurality in series connected smart battery modules, wherein the string is configured to provide a common output voltage; wherein each of said smart battery modules includes, terminals for outputting an output voltage to a device external to the smart battery module; a battery assembly configured to supply a DC voltage between two poles; a power converter electrically connected to the terminals and the poles, wherein the power converter is configured to convert the DC voltage into the output voltage and is adapted to provide said output voltage to the terminals, wherein a voltage average of the output voltage can be different from a DC voltage level of the DC voltage, and a controller operably coupled to a semiconductor stage and configured to control the semiconductor stage for regulating voltage conversation of the DC voltage into the output voltage; and a control unit operably coupled to the controller of each smart battery module and configured to set an output voltage and/or current setpoint or limit for each controller individually or configured to set an output voltage and/or current setpoint or limit for all controllers collectively, the respective controllers of the smart battery modules is configured to carry out real-time monitoring of a state of its respective smart battery module in the string.

In some aspects, the techniques described herein relate to an electrical power supply system, wherein the common output voltage corresponds to a sum of output voltages outputted by each smart battery module.

In some aspects, the techniques described herein relate to an electrical power supply system, including an inductance connected in series with the string.

In some aspects, the techniques described herein relate to an electrical power supply system wherein the inductance is provided as a conductor or cable of which a given parasitic inductance and resistance are used to establish a required impedance.

In some aspects, the techniques described herein relate to an electrical power supply system, including a plurality of strings connected in parallel, wherein the parallel connected strings are configured to supply a common output current corresponding to a sum of output currents outputted by each string.

In some aspects, the techniques described herein relate to an electrical power supply system, including a plurality of inductances, at least one inductance is connected in series with a corresponding string.

In some aspects, the techniques described herein relate to an electrical power supply system, wherein the control unit is configured to set the output voltage and/or current setpoint or limit to a predetermined fixed value, or the control unit is configured to vary the output voltage and/or current setpoint or limit or setpoints in dependency of a control value provided by a control instance external to the electrical power supply system.

In some aspects, the techniques described herein relate to an electrical power supply system, wherein the control unit is configured to provide a synchronisation signal to the controllers of the smart battery modules for synchronising timing of consecutive switching cycles of the smart battery modules, and/or the control unit is configured to provide a timing setpoint to the controllers of the smart battery modules for varying the timing of each switching cycle with reference to the timing synchronised.

In some aspects, the techniques described herein relate to an electrical power supply system, wherein a control value of the output voltage setpoint and/or current provided by a control instance external to the electrical power supply system is a time-invariant control value.

In some aspects, the techniques described herein relate to an electrical power supply system, wherein the common output voltage is a DC voltage with a residual periodic variation of the DC voltage level for supplying a DC load external to the electrical power supply system.

In some aspects, the techniques described herein relate to an electrical power supply system, wherein a control value of the output voltage and/or current setpoint provided by a control instance external to the electrical power supply system is a time-variant control value.

In some aspects, the techniques described herein relate to an electrical power supply system, wherein the common output voltage is an AC voltage for supplying an AC load external to the electrical power supply system.

In some aspects, the techniques described herein relate to an electrical power supply system, including at least three strings, wherein the strings are commonly connected at one end to form a star point and configured to output the AC voltage relative to the star point at each end different from the one end, wherein the AC voltage outputted at each end different from the one end having a mutually different phase.

In some aspects, the techniques described herein relate to an electrical power supply system, wherein the battery assembly of each respective smart battery module includes a plurality of battery cells and/or a plurality of ultracapacitors for storing and releasing electrical energy.

In some aspects, the techniques described herein relate to an electrical power supply system, wherein each respective smart battery module includes, at least one battery cell from the plurality of battery cells is configured with an energy density preferably greater than 250 Wh/kg, more preferably greater than 350 Wh/kg, most preferably greater than or equal to 450 Wh/kg.

In some aspects, the techniques described herein relate to an electrical power supply system, wherein in each respective smart battery module the power converter is configured to switchably connect one pole of the battery assembly to one of the terminals for converting the DC voltage into the output voltage.

In some aspects, the techniques described herein relate to an electrical power supply system, wherein in each respective smart battery module the power converter is configured as a non-isolated DC/DC converter, including an input end arranged with an input filter stage, wherein the input end is connected to the poles of the battery assembly and the power converter includes a semiconductor stage configured to switchably connect the input filter stage to one of the terminals.

In some aspects, the techniques described herein relate to an electrical power supply system, wherein in each respective smart battery module the input filter stage includes an inductor connected to one pole of the battery assembly, wherein the semiconductor stage is arranged to switchably connect the inductor to one of the terminals.

In some aspects, the techniques described herein relate to an electrical power supply system, wherein in each respective smart battery module the semiconductor stage includes a first Gallium Nitride (GaN) power semiconductor switch arranged to switchably connect the input filter stage to one of the terminals.

In some aspects, the techniques described herein relate to an electrical power supply system, wherein in each respective smart battery module the power converter includes an output end connected to the terminals, wherein the power converter includes an electrical bypass circuit configured to short-circuit the terminals. 21.

In some aspects, the techniques described herein relate to an electrical power supply system (500, 600, 700, 800, 800', 1500*a,b*, 1501-1504) wherein the electrical bypass circuit includes a switch (313) and/or a second GaN power semiconductor switch, interconnected between the terminals (318).

In some aspects, the techniques described herein relate to an electrical power supply system (500, 600, 700, 800, 800', 1500*a,b*, 1501-1504) 17-21, wherein the controller (314) of each respective smart battery module (300) is configured to control a duty cycle of the first GaN power semiconductor switch, and preferably of the second GaN power semiconductor switch, in dependency of a setpoint provided by a control unit (400) external to the smart battery module (300) for regulating the output voltage (Vpls).

In some aspects, the techniques described herein relate to an electrical power supply system (500, 600, 700, 800, 800', 1500*a,b*, 1501-1504), wherein the controller (314) is configured to operate the first GaN power semiconductor switch in consecutive switching cycles, wherein the controller (314) is adapted to synchronise the timing of each switching cycle in dependency of a synchronisation signal provided by a synchronisation unit external to the smart battery module (300).

In some aspects, the techniques described herein relate to an electrical power supply system (500, 600, 700, 800, 800', 1500*a,b*, 1501-1504), wherein the period of the consecutive switching cycles being preferably smaller than 10 μs, more preferably smaller than 5 μs, most preferably smaller than or equal to 4 μs.

In some aspects, the techniques described herein relate to an electrical power supply system (500, 600, 700, 800, 800', 1500*a,b*, 1501-1504), wherein the controller of each respective smart battery module (300) is arranged to vary the timing of each switching cycle in dependency on a timing setpoint provided by the unit external to the smart battery module (300).

In some aspects, the techniques described herein relate to an electrical power supply system (500, 600, 700, 800, 800', 1500*a,b*, 1501-1504), wherein varying includes delaying the timing of each switching cycle with reference to the timing synchronised.

In some aspects, the techniques described herein relate to an electrical power supply system (500, 600, 700, 800, 800', 1500*a,b*, 1501-1504) 22-26, wherein, the controller (314) of each respective smart battery module (300) is arranged to control the switch (313) and/or the second GaN power semiconductor switch from a non-conductive state into a conductive state in response of a failure condition detectable by the controller (314) in the smart battery module (300).

In some aspects, the techniques described herein relate to an electrical power supply system (500, 600, 700, 800, 800', 1500*a,b*, 1501-1504) wherein the output voltage (Vpls) of each respective smart battery module (300) is provided in the form of a pulsed DC voltage (Vpls).

In some aspects, the techniques described herein relate to the electrical supply system (500, 600, 1500*a,b*, 1501-1504) further including a by-pass switch (313) for each of the respective smart battery modules (300) in the string (510), wherein each respective by-pass switch (313) may be selectively closed to by-pass a smart battery module (300).

In some aspects, the techniques described herein relate to an electrical supply system (500, 600, 700, 800, 800', 1500*a,b*, 1501-1504) wherein the respective controller (314) of each smart battery module in the string (510) is configured to detect a fault the respective smart battery module (300) and in response to detecting a fault will close the by-pass switch (313) corresponding to that faulty smart batter module (300), so that faulty smart battery module (300) is by-passed, or the control unit (400), is configured to detect a fault in a smart battery modules (300) in the string (510) and in response to detecting a fault in one of the smart battery modules (300) and in response to detecting a fault will close the by-pass switch (313) corresponding to that faulty smart batter module (300), so that faulty smart battery module (300) is by-passed.

In some aspects, the techniques described herein relate to an electrical supply system (500, 600, 700, 800, 800', 1500*a,b*, 1501-1504) wherein the control unit (400) is further configured to send a modified voltage setpoint to the other smart battery modules (300) in the string (510) which maintains the total voltage/string current at the output at the level prior to the fault occurring.

In some aspects, the techniques described herein relate to an electrical supply system (500, 600, 700, 800, 800', 1500*a,b*, 1501-1504), wherein the respective controller (314) of each smart battery module in the string (510) is configured to detect a state of health of the respective smart battery module (300), or the control unit (400), is configured to detect a state of health of each smart battery module (300) in the string (510).

In some aspects, the techniques described herein relate to an electrical supply system (500, 600, 700, 800, 800', 1500*a,b*, 1501-1504) wherein the controllers (314) the smart battery modules are configured to operate the smart battery modules (300) which have a higher state of health to provide a higher voltage at their respective output terminals, than the smart battery modules (300) that have a lower state of health, so that the voltage provided by the smart battery modules (300) which have a higher state of health at least partially compensates the lower voltage provide by the smart battery modules (300) that have a lower state of health; or wherein the control unit 400 is configured to operate the smart battery modules (300) which have a higher state of health to provide a higher voltage at their respective output terminals, than the smart battery modules (300) that have a lower state of health, so that the voltage provided by the smart battery modules (300) which have a higher state of health at least partially compensates the lower voltage provide by the smart battery modules (300) that have a lower state of health.

In some aspects, the techniques described herein relate to an electrical supply system (500, 600, 700, 800, 800', 1500*a,b*, 1501-1504) wherein the controllers (314) the smart battery modules are configured to set the output voltage of the smart battery modules (300) that have a low state of health to zero, and operate the smart battery modules (300) which have a higher state of health to provide a higher voltage at their respective output terminals to at least partially compensate for the smart battery modules whose output have been set to zero, or wherein the control unit 400 is configured to set the output voltage of the smart battery modules (300) that have a low state of health to zero, and operate the smart battery modules (300) which have a higher state of health to provide a higher voltage at their respective output terminals to at least partially compensate for the smart battery modules whose output have been set to zero.

In some aspects, the techniques described herein relate to an electrical supply system (500, 600, 700, 800, 800', 1500*a,b*, 1501-1504), wherein the control unit (400) is configured to further detect when a smart battery module (300) in the string (510) is fully charged, and to selectively stop further charging of a detected fully charged battery module without stopping the further charging of the other battery modules in the string (510) which have not yet been fully charged.

In some aspects, the techniques described herein relate to an electrical supply system (500, 600, 700, 800, 800', 1500*a,b*, 1501-1504), wherein each of the respective controllers (314) of the smart battery modules is configured to redistribute any surplus of power of its respective smart battery module (300) to one or more other smart battery modules in the string (510); or wherein the control unit (400) is configured to redistribute any surplus of power of one or more individual smart battery modules (300) in the string (510) to the other smart battery modules (300) in the string (510).

In some aspects, the techniques described herein relate to an electrical supply system (500, 600, 700, 800, 800', 1500*a,b*, 1501-1504), wherein each of the respective controllers (314) of the smart battery modules is configured to control the output voltage of its respective smart battery module so that the output voltage of the string (510) is independent of the state of charge of the smart battery modules (300) in the string (510), or the control unit (400) is configured to control the output voltage of the string (510) independently of the state of charge of the smart battery modules (300) in the string (510).

In some aspects, the techniques described herein relate to an electrical supply system (500, 600, 700, 800, 800', 1500*a,b*, 1501-1504), wherein each of the respective controllers (314) of the smart battery modules is configured to carry out real-time health monitoring of its respective smart battery module (300) in the string (510), or the control unit (400) is configured to carry out real-time health monitoring of each of the smart battery modules (300) in the string (510).

In some aspects, the techniques described herein relate to an electrical supply system (500, 600, 700, 800, 800', 1500*a,b*, 1501-1504), wherein each of the respective controllers (314) of the smart battery modules is configured to operate its smart battery modules (300) to output a voltage which is proportional to the state of health of that smart battery module (300); or the control unit (400) is configured to operate each of the smart battery modules (300) to output a volage which is proportional to the state of health of that smart battery module (300).

In some aspects, the techniques described herein relate to an electrical supply system (500, 600, 700, 800, 800', 1500*a,b*, 1501-1504), wherein the string (510) of smart battery modules (300) is directly connected to a motor so that the string (510) supplies a motor phase directly from the smart battery modules, without an inverter.

In some aspects, the techniques described herein relate to an electrical supply system (500, 600, 700, 800, 800', 1500*a,b*, 1501-1504), wherein the control unit (400) is configured to selectively operate the string (510) of smart battery modules (300) to generate a voltage containing two AC frequency components.

In some aspects, the techniques described herein relate to an electrical supply system (500, 600, 700, 800, 800', 1500*a,b*, 1501-1504), wherein the control unit (400) is configured to selectively disable any one or more of the smart battery modules (300) in the string 510.

In some aspects, the techniques described herein relate to a propulsion system (600, 700, 800) for an electric or hybrid aircraft (100) including: —the electrical power supply system (500, 600, 700, 800, 800', 1500*a,b*, 1501-1504) 1 to 42 and a DC load connected to the 800, 800', 1500*a,b*, 1501-1504) 1 to 42 and an AC load connected to the electrical power supply system (500, 600); or —at least one three-phase AC load, a three-phase AC source, and the electrical power supply system (500, 600, 700, 800, 800', 1500*a,b*, 1501-1504), wherein the electrical power supply system (500, 600, 700, 800, 800', 1500*a,b*, 1501-1504) is arranged to interconnect the three-phase AC load with the three-phase AC source for converting electrical energy supplied by the AC source into electrical energy receivable by the three-phase AC load.

In some aspects, the techniques described herein relate to a propulsion system (600, 700, 800), when including the electrical power supply system (500, 600, 700, 800, 800', 1500*a,b*, 1501-1504), the DC load including at least one motor controller (93) provided with a DC link circuit.

In some aspects, the techniques described herein relate to a propulsion system (600, 700, 800), when including the electrical power supply system (500, 600, 700, 800, 800', 1500*a,b*, 1501-1504), the AC load including at least one electric motor (94).

In some aspects, the techniques described herein relate to a propulsion system (600, 700, 800), wherein the electric motor (94) is configured as a single-phase or three-phase AC motor.

In some aspects, the techniques described herein relate to a propulsion system (600, 700, 800), wherein the single-phase or three-phase AC motor is configured with a stator, wherein the stator includes a set of main stator windings and a set of auxiliary stator windings.

In some aspects, the techniques described herein relate to a propulsion system (600, 700, 800), when including the electrical power supply system (500, 600, 700, 800, 800', 1500*a,b*, 1501-1504), wherein the three-phase AC source is configured as an electric generator (EG) and the at least one three-phase AC load is configured as a three-phase AC motor.

In some aspects, the techniques described herein relate to a propulsion system (600, 700, 800), wherein the electrical power supply system (500, 600, 700, 800, 800', 1500*a,b*, 1501-1504) is configured to convert the AC voltage supplied by the electric generator (EG) into an AC voltage with a different amplitude and/or frequency for supplying the at least one three-phase AC motor with a variable AC voltage having a time-variant voltage and/or frequency.

In some aspects, the techniques described herein relate to a smart battery module (300) for an electric or hybrid aircraft (100) including: —terminals (318) for outputting an output voltage (Vpls) to a device external to the smart battery module (300); —a battery assembly (1400) configured to supply a DC voltage (VDC) between two poles; —a power converter (310) electrically connected to the terminals (318) and the poles, wherein the power converter (310) is configured to convert the DC voltage (VDC) into the output voltage (Vpls) and is adapted to provide said output voltage (Vpls) to the terminals (318), wherein a voltage average of the output voltage (Vpls) is different from a DC voltage level of the DC voltage (VDC), wherein the power converter (310) is configured as a non-isolated DC/DC converter, including an input end arranged with an input filter stage (312), wherein the input end is connected to the poles of the battery assembly (1400) and the power converter (310) includes a semiconductor stage (311) which includes a first Gallium Nitride (GaN) power semiconductor switch arranged to switchably connect the input filter stage (312) to one of the terminals (318).

In some aspects, the techniques described herein relate to a smart battery module (300), the battery assembly (1400) including a plurality of battery cells (1440) and/or a plurality of ultracapacitors for storing and releasing electrical energy.

In some aspects, the techniques described herein relate to a smart battery module (300), at least one battery cell (1440) from the plurality of battery cells (1440) is configured with an energy density preferably greater than 250 Wh/kg, more preferably greater than 350 Wh/kg, most preferably greater than or equal to 450 Wh/kg.

In some aspects, the techniques described herein relate to a smart battery module (300) 50 to 52, the power converter (310) is configured to switchably connect one pole of the battery assembly (1400) to one of the terminals (318) for converting the DC voltage (VDC) into the output voltage (Vpls).

In some aspects, the techniques described herein relate to a smart battery module (300), the input filter stage (312) including an inductor connected to one pole of the battery assembly (1400), wherein the semiconductor stage (311) is arranged to switchably connect the inductor to one of the terminals (318).

In some aspects, the techniques described herein relate to a smart battery module (300) 50 to 54, the power converter (310) including an output end connected to the configured to short-circuit the terminals (318).

In some aspects, the techniques described herein relate to a smart battery module (300), the electrical bypass circuit (313) includes a switch (313) and/or a second GaN power semiconductor switch, interconnected between the terminals (318).

In some aspects, the techniques described herein relate to a smart battery module (300), the electrical bypass circuit is included in the semiconductor stage (311).

In some aspects, the techniques described herein relate to a smart battery module (300) 50 to 58, including a controller (314) operably coupled to the semiconductor stage (311) and configured to control the semiconductor stage (311) for regulating the voltage conversion of the DC voltage (VDC) into the output voltage (Vpls).

In some aspects, the techniques described herein relate to a smart battery module (300), the controller (314) is configured to control a duty cycle of the first GaN power semiconductor switch, and preferably of the second GaN power semiconductor switch, in dependency of a setpoint provided by a control unit (400) external to the smart battery module (300) for regulating the output voltage (Vpls).

In some aspects, the techniques described herein relate to a smart battery module (300), the controller (314) is configured to operate the first GaN power semiconductor switch in consecutive switching cycles, wherein the controller (314) is adapted to synchronise the timing of each switching cycle in dependency of a synchronisation signal provided by a synchronisation unit external to the smart battery module (300).

In some aspects, the techniques described herein relate to a smart battery module (300), wherein the period of the consecutive switching cycles being preferably smaller than 10 μs, more preferably smaller than 5 μs, most preferably smaller than or equal to 4 μs.

In some aspects, the techniques described herein relate to a smart battery module (300), wherein the controller is arranged to vary the timing of each switching cycle in dependency on a timing setpoint provided by the unit external to the smart battery module (300).

In some aspects, the techniques described herein relate to a smart battery module (300), wherein varying includes delaying the timing of each switching cycle with reference to the timing synchronised.

In some aspects, the techniques described herein relate to a smart battery module (300), the controller (314) is arranged to control the switch (313) and/or the second GaN power semiconductor switch from a non-conductive state into a conductive state in response of a failure condition detectable by the controller (314) in the smart battery module (300).

In some aspects, the techniques described herein relate to a smart battery module (300), the output voltage (Vpls) is provided in the form of a pulsed DC voltage (Vpls).

In some aspects, the techniques described herein relate to electric or hybrid aircraft (100) including: —at least one smart battery module (300) 50 to 65, or —the electrical power supply system (500, 600, 1500*a,b*, 1501-1504) 1 to 42; or —a propulsion system (600, 700, 800) 43 to 49.

In some aspects, the techniques described herein relate to method for operating an electrical power supply system (500, 600, 1500*a,b*, 1501-1504) 1 to 42, including the step of: —transmitting a common setpoint or a plurality of individual setpoints to each controller (314) included in a plurality of smart battery modules (300) for providing common output voltage (VDC*, Vph).

In some aspects, the techniques described herein relate to a method, further including the step of: —transmitting a synchronisation signal to each controller (314) for synchronising the timing of each switching cycle of the plurality of smart battery modules (300).

In some aspects, the techniques described herein relate to a method, further including the step of: —transmitting a timing setpoint to each controller (314) for varying the timing of each switching cycle of the plurality of smart battery modules (300).

In some aspects, the techniques described herein relate to a method, further including the steps of: —determining one timing setpoint for each controller (314); —transmitting the time setpoint determined for each controller (314) to the respective controller (314).

In some aspects, the techniques described herein relate to a method 67 to 70, including the steps of: —setting the common setpoint or the plurality of individual setpoints to a time-invariant control value; or —varying a control value of the common setpoint or the plurality of individual setpoints over time.

In some aspects, the techniques described herein relate to a method, including the steps of: —receiving a notification on the detection of a failure from a smart battery module (300); —determining a new control value or values; —varying the control value of the common setpoint or the plurality of individual setpoints over time using the new control value or values.

In some aspects, the techniques described herein relate to method for operating a propulsion system (600, 700, 800) 67 to 72, including the steps of: —determining a common setpoint or a plurality of individual setpoints; —transmitting said setpoint or setpoints to the respective controller (314) included in a plurality of smart battery modules (300).

In some aspects, the techniques described herein relate to method, including the steps of: —setting the common setpoint or the plurality of individual setpoints to a time-invariant control value if a DC load is connected to the propulsion system (600, 700, 800); or —varying a control value of the common setpoint or the plurality of individual setpoints over time if an AC load and/or an AC source is connected to the propulsion system (600, 700, 800).

In some aspects, the techniques described herein relate to method, wherein said setpoint or setpoints are determined in dependency on a control value provided by a control instance (410) external to the propulsion system (600, 700, 800).

In some aspects, the techniques described herein relate to method for controlling a voltage average 50 to 65, including the steps of: —receiving a setpoint from a unit external to the smart battery module (300); —converting the DC voltage (VDC) into the output voltage (Vpls); —controlling the voltage average of the output voltage (Vpls) in dependency on the setpoint.

In some aspects, the techniques described herein relate to a method, further including the steps of: —receiving a synchronisation signal from the unit external to the smart battery module (300); —synchronising a timing of consecutive switching cycles in dependency of a synchronisation signal; —operating a first and preferably a second GaN power semiconductor switch based on the synchronised timing.

In some aspects, the techniques described herein relate to a method, further including the steps of: —receiving a timing setpoint from the unit external to the smart battery module (300); —varying the timing of consecutive switching cycles based on timing setpoint.

In some aspects, the techniques described herein relate to a method 76 to 78, further including the steps of: —detecting a failure in the smart battery module (300); —controlling a switch (313) and/or a second GaN power semiconductor switch from a non-conductive state into a conductive state-notifying the unit external to the smart battery module (300) on the detection of the failure.

In some aspects, the techniques described herein relate to flexibly configurable electrical power supply (500, 600, 1500*a,b*, 1501-1504) or propulsion system (600, 700, 800) including: —an electrical power supply (500, 600, 700, 800, 800', 1500*a,b*, 1501-1504) 1 to 42; or a propulsion system (600, 700, 800) 43 to 49, wherein a waveform of an output voltage (VDC*, Vph) supplied to a load connected to the electrical power supply (500, 600, 1500*a,b*, 1501-1504) or propulsion system (600, 700, 800) is configurable by reconfiguring at least one control parameter in the controller or is exclusively dependent on the control of the common setpoint or the plurality of individual setpoints and a timing setpoint.

In some aspects, the techniques described herein relate to use 50 to 65, in replacement of a battery module (1400) or a battery pack (1500A) configured to output an uncontrolled DC output voltage.

In some aspects, the techniques described herein relate to use 1 to 42 in replacement of a DC to DC, DC to AC, AC to AC converter or motor controller (94), each configured with an intermediate DC link.

In some aspects, the techniques described herein relate to a propulsion system (600, 700, 800) for an electric or hybrid aircraft (100) including: —at least one three-phase AC load, a high-voltage DC source, and the electrical power supply system (500, 600, 700, 800, 800', 1500*a,b*, 1501-1504) from any 1 to 42 wherein the electrical power supply system (500, 600, 700, 800, 800', 1500*a,b*, 1501-1504) is arranged to interconnect the three-phase AC load with the DC source for converting electrical energy supplied by the DC source into electrical energy receivable by the three-phase AC load.

In some aspects, the techniques described herein relate to a propulsion system (600, 700, 800) for an electric or hybrid aircraft (100) including: at least one three-phase AC source, a high-voltage DC load, and the electrical power supply system (500, 600, 700, 800, 800', 1500*a,b*, 1501-1504) from any 1 to 42, wherein the electrical power supply system (500, 600, 1500*a,b*, 700, 800, 800', 1501-1504) is arranged to interconnect the three-phase AC source with the DC load for converting electrical energy supplied by the AC source into electrical energy receivable by DC load.

In some aspects, the techniques described herein relate to an electrical power supply system for an electric or hybrid aircraft including: a string of a plurality in series connected smart battery modules, wherein the string is configured to provide a common output voltage; wherein each of said smart battery modules includes, terminals for outputting an output voltage to a device external to the smart battery module; a battery assembly configured to supply a DC voltage between two poles; a power converter electrically connected to the terminals and the poles, wherein the power converter is configured to convert the DC voltage into the output voltage and is adapted to provide said output voltage to the terminals, wherein a voltage average of the output voltage can be different from a DC voltage level of the DC voltage, and a controller operably coupled to a semiconductor stage and configured to control the semiconductor stage for regulating voltage conversation of the DC voltage into the output voltage; a control unit operably coupled to the controller of each smart battery module and configured to set an output voltage and/or current setpoint or limit for each controller individually or configured to set an output voltage and/or current setpoint or limit for all controllers collectively, the respective controllers of the smart battery modules is configured to carry out real-time monitoring of a state of its respective smart battery module in the string, and to operate its smart battery modules to output a voltage which is proportional to energy available in that smart battery module, and/or, wherein the control unit is configured to carry out real-time monitoring of the state of each of the smart battery modules in the string and to operate each of the smart battery modules to output a volage which is proportional to the energy available in that smart battery module.

In some aspects, the techniques described herein relate to an electrical power supply system (500, 600, 700, 800, 800', 1500*a,b*, 1501-1504), wherein the common output voltage (VDC*, Vph) corresponds to a sum of output voltages (Vpls) outputted by each smart battery module (300).

In some aspects, the techniques described herein relate to an electrical power supply system (500, 600, 700, 800, 800', 1500*a,b*, 1501-1504), including an inductance (511, 521, 531) connected in series with the string.

In some aspects, the techniques described herein relate to an electrical power supply system (500, 600, 700, 800, 800', 1500*a,b*, 1501-1504) wherein the inductance (511, 521, 531) is provided in the form of a conductor or cable of which a given parasitic inductance and resistance are used to establish a required impedance.

In some aspects, the techniques described herein relate to an electrical power supply system (500, 600, 1500*a,b*, 1501-1504), including a plurality of strings connected in parallel, wherein the parallel connected strings are configured to supply a common output current corresponding to a sum of output currents outputted by each string.

In some aspects, the techniques described herein relate to an electrical power supply system (500, 600, 700, 800, 800', 1500*a,b*, 1501-1504), including a plurality of inductances (511, 521, 531), at least one inductance (511, 521, 531) is connected in series with a corresponding string.

In some aspects, the techniques described herein relate to an electrical power supply system (500, 600, 700, 800, 800', 1500*a,b*, 1501-1504), wherein the control unit (400) is configured to set the output voltage and/or current setpoint or limit to a predetermined fixed value, or the control unit (400) is configured to vary the output voltage and/or current setpoint or limit or setpoints in dependency of a control value provided by a control instance (410) external to the electrical power supply system (500, 600).

In some aspects, the techniques described herein relate to an electrical power supply system (500, 600, 700, 800, 800', 1500*a,b*, 1501-1504), wherein the control unit (400) is configured to provide a synchronisation signal to the controllers (314) of the smart battery modules (300) for synchronising the timing of the consecutive switching cycles of the smart battery modules (300), and/or the control unit (400) is configured to provide a timing setpoint to the controllers (314) of the smart battery modules (300) for varying the timing of each switching cycle with reference to the timing synchronised.

In some aspects, the techniques described herein relate to an electrical power supply system (500, 600, 700, 800, 800', 1500*a,b*, 1501-1504), wherein a control value of the output voltage setpoint and/or current provided by a control instance (410) external to the electrical power supply system (500, 600) is a time-invariant control value.

In some aspects, the techniques described herein relate to an electrical power supply system (500, 600, 700, 800, 800', 1500*a,b*, 1501-1504), wherein the common output voltage (VDC*, Vph) is a DC voltage (VDC*) with a residual periodic variation of the DC voltage level for supplying a DC load external to the electrical power supply system (500, 600,700, 800, 800').

In some aspects, the techniques described herein relate to an electrical power supply system (500, 600, 700, 800, 800', 1500*a,b*, 1501-1504), wherein a control value of the output voltage and/or current setpoint provided by the control instance (410) external to the electrical power supply system (500, 600) is a time-variant control value.

In some aspects, the techniques described herein relate to an electrical power supply system (500, 600, 700, 800, 800', 1500*a,b*, 1501-1504), wherein the common output voltage (VDC*, Vph) is an AC voltage (Vph) for supplying an AC load external to the electrical power supply system (500, 600,700, 800, 800').

In some aspects, the techniques described herein relate to an electrical power supply system (500, 600, 700, 800, 800', 1500*a,b*, 1501-1504), including at least three strings, wherein the strings are commonly connected at one end to form a star point (Sp) and configured to output the AC voltage (Vph) relative to the star point (Sp) at each end different from the one end, wherein the AC voltage (Vph) outputted at each end different from the one end having a mutually different phase.

In some aspects, the techniques described herein relate to the electrical power supply system (500, 600, 700, 800, 800', 1500*a,b*, 1501-1504) wherein the battery assembly (1400) of each respective smart battery module includes a plurality of battery cells (1440) and/or a plurality of ultracapacitors for storing and releasing electrical energy.

In some aspects, the techniques described herein relate to an electrical power supply system (500, 600, 700, 800, 800', 1500*a,b*, 1501-1504) wherein each respective smart battery module includes, at least one battery cell (1440) from the plurality of battery cells (1440) is configured with an energy density preferably greater than 250 Wh/kg, more preferably greater than 350 Wh/kg, most preferably greater than or equal to 450 Wh/kg.

In some aspects, the techniques described herein relate to an electrical power supply system (500, 600, 700, 800, 800', 1500*a,b*, 1501-1504) wherein in each respective smart battery module (300) the power converter (310) is configured to switchably connect one pole of the battery assembly (1400) to one of the terminals (318) for converting the DC voltage (VDC) into the output voltage (Vpls).

In some aspects, the techniques described herein relate to an electrical power supply system (500, 600, 700, 800, 800', 1500*a,b*, 1501-1504) wherein in each respective smart battery module (300) the power converter (310) is configured as a non-isolated DC/DC converter, including an input end arranged with an input filter stage (312), wherein the input end is connected to the poles of the battery assembly (1400) and the power converter (310) includes a semiconductor stage (311) configured to switchably connect the input filter stage (312) to one of the terminals (318).

In some aspects, the techniques described herein relate to an electrical power supply system (500, 600, 700, 800, 800', 1500*a,b*, 1501-1504) wherein in each respective smart battery module (300) the input filter stage (312) includes an inductor connected to one pole of the battery assembly (1400), wherein the semiconductor stage (311) is arranged to switchably connect the inductor to one of the terminals (318).

In some aspects, the techniques described herein relate to an electrical power supply system (500, 600, 700, 800, 800', 1500*a,b*, 1501-1504) wherein in each respective smart battery module (300) the semiconductor stage (311) includes a first Gallium Nitride (GaN) power semiconductor switch arranged to switchably connect the input filter stage (312) to one of the terminals (318).

In some aspects, the techniques described herein relate to an electrical power supply system (500, 600, 700, 800, 800', 1500*a,b*, 1501-1504) wherein in each respective smart battery module (300) the power converter (310) includes an output end connected to the terminals (318), wherein the power converter (310) includes an electrical bypass circuit (313) configured to short-circuit the terminals (318).

In some aspects, the techniques described herein relate to an electrical power supply system (500, 600, 700, 800, 800', 1500*a,b*, 1501-1504) wherein the electrical bypass circuit includes a switch (313) and/or a second GaN power semiconductor switch, interconnected between the terminals (318).

In some aspects, the techniques described herein relate to an electrical power supply system (500, 600, 700, 800, 800', 1500*a,b*, 1501-1504) 101-105, wherein the controller (314) of each respective smart battery module (300) is configured to control a duty cycle of the first GaN power semiconductor switch, and preferably of the second GaN power semiconductor switch, in dependency of a setpoint provided by a control unit (400) external to the smart battery module (300) for regulating the output voltage (Vpls).

In some aspects, the techniques described herein relate to an electrical power supply system (500, 600, 700, 800, 800', 1500*a,b*, 1501-1504), wherein the controller (314) is configured to operate the first GaN power semiconductor switch in consecutive switching cycles, wherein the controller (314) is adapted to synchronise the timing of each switching cycle in dependency of a synchronisation signal provided by a synchronisation unit external to the smart battery module (300).

In some aspects, the techniques described herein relate to an electrical power supply system (500, 600, 700, 800, 800', 1500*a,b*, 1501-1504), wherein the period of the consecutive switching cycles being preferably smaller than 10 μs, more preferably smaller than 5 μs, most preferably smaller than or equal to 4 μs.

In some aspects, the techniques described herein relate to an electrical power supply system (500, 600, 700, 800, 800', 1500*a,b*, 1501-1504), wherein the controller of each respective smart battery module (300) is arranged to vary the timing of each switching cycle in dependency on a timing setpoint provided by the unit external to the smart battery module (300).

In some aspects, the techniques described herein relate to an electrical power supply system (500, 600, 700, 800, 800', 1500*a,b*, 1501-1504), wherein varying includes delaying the timing of each switching cycle with reference to the timing synchronised.

In some aspects, the techniques described herein relate to the electrical power supply system (500, 600, 700, 800, 800', 1500*a,b*, 1501-1504) wherein the controller (314) of each respective smart battery module (300) is arranged to control the switch (313) and/or the second GaN power semiconductor switch from a non-conductive state into a conductive state in response of a failure condition detectable by the controller (314) in the smart battery module (300).

In some aspects, the techniques described herein relate to an electrical power supply system (500, 600, 700, 800, 800', 1500*a,b*, 1501-1504) wherein the output voltage (Vpls) of each respective smart battery module (300) is provided in the form of a pulsed DC voltage (Vpls).

In some aspects, the techniques described herein relate to the electrical supply system (500, 600, 1500*a,b*, 1501-1504) further including a by-pass switch (313) for each of the respective smart battery modules (300) in the string (510), wherein each respective by-pass switch (313) may be selectively closed to by-pass a smart battery module (300).

In some aspects, the techniques described herein relate to an electrical supply system (500, 600, 700, 800, 800', 1500*a,b*, 1501-1504) wherein the respective controller (314) of each smart battery module in the string (510) is configured to detect a fault the respective smart battery module (300) and in response to detecting a fault will close the by-pass switch (313) corresponding to that faulty smart batter module (300), so that faulty smart battery module (300) is by-passed, or the control unit (400), is configured to detect a fault in a smart battery modules (300) in the string (510) and in response to detecting a fault in one of the smart battery modules (300) and in response to detecting a fault will close the by-pass switch (313) corresponding to that faulty smart batter module (300), so that faulty smart battery module (300) is by-passed.

In some aspects, the techniques described herein relate to an electrical supply system (500, 600, 700, 800, 800', 1500*a,b*, 1501-1504) wherein the control unit (400) is further configured to send a modified voltage setpoint to the other smart battery modules (300) in the string (510) which maintains the total voltage/string current at the output at the level prior to the fault occurring.

In some aspects, the techniques described herein relate to an electrical supply system (500, 600, 700, 800, 800', 1500*a,b*, 1501-1504), wherein the respective controller (314) of each smart battery module in the string (510) is configured to detect a state of health of the respective smart battery module (300), or the control unit (400), is configured to detect a state of health of each smart battery module (300) in the string (510).

In some aspects, the techniques described herein relate to an electrical supply system (500, 600, 700, 800, 800', 1500*a,b*, 1501-1504) wherein the controllers (314) the smart battery modules are configured to operate the smart battery modules (300) which have a higher state of health to provide a higher voltage at their respective output terminals, than the smart battery modules (300) that have a lower state of health, so that the voltage provided by the smart battery modules (300) which have a higher state of health at least partially compensates the lower voltage provide by the smart battery modules (300) that have a lower state of health; or wherein the control unit 400 is configured to operate the smart battery modules (300) which have a higher state of health to provide a higher voltage at their respective output terminals, than the smart battery modules (300) that have a lower state of health, so that the voltage provided by the smart battery modules (300) which have a higher state of health at least partially compensates the lower voltage provide by the smart battery modules (300) that have a lower state of health.

In some aspects, the techniques described herein relate to an electrical supply system (500, 600, 700, 800, 800', 1500*a,b*, 1501-1504) wherein the controllers (314) the smart battery modules are configured to set the output voltage of the smart battery modules (300) that have a low state of health to zero, and operate the smart battery modules (300) which have a higher state of health to provide a higher voltage at their respective output terminals to at least partially compensate for the smart battery modules whose output have been set to zero, or wherein the control unit 400 is configured to set the output voltage of the smart battery modules (300) that have a low state of health to zero, and operate the smart battery modules (300) which have a higher state of health to provide a higher voltage at their respective output terminals to at least partially compensate for the smart battery modules whose output have been set to zero.

In some aspects, the techniques described herein relate to an electrical supply system (500, 600, 700, 800, 800', 1500*a,b*, 1501-1504), wherein the control unit (400) is configured to further detect when a smart battery module (300) in the string (510) is fully charged, and to selectively stop further charging of a detected fully charged battery module without stopping the further charging of the other battery modules in the string (510) which have not yet been fully charged.

In some aspects, the techniques described herein relate to an electrical supply system (500, 600, 700, 800, 800', 1500*a,b*, 1501-1504), wherein each of the respective controllers (314) of the smart battery modules is configured to redistribute any surplus of power of its respective smart battery module (300) to one or more other smart battery modules in the string (510); or wherein the control unit (400) is configured to redistribute any surplus of power of one or more individual smart battery modules (300) in the string (510) to the other smart battery modules (300) in the string (510).

In some aspects, the techniques described herein relate to an electrical supply system (500, 600, 700, 800, 800', 1500*a,b*, 1501-1504), wherein each of the respective controllers (314) of the smart battery modules is configured to control the output voltage of its respective smart battery module so that the output voltage of the string (510) is independent of the state of charge of the smart battery modules (300) in the string (510), or the control unit (400) is configured to control the output voltage of the string (510) independently of the state of charge of the smart battery modules (300) in the string (510).

In some aspects, the techniques described herein relate to an electrical supply system (500, 600, 700, 800, 800', 1500*a,b*, 1501-1504), wherein each of the respective controllers (314) of the smart battery modules is configured to carry out real-time health monitoring of its respective smart battery module (300) in the string (510), or the control unit (400) is configured to carry out real-time health monitoring of each of the smart battery modules (300) in the string (510).

In some aspects, the techniques described herein relate to an electrical supply system (500, 600, 700, 800, 800', 1500*a,b*, 1501-1504), wherein each of the respective controllers (314) of the smart battery modules is configured to operate its smart battery modules (300) to output a voltage which is proportional to the state of health of that smart battery module (300); or the control unit (400) is configured to operate each of the smart battery modules (300) to output a volage which is proportional to the state of health of that smart battery module (300).

In some aspects, the techniques described herein relate to an electrical supply system (500, 600, 700, 800, 800', 1500*a,b*, 1501-1504), wherein the string (510) of smart battery modules (300) is directly connected to a motor so that the string (510) supplies a motor phase directly from the smart battery modules, without an inverter.

In some aspects, the techniques described herein relate to an electrical supply system (500, 600, 700, 800, 800', 1500*a,b*, 1501-1504), wherein the control unit (400) is configured to selectively operate the string (510) of smart battery modules (300) to generate a voltage containing two AC frequency components.

In some aspects, the techniques described herein relate to an electrical supply system (500, 600, 700, 800, 800', 1500*a,b*, 1501-1504), wherein the control unit (400) is configured to selectively disable any one or more of the smart battery modules (300) in the string 510.

In some aspects, the techniques described herein relate to a propulsion system (600, 700, 800) for an electric or hybrid aircraft (100) including: —the electrical power supply system (500, 600, 700, 800, 800', 1500*a,b*, 1501-1504) 85 to 126 and a DC load connected to the 800, 800', 1500*a,b*, 1501-1504) 1 to 126 and an AC load connected to the electrical power supply system (500, 600); or —at least one three-phase AC load, a three-phase AC source, and the electrical power supply system (500, 600, 700, 800, 800', 1500*a,b*, 1501-1504), wherein the electrical power supply system (500, 600, 700, 800, 800', 1500*a,b*, 1501-1504) is arranged to interconnect the three-phase AC load with the three-phase AC source for converting electrical energy supplied by the AC source into electrical energy receivable by the three-phase AC load.

In some aspects, the techniques described herein relate to a propulsion system (600, 700, 800), when including the electrical power supply system (500, 600, 700, 800, 800', 1500*a,b*, 1501-1504), the DC load including at least one motor controller (93) provided with a DC link circuit.

In some aspects, the techniques described herein relate to a propulsion system (600, 700, 800), when including the electrical power supply system (500, 600, 700, 800, 800', 1500*a,b*, 1501-1504), the AC load including at least one electric motor (94).

In some aspects, the techniques described herein relate to a propulsion system (600, 700, 800), wherein the electric motor (94) is configured as a single-phase or three-phase AC motor.

In some aspects, the techniques described herein relate to a propulsion system (600, 700, 800), wherein the single-phase or three-phase AC motor is configured with a stator, wherein the stator includes a set of main stator windings and a set of auxiliary stator windings.

In some aspects, the techniques described herein relate to a propulsion system (600, 700, 800), when including the electrical power supply system (500, 600, 700, 800, 800', 1500*a,b*, 1501-1504), wherein the three-phase AC source is configured as an electric generator (EG) and the at least one three-phase AC load is configured as a three-phase AC motor.

In some aspects, the techniques described herein relate to a propulsion system (600, 700, 800), wherein the electrical power supply system (500, 600, 700, 800, 800', 1500*a,b*, 1501-1504) is configured to convert the AC voltage supplied by the electric generator (EG) into an AC voltage with a different amplitude and/or frequency for supplying the at least one three-phase AC motor with a variable AC voltage having a time-variant voltage and/or frequency.

In some aspects, the techniques described herein relate to a smart battery module (300) for an electric or hybrid aircraft (100) including: —terminals (318) for outputting an output voltage (Vpls) to a device external to the smart battery module (300); —a battery assembly (1400) configured to supply a DC voltage (VDC) between two poles; —a power converter (310) electrically connected to the terminals (318) and the poles, wherein the power converter (310) is configured to convert the DC voltage (VDC) into the output voltage (Vpls) and is adapted to provide said output voltage (Vpls) to the terminals (318), wherein a voltage average of the output voltage (Vpls) is different from a DC voltage level of the DC voltage (VDC), wherein the power converter (310) is configured as a non-isolated DC/DC converter, including an input end arranged with an input filter stage (312), wherein the input end is connected to the poles of the battery assembly (1400) and the power converter (310) includes a semiconductor stage (311) which includes a first Gallium Nitride (GaN) power semiconductor switch arranged to switchably connect the input filter stage (312) to one of the terminals (318).

In some aspects, the techniques described herein relate to a smart battery module (300), the battery assembly (1400) including a plurality of battery cells (1440) and/or a plurality of ultracapacitors for storing and releasing electrical energy.

In some aspects, the techniques described herein relate to a smart battery module (300), at least one battery cell (1440) from the plurality of battery cells (1440) is configured with an energy density preferably greater than 250 Wh/kg, more preferably greater than 350 Wh/kg, most preferably greater than or equal to 450 Wh/kg.

In some aspects, the techniques described herein relate to a smart battery module (300) 134 to 136, the power converter (310) is configured to switchably connect one pole of the battery assembly (1400) to one of the terminals (318) for converting the DC voltage (VDC) into the output voltage (Vpls).

In some aspects, the techniques described herein relate to a smart battery module (300), the input filter stage (312) including an inductor connected to one pole of the battery assembly (1400), wherein the semiconductor stage (311) is arranged to switchably connect the inductor to one of the terminals (318).

In some aspects, the techniques described herein relate to a smart battery module (300) 134 to 138, the power converter (310) including an output end connected to the configured to short-circuit the terminals (318).

In some aspects, the techniques described herein relate to a smart battery module (300), the electrical bypass circuit (313) includes a switch (313) and/or a second GaN power semiconductor switch, interconnected between the terminals (318).

In some aspects, the techniques described herein relate to a smart battery module (300), the electrical bypass circuit is included in the semiconductor stage (311).

In some aspects, the techniques described herein relate to a smart battery module (300) 134 to 141, including a controller (314) operably coupled to the semiconductor stage (311) and configured to control the semiconductor stage (311) for regulating the voltage conversion of the DC voltage (VDC) into the output voltage (Vpls).

In some aspects, the techniques described herein relate to a smart battery module (300), the controller (314) is configured to control a duty cycle of the first GaN power semiconductor switch, and preferably of the second GaN power semiconductor switch, in dependency of a setpoint provided by a control unit (400) external to the smart battery module (300) for regulating the output voltage (Vpls).

In some aspects, the techniques described herein relate to a smart battery module (300), the controller (314) is configured to operate the first GaN power semiconductor switch in consecutive switching cycles, wherein the controller (314) is adapted to synchronise the timing of each switching cycle in dependency of a synchronisation signal provided by a synchronisation unit external to the smart battery module (300).

In some aspects, the techniques described herein relate to a smart battery module (300), wherein the period of the consecutive switching cycles being preferably smaller than 10 μs, more preferably smaller than 5 μs, most preferably smaller than or equal to 4 μs.

In some aspects, the techniques described herein relate to a smart battery module (300), wherein the controller is arranged to vary the timing of each switching cycle in dependency on a timing setpoint provided by the unit external to the smart battery module (300).

In some aspects, the techniques described herein relate to a smart battery module (300), wherein varying includes delaying the timing of each switching cycle with reference to the timing synchronised.

In some aspects, the techniques described herein relate to a smart battery module (300), the controller (314) is arranged to control the switch (313) and/or the second GaN power semiconductor switch from a non-conductive state into a conductive state in response of a failure condition detectable by the controller (314) in the smart battery module (300).

In some aspects, the techniques described herein relate to a smart battery module (300), the output voltage (Vpls) is provided in the form of a pulsed DC voltage (Vpls).

In some aspects, the techniques described herein relate to electric or hybrid aircraft (100) including: —at least one smart battery module (300) 134 to 149, or —the electrical power supply system (500, 600, 1500*a,b*, 1501-1504) 85 to 126; or —a propulsion system (600, 700, 800) 127 to 133.

In some aspects, the techniques described herein relate to method for operating an electrical power supply system (500, 600, 1500*a,b*, 1501-1504) 85 to 126, including the step of: —transmitting a common setpoint or a plurality of individual setpoints to each controller (314) included in a plurality of smart battery modules (300) for providing common output voltage (VDC*, Vph).

In some aspects, the techniques described herein relate to a method, further including the step of: —transmitting a synchronisation signal to each controller (314) for synchronising the timing of each switching cycle of the plurality of smart battery modules (300).

In some aspects, the techniques described herein relate to a method, further including the step of: —transmitting a timing setpoint to each controller (314) for varying the timing of each switching cycle of the plurality of smart battery modules (300).

In some aspects, the techniques described herein relate to a method, further including the steps of: —determining one timing setpoint for each controller (314); —transmitting the time setpoint determined for each controller (314) to the respective controller (314).

In some aspects, the techniques described herein relate to a method 151 to 154, including the steps of: —setting the common setpoint or the plurality of individual setpoints to a time-invariant control value; or —varying a control value of the common setpoint or the plurality of individual setpoints over time.

In some aspects, the techniques described herein relate to a method, including the steps of: —receiving a notification on the detection of a failure from a smart battery module (300); —determining a new control value or values; —varying the control value of the common setpoint or the plurality of individual setpoints over time using the new control value or values.

In some aspects, the techniques described herein relate to method for operating a propulsion system (600, 700, 800) 151 to 156, including the steps of: —determining a common setpoint or a plurality of individual setpoints; —transmitting said setpoint or setpoints to the respective controller (314) included in a plurality of smart battery modules (300).

In some aspects, the techniques described herein relate to method, including the steps of: —setting the common setpoint or the plurality of individual setpoints to a time-invariant control value if a DC load is connected to the propulsion system (600, 700, 800); or —varying a control value of the common setpoint or the plurality of individual setpoints over time if an AC load and/or an AC source is connected to the propulsion system (600, 700, 800).

In some aspects, the techniques described herein relate to method, wherein said setpoint or setpoints are determined in dependency on a control value provided by a control instance (410) external to the propulsion system (600, 700, 800).

In some aspects, the techniques described herein relate to method for controlling a voltage average 134 to 149, including the steps of: —receiving a setpoint from a unit external to the smart battery module (300); —converting the DC voltage (VDC) into the output voltage (Vpls); —controlling the voltage average of the output voltage (Vpls) in dependency on the setpoint.

In some aspects, the techniques described herein relate to a method, further including the steps of: —receiving a synchronisation signal from the unit external to the smart battery module (300); —synchronising a timing of consecutive switching cycles in dependency of a synchronisation signal; —operating a first and preferably a second GaN power semiconductor switch based on the synchronised timing.

In some aspects, the techniques described herein relate to a method, further including the steps of: —receiving a timing setpoint from the unit external to the smart battery module (300); —varying the timing of consecutive switching cycles based on timing setpoint.

In some aspects, the techniques described herein relate to a method 160 to 162, further including the steps of: —detecting a failure in the smart battery module (300); —controlling a switch (313) and/or a second GaN power semiconductor switch from a non-conductive state into a conductive state-notifying the unit external to the smart battery module (300) on the detection of the failure.

In some aspects, the techniques described herein relate to flexibly configurable electrical power supply (500, 600, 1500*a,b*, 1501-1504) or propulsion system (600, 700, 800) including: —an electrical power supply (500, 600, 700, 800, 800', 1500*a,b*, 1501-1504) 85 to 126; or a propulsion system (600, 700, 800) 127 to 133, wherein a waveform of an output voltage (VDC*, Vph) supplied to a load connected to the electrical power supply (500, 600, 1500*a,b*, 1501-1504) or propulsion system (600, 700, 800) is configurable by reconfiguring at least one control parameter in the controller or is exclusively dependent on the control of the common setpoint or the plurality of individual setpoints and a timing setpoint.

In some aspects, the techniques described herein relate to use 134 to 149, in replacement of a battery module (1400) or a battery pack (1500A) configured to output an uncontrolled DC output voltage.

In some aspects, the techniques described herein relate to use 85 to 126 in replacement of a DC to DC, DC to AC, AC to AC converter or motor controller (94), each configured with an intermediate DC link.

In some aspects, the techniques described herein relate to a propulsion system (600, 700, 800) for an electric or hybrid aircraft (100) including: —at least one three-phase AC load, a high-voltage DC source, and the electrical power supply system (500, 600, 700, 800, 800', 1500*a,b*, 1501-1504) from any 85 to 126 wherein the electrical power supply system (500, 600, 700, 800, 800', 1500*a,b*, 1501-1504) is arranged to interconnect the three-phase AC load with the DC source for converting electrical energy supplied by the DC source into electrical energy receivable by the three-phase AC load.

In some aspects, the techniques described herein relate to a propulsion system (600, 700, 800) for an electric or hybrid aircraft (100) including: at least one three-phase AC source, a high-voltage DC load, and the electrical power supply system (500, 600, 700, 800, 800', 1500*a,b*, 1501-1504) from any 85 to 126, wherein the electrical power supply system (500, 600, 1500*a,b*, 700, 800, 800', 1501-1504) is arranged to interconnect the three-phase AC source with the DC load for converting electrical energy supplied by the AC source into electrical energy receivable by DC load. The embodiments described herein, therefore, have the objective of remedying some disadvantages of the prior art. In particular, it is an objective to provide a smart battery module, an electrical power supply system, a propulsion system, and an electric or hybrid aircraft comprising the module, the supply and/or propulsion system that overcome the disadvantages.

An aim of the aspects described in the present disclosure is the provision of a smart battery module that can supply a controllable output voltage, widely independent from the state of charge of battery cells comprised in the electrical energy storage.

Another aim is the provision of the smart battery module that features off-the-shelf low voltage electrical components so that the smart battery modules can be produced in high volumes at low costs.

A further objective of the aspects described in the disclosure is the provision of the smart battery module that can supply the controllable output voltage mentioned with high efficiency, independent from the state of charge.

Another objective of the aspects described in the disclosure is the provision of an electrical power supply system featuring a plurality of smart battery modules that can supply a magnitude of output voltage waveforms and is thereby sufficient for many electrical applications.

A further aim of the aspects described in the disclosure is the provision of an electrical power supply system that is highly efficient and lightweight and thereby increases the range of aircraft significantly when powered by the electrical power supply system. In particular, this can ease the design of the said electrical subsystems with respect to the input voltage variability, thereby increasing the overall efficiency.

An auxiliary objective of the aspects described in the present disclosure is the provision of an electrical power supply system to replace a DC to DC, DC to AC, or an AC to AC converter conventionally used in aircraft, but also in other applications by the electrical power supply system as described herein.

Another objective of the aspects described in the disclosure is the provision of a propulsion system comprising the electrical power supply system and/or a plurality of smart battery modules capable of generating an AC voltage for driving a motor without the need for intermediate storage in an intermediate DC link comprising capacitors.

Another aim of the aspects described in the disclosure is the provision of a propulsion system with reduced complexity and high efficiency and reliability.

A further object of the aspects described in the disclosure is the provision of an electric or hybrid aircraft comprising a plurality of smart battery modules, the electric power supply system and/or the propulsion system, thereby enabling increased range, simplified certification, increased safety and cost reduction.

Another aim of the aspects described in the disclosure is the provision of methods for controlling a smart battery module, electrical supply and propulsion system. The methods can be implemented on processing units such as microcontrollers or other control devices in a resource-saving manner. Compared to methods known from the prior art, they can offer simple and efficient control of voltages or currents without having to resort to complex control methods.

A further objective of the aspects described in the present disclosure is the provision of a flexibly configurable electrical power supply or propulsion system which can be adapted to the different applications, such as the provision of an AC or DC voltage, by simple reprogramming. This can eliminate the need for time-consuming reconfiguration of hardware components.

Another objective of the aspects described in the disclosure is the provision of the use of the smart battery module or the electrical power supply system. By simply replacing the corresponding components or systems known from the prior art, efficiency can be increased while simultaneously reducing weight.

According to the aspects described in the disclosure, these aims are attained by the object of the attached claims.

Conferring to a first aspect of the aspects described in the present disclosure, a smart battery module involving the features recited in claim 1 is disclosed. The smart battery module can be suitable for an electric or hybrid aircraft, but also for other applications.

The smart battery module comprises:

terminals for outputting an output voltage to a device external to the smart battery module;

a battery assembly configured to supply a DC voltage between two poles;

a power converter electrically connected to the terminals and the poles, wherein the power converter can be configured to convert the DC voltage into the output voltage and can be adapted to provide said output voltage to the terminals, wherein a voltage average of the output voltage being different from a DC voltage level of the DC voltage. A fuel cell may be used in place of the battery assembly.

The device external to the smart battery module can be a second and third smart battery module, each connected with one corresponding terminal to the terminals of the smart battery module. The external device can also be another electrical consumer, such as a pump, a heating element, a flight or vehicle control unit, etc. The terminals can be provided as screw or push-in terminals, so external devices (or further smart battery modules) can be easily connected to the terminals of said smart battery module.

The battery assembly can comprise a plurality of individual storage cells configured to store electrical energy in the form of chemical or mechanical energy. The storage cells can be mechanically formed into an integral package that can make up the assembly. The poles can have an electrical polarity to each other. In the assembly, some storage cells can be connected in series, whereas some can be connected in parallel. The battery assembly, therefore, can be provided in a mixture of in-series and in-parallel connected storage cells. Due to its modular configuration, the battery assembly can also be termed battery module. Therefore, the terms can be used interchangeably during the present disclosure.

When looking at the flow of electrical energy, starting from the battery assembly, the power converter can be situated between the battery assembly and the terminals. The power converter can be configured with an input end for receiving electrical energy from the battery assembly and can be configured with an output end to supply electrical energy to the terminals. The power converter can be configured as a DC-to-DC converter as a buck, boost, or buck-boost converter. The power converter can also be configured as a DC-to-AC converter. Each type of power converter mentioned can be non-inverting, inverting, non-insulating, or insulating. The power converter can be of a non-resonant (hard switching), a quasi-resonant, or a resonant (soft switching) type. It should be understood that energy transfer may be bidirectional; in other words electrical energy may pass from the battery assembly to the terminals, or, from the terminals to the battery assembly.

In principle, a DC voltage can have a voltage average corresponding to the DC voltage level. In numerical terms, a DC voltage of 50 V typically has a voltage average of 50 V. In an embodiment the output voltage may be a pulsed voltage, with the pulse duration being continuously controlled by the controller (local or central), and the pulse amplitude corresponding to the battery module DC voltage or other DC voltage level present in the power converter. In an embodiment the output voltage can be another DC voltage, an AC voltage or a superposition of both. The AC voltage or the superposition can have a periodic waveform. The voltage average of the output voltage can be measured, determined or calculated with devices or methods known from prior art. The smart battery module can output an output voltage measurable to its terminals, with an average value (or average voltage value) mutually different from the DC voltage supplied by the battery assembly. However, the power converter can have operating points where both match or overlap. Thus, the voltage average of the output voltage can be lower, higher or equal to the DC voltage supplied by the battery assembly.

The battery assembly and the power converter can be integral to the smart battery module and placed in a common housing. The housing preferably is made of an electrically non-conducting material, such as plastic. The smart battery module can be understood as a module or assembly comprising the battery assembly, the power converter, and further components or parts not mentioned yet.

The advantage of the smart battery module is obvious, as it can supply an output voltage between the terminals independent of the voltage supplied by the battery assembly. The output voltage supplied by the smart battery module can or can be controlled to be stable over a certain amount of time, such as minutes or hours, depending on the electrical power drawn by a consumer connected to the smart battery module. In addition, given the modular character of the smart battery module, it can be built compact and lightweight, as complex wiring can be dispensed. Moreover, the terminals can allow a simple interconnection between smart battery modules or between the smart battery module and an external device.

In a first embodiment of the first aspect, the battery assembly can comprise a plurality of battery cells and/or a plurality of ultracapacitors for storing and releasing electrical energy. Preferably, the battery assembly includes only battery cells that can be charged and discharged.

In a second embodiment of the first aspect, at least one battery cell from the plurality of battery cells can be configured with an energy density preferably greater than 250 Wh/kg, more preferably greater than 350 Wh/kg, most preferably greater than or equal to 450 Wh/kg. Given the energy density listed before, the plurality of battery cells can be configured as Lithium-Ion battery cells in any technology and with any cell chemistry suitable for the application intended. This statement shall not exclude the use of other than Lithium-Ion battery cells. It should be understood that a fuel cell can be used instead of a battery cell.

In a third embodiment of the first aspect, the power converter can be configured to switchably connect one pole of the battery assembly to one of the terminals for converting the DC voltage into the output voltage. By repeatedly connecting and disconnecting one pole of the battery assembly to one of the terminals, the flow of electrical energy between the pole and the terminal can be controlled, thereby influencing the voltage between the terminals. In an embodiment at least a filter, and/or a converter stage, is connected between the batter terminals and the output terminals.

In a further embodiment of the first aspect, the power converter can be configured as a non-isolated DC/DC converter, comprising an input end arranged with an input filter stage, wherein the input end can be connected to the poles of the battery assembly and the power converter comprises a semiconductor stage configured to switchably connect the input filter stage to one of the terminals. Alternatively, the semiconductor stage comprised in the power converter can be configured to switchably connect the input filter stage to the terminals. The input filter stage can be configured to filter harmonic fluctuations that can enter the smart battery module from the output end into the direction of the input end.

In a different embodiment of the first aspect, the input filter stage can comprise an inductor connected to one pole of the battery assembly, wherein the semiconductor stage can be arranged to switchably connect the inductor to one of the terminals. The inductor can be configured as a choke comprising ferrite materials, thereby providing a relatively high inductivity. The inductor can limit the current when recurringly connecting the pole of the battery assembly to the terminal. However, the input filter stage can be optional. The input filter stage can also comprise any other configuration, for example, a double LC filter stage, whereby one stage is arranged one behind another. Alternative filter configurations, such as a PI-filter, etc. can also be sufficient and used instead of the single or double LC filter in the input filter stage. In another embodiment of the first aspect, the semiconductor stage can comprise a first Gallium Nitride power semiconductor switch arranged to switchably connect the input filter stage to one of the terminals. Alternatively, the first Gallium Nitride power semiconductor switch in the semiconductor stage can be configured to switchably connect the input filter stage to the terminals. The use of Gallium Nitride power semiconductor switches over other types of semiconductor switches, such as those featuring Silicon Carbide can be preferred. Gallium Nitride power semiconductor switches can require a relatively small semiconductor area for conducting and switching high currents, which can make them particularly insensitive to atmospheric radiation, which can be strong at high altitudes in aircraft. The said power semiconductor switch can be configured with a reverse recovery diode, connected in parallel to the power semiconductor switch or with a body diode. All herein-mentioned power semiconductor switches may or may not be configured as Gallium Nitride power semiconductor switches. They can also be configured as Silicon Carbide power semiconductor switches, Gallium Arsenide power semiconductor switches, or any other sufficient technology, such as IGBTs, MOSFETs, JFETs, Bipolar-Transistors, etc. It needs to be noted that Gallium Arsenide power semiconductor switches may provide similar advantages as Gallium Nitride power semiconductor switches but require a larger chip area. The term power semiconductor typically refers to semiconductors with a nominal current rating of more than 1 A, preferably more than 2 A, and most preferably more than 5 A. In an embodiment the battery assembly may comprise a plurality of battery cells, supercapacitors or fuel cells connected in series and/or parallel. In an embodiment the battery assembly, or power converter, may comprise a semiconductor stage, and the power converter may comprise an internal boost, buck or buck-boost stage with or without an input filter stage between the converter and the battery, or, the input filter stage can be embedded in the said boost, buck-boost or buck converter. It should be understood that the input filter stage and the boost stage may take any suitable form/configuration. For example, the boost stage may be isolated or non-isolated, with switching frequency the same or different with respect to the semiconductor stage. The input filter stage and the boost stage might be controlled by the same or separate microcontroller(s). It should also be understood that the smart battery module may embody different protection equipment such as fuses, surge-protection and overvoltage protection, TVS diodes, relays. Optionally, the smart battery module may embody different voltage measurements, such as battery voltage measurement, inner converter DC voltage measurement, output terminal voltage measurement. Optionally, the smart battery module may embody current measurements, such as the measurement of the battery current and the output terminals current. Optionally, the smart battery module may embody temperature measurements, such as one or multiple temperature measurement of the battery assembly, as well as one or multiple temperature measurement of the converter. Optionally, the smart battery module may embody battery monitoring and balancing system of a battery assembly.

In a further embodiment of the first aspect, the power converter can comprise an output end connected to the terminals, wherein the power converter can comprise an electrical bypass circuit configured to short-circuit the terminals. The bypass circuit can be a controllable bypass circuit so that the terminals can be selectively and controllably bypassed. So, preferably, regardless of its structure, the power converter will have two input terminals (two wires providing an input voltage, B+ and B−) and two output terminals (two wires providing an output voltage T+ and T−). So, preferably, the converter output is the two output terminals T+ and T−. Switches within the converter (preferably switches within the output stage of the converter) can connect this output terminals either to a inner DC voltage with a positive or negative polarity (C+ and C−), or bypass the output terminals T+ and T− (short circuit them), as part of the regular modulation function of the inner DC voltage.

In a different embodiment of the first aspect, the electrical bypass circuit can comprise a switch and/or a second GaN power semiconductor switch interconnected between the terminals. The switch can be configured as a mechanical switch, such as a relay or contactor. The mechanical switch can be designed as a normally closed or normally open. Alternatively, or in addition, the second GaN power semiconductor switch can be configured as a normally-on or normally-off semiconductor switch. Preferably, the principal role of the second GaN power semiconductor switch is the switching function, i.e. the modulation of the output voltage. Additionally having the second GaN power semiconductor switch as part of the semiconductor stage 311 may provide protection for the power converter, allowing the output terminals to be bypassed permanently or temporarily, or by an external bypass mechanism, such as a relay, contactor, diode, thyristor.

In a specific embodiment of the first aspect, the electrical bypass circuit can be comprised in the semiconductor stage; thus, the electrical bypass circuit can be a part of the semiconductor stage.

In another embodiment of the first aspect, the smart battery module can comprise a controller operably coupled to the semiconductor stage and configured to control the semiconductor stage for regulating the voltage conversion of the DC voltage into the output voltage. In particular, the controller can be operably coupled, e.g. via a signal bus or other control line, to one or all semiconductor switches included in the semiconductor stage. The controller can be provided as a programmable processor, microcontroller (including embedded system), field programmable array, etc. Alternatively, the controller can be configured as a mixed-signal circuit comprising analogue and digital components. The controller can be programmed to execute instructions according to the program. Alternatively, the controller can be implemented with analogue components and must not comprise any digital components.

In a further embodiment of the first aspect, the controller can be configured to control a duty cycle of the first GaN power semiconductor switch, and preferably of the second GaN power semiconductor switch, in dependency of a setpoint provided by a control unit external to the smart battery module for regulating the output voltage. The setpoint can be a voltage setpoint, or a current setpoint, or a combination thereof. As mentioned before, the controller can be operably coupled to the first and second GaN power semiconductor switch. The external control unit can be a vehicle control unit, propulsion control unit, energy supply control unit or a different electronic control unit, typically foreseen to control vehicle, energy supply, propulsion, or aircraft operation or functions. The external control unit can be operably coupled to the controller via a bus system, such as a vehicle bus or field bus. In an embodiment a setpoint may be provided by a control unit external to the smart battery module (e.g. a central controller), but that setpoint may be adjusted by the local controller of the smart battery module. The setpoint may be adjusted by the local controller of the smart battery module so as to perform various balancing functions.

In another embodiment of the first aspect, the controller can be configured to operate the first GaN power semiconductor switch in consecutive switching cycles, wherein the controller can be adapted to synchronise the timing of each switching cycle, or, to periodically synchronize the timing of the switching cycle, in dependency of a synchronisation signal provided by a synchronisation unit external to the smart battery module. In addition, the second GaN power semiconductor switch can be operated correspondingly but alternating with the first GaN power semiconductor switch. The switching cycles can be periodic and can have a predefined length or period. The external synchronisation unit can be comprised in or can be a part of the control unit. The controller can comprise an integrated clock-generating module or unit that can synchronise its clock with the synchronisation signal provided by the external synchronisation unit. The switching signals for the GaN power semiconductor switch(es) can be dependent on the clock of the integrated clock-generating module. The external unit can recurringly transmit the synchronisation signal, e.g. preferably every second, more preferably every minute, and most preferably less frequently than every minute.

In a different embodiment of the first aspect, the period of the consecutive switching cycles can be preferably smaller than 10 μs, more preferably smaller than 5 μs, most preferably smaller than or equal to 4 μs. In return, the switching frequency correspondingly can account for higher than 100 kHz, more preferably higher than 200 kHz, or more preferably higher than or equal to 250 KHz. Such a high switching frequency of the GaN power semiconductor switch(es) can reduce electromagnetic interference, thanks to low voltage and/or current ripples and enable the use smaller filtering stages. In an embodiment the switching frequency may be below 100 kHz. In an embodiment the switching frequency may be in the range 1 kHz to 1 MHz; e.g. in the range 1 kHz to 1 MHz per smart battery module.

In another embodiment of the first aspect, the controller can be arranged to vary the timing of each switching cycle in dependency on a timing setpoint provided by the unit external to the smart battery module. The external unit can simply transmit said timing setpoint or value to the controller, and the controller can vary the timing of the start or end of each switching cycle in response and in dependency on the said timing setpoint.

In a different embodiment of the first aspect, varying can comprise delaying the timing of each switching cycle with reference to the timing synchronised. Once the integrated clock-generating module or unit is synchronised, the timing of the switching cycles can be variably delayed in dependency on a timing setpoint provided by the unit external. In an embodiment, such as in the case of phase-shifted carrier modulation for example, carrier generators are synchronized. Synchronization is preferred because internal clocks (which serve as a time base for carrier generation) of different smart-battery modules may diverge and may create an error in phase (time) delay between carrier start times. It should be understood that the any suitable modulation scheme may be used in the embodiments described in the present disclosure; phase-shifted carrier modulation is one possible example of a modulation scheme that can be used. In another embodiment, level-shifted modulation is applied, preferably when synchronized carriers are required. In another embodiment modulation nearest-level modulation is applied.

In a further embodiment of the first aspect, the controller can be arranged to control the switch and/or the second GaN power semiconductor switch from a non-conductive state into a conductive state in response of a failure condition detectable by the controller in the smart battery module. In case of a failure, such as an internal short circuit, insulation failure, low state of charge of battery cells, etc. the controller can short-circuit the terminals such that the smart battery module does not output any voltage or current. In particular, when a device, such as a load, is connected to the smart battery module, the load can detect a clear no-voltage signal at its input end and, therefore, determine that the smart battery module is in a failure state. An additional control or signal line between the smart battery module and the load can be omitted.

In another embodiment of the first aspect, the output voltage can be provided in the form of a pulsed DC voltage. With pulsed DC voltage, the corresponding components for smoothing the output voltage can be omitted. The lack of these components can make the smart battery module less complex and thus lightweight.

Even though the individual embodiments of the first aspect cover different aspects of the disclosure, some or all embodiments can be combined when it is useful and feasible from a technical standpoint.

In a second aspect of the disclosure, an electrical power supply system is disclosed. The electrical power supply system can be suitable for an electric or hybrid aircraft and other applications.

The electrical power supply system comprises:

a string of a plurality in series connected smart battery modules according to the first aspect (including any embodiment or a combination thereof), wherein the string is configured to provide a common output voltage.

The common output voltage can correspond to a sum of output voltages outputted by each smart battery module.

The plurality in series connected smart battery modules can also be termed string. The voltage supplied by the electrical power supply system can be correspondingly scaled by connecting smart battery modules in series and operating them. In addition, by controlling the average voltage of the output voltage of each smart battery module comprised in the string, the common output voltage of the electrical power supply system can be variably set or controlled. In fact, every smart battery module can contribute with its output voltage (including zero volts in case of at least one bypassed smart battery module) to a portion of the total common output voltage of the electrical power supply system.

The electrical power supply system featuring the smart battery module can inherit all the advantages outlined in the first aspect (including any embodiment) and more. The voltage supplied by the electrical power supply system can be variably controlled, thereby providing an adaptable output voltage for various applications. Specifically, the output voltage supplied by the electrical power supply system can be independent of the state of charge of the battery modules or battery cells comprised in each smart battery module, thanks to the control of each related output voltage. Also, faults or failures of one smart battery module in the corresponding string can be compensated by simply bypassing the one smart battery module and increasing (or decreasing) the output voltage of the remaining smart battery modules.

The electrical power supply system of the aspects described in the disclosure can have a higher availability and reliability than the electrical power supply system classically used in the industry.

In a first embodiment of the second aspect, the electrical power supply system can comprise an inductance connected in series with the string. The inductance can be configured as an inductor or choke comprising ferrite materials. More preferably, the inductance is provided in the form of a conductor or cable of which a given parasitic inductance is used to establish a required impedance. The inductance can be used to reduce the voltage and/or current ripple of the common output voltage. More preferably, the inductance is provided in the form of a conductor or cable of which a given self inductance is used to establish the inductance of the string. The inductance can be used to reduce the common output voltage ripple and/or string current ripple, and/or to allow control of the string current.

In a second embodiment of the second aspect, the electrical power supply system can comprise a plurality of strings connected in parallel, wherein the parallel connected strings can be configured to supply a common output current corresponding to a sum of output currents outputted by each string. By paralleling multiple strings, the current output capability can be increased. Each string can thereby contribute to the common output current. This can also include zero ampere, or a negative output current supplied by an individual string.

In a third embodiment of the second aspect, the electrical power supply system can comprise a plurality of inductances; at least one inductance can be connected in series with a corresponding string. Each string can feature at least an inductance similarly configured as outlined before (choke, conductor, cable).

In a further embodiment of the second aspect, the electrical power supply system can further comprise a control unit operably coupled to the controller of each smart battery module and configured to set an output voltage and/or current setpoint for each controller individually or configured to set an output voltage and/or current setpoint for all controllers collectively. The control unit can be configured as indicated in the first aspect. In particular, it can be configured as a programmable control unit. The control unit can be operably connected to the controllers of the smart battery module through a bus or different uni- or bi-directional communication system, such that the control unit can exchange signals and data with the controllers of the smart battery modules.

In a different embodiment of the second aspect, the control unit can be configured to set the output voltage and/or current setpoint or setpoints to a predetermined fixed value, or the control unit can be configured to vary the output voltage and/or current setpoint or setpoints in dependency of a control value provided by a control instance external to the electrical power supply system. Setting the output voltage and/or current setpoint to a predetermined or predefined fixed value can be useful when the electrical power supply system supplies a DC voltage. When the electrical power supply system provides a voltage with variable amplitude, the control value can be changed over time, thereby being time-variant, such that the electrical power supply system can output said variable voltage, such as a AC voltage of any form (sinusoidal, trapezoidal, triangular, quasi-rectangular, or else). The control value or a plurality of control values can be stored in a memory in the control unit and can be self-sufficient or independent from other control units or control instances for controlling the common output voltage by setting or controlling the individual output voltages of the smart battery modules.

In another embodiment of the second aspect, the control unit can be configured to provide a synchronisation signal to the controllers of the smart battery modules for synchronising the timing of the consecutive switching cycles of the smart battery modules. In return, each controller can synchronize its internal clock unit to the synchronisation signal provided by the control unit. Alternatively, or in addition, the control unit can be configured to provide a timing setpoint to the controllers of the smart battery modules for varying the timing of each switching cycle with reference to the timing synchronised. Alternatively, or in addition, the control unit may be configured to provide the information regarding the total number of healthy smart battery modules in the string as well as the order of the smart battery module in the string. The order of the smart battery modules can be a dynamically-changing variable in the range [1, N], uniquely identifying each smart battery module, where N represents the total number of operational (or healthy) smart battery modules in the string. In an embodiment an operational (or healthy) smart battery module may be a fully operational or fully functional smart battery module, without fault or defects. In an embodiment a non-operational (or unhealthy) smart battery module may be a smart battery module that is not fully operational and/or not fully functional, and/or has one or more faults and/or has one more defects. In an embodiment an operational (or healthy) smart battery module may be a smart battery module that can operate above a predefined threshold of its full operation (e.g. the predefined threshold may be 80%, in which case the smart battery module may be considered operational or healthy if is it able to operate above 80% of its full operation). In an embodiment a non-operational (or unhealthy) smart battery module may be a smart battery module that can only operate below a predefined threshold of its full operation i.e. the smart battery cannot operate at or above a predefined threshold of its full operation (e.g. the predefined threshold may be 80%, in which case a smart battery module is non-operational (or unhealth) if is it unable to operate at, or above, 80% of its full operation). For example, an operational (or healthy) smart battery module may be, defined by any one or more of the following characteristics: a smart battery module that has not detected a permanent overvoltage (e.g. 4.2 V per battery cell typically) or undervoltage (e.g. 2.45 V per battery cell typically) of its battery assembly; 2) a smart battery module that has not reached minimal predefined state-of-health defined by the application (e.g. 80% of its full functionality); 3) a smart battery module that has not detected an overtemperature of its battery assembly or any of its conversion stages or auxiliary components; 4) a smart battery module whose state-of-charge is in a predefined range e.g. range 5-100%; 5) a smart battery module without a significant imbalance between the battery cells within the battery assembly; 6) a smart battery module that has not detected an internal overcurrent alarm; 7) a smart battery module that has not experienced a communication issue, where the communication with the central controller is interrupted or considered invalid; 8) a smart battery module that has not detected failure of any of its internal switching converters or of their parts (semiconductors, gate-drivers, voltage and current measurements); 9) a smart battery module that has no uncontrolled behavior of the microcontroller. Likewise, a non-operational (or unhealthy) smart battery module may be, for example, the contrary of any one or more of aforementioned characteristics 1)-9).

In a further embodiment of the second aspect, a control value of the output voltage and/or current setpoint provided by a control instance external to the electrical power supply system can be a time-invariant control value. The control instance can be an overarching control instance, different from the control unit mentioned before. For example, when the control unit is foreseen as a propulsion or supply control unit, the control instance can be a controller of a higher level and can act as a vehicle control unit, etc.

In another embodiment of the second aspect, the common output voltage can be a DC voltage with a residual periodic variation of the DC voltage level for supplying a DC load external to the electrical power supply system. The residual periodic variation can originate from the operation of the in-series connected smart battery modules, which output the pulsed DC voltage synchronously or time-delayed to each other.

In a different embodiment of the second aspect, a control value of the output voltage and/or current setpoint provided by the control instance external to the electrical power supply system can be a time-variant control value. This can mean that the control value changes over time, such that the control instance instructs the electrical power supply system to vary the common output voltage, such as for providing an AC voltage.

In a further embodiment of the second aspect, the common output voltage can be an AC voltage for supplying an AC load external to the electrical power supply system, or an AC voltage superimposed onto a DC voltage.

In a further embodiment of the second aspect, the electrical power supply system can comprise at least three strings, wherein the strings can be commonly connected at one end to form a star point and configured to output the AC voltage, or an AC voltage superimposed to the DC voltage, relative to the star point at each end different from the one end, wherein the AC voltage outputted at each end different from the one end can have a mutually different phase. The electrical power supply system can provide a three-phase AC voltage in this configuration. Alternatively, or in addition, the said electrical power supply system may be configured as an AC system that can provide an arbitrary number of phases, forming a multiphase AC source, such as 1-phase, 3-phase, 5-phase, 6-phase, 12-phase, for example.

Even though the individual embodiments of the second aspect cover different aspects of the disclosure, some or all embodiments can be combined when it is useful and feasible from a technical standpoint.

In a third aspect of the disclosure, a propulsion system is disclosed. The propulsion system is suitable for electric or hybrid aircraft and other electrical applications and/or vehicles.

The propulsion system comprises:

- the electrical power supply system of to the first aspect (including any embodiment or a combination thereof) and a DC load connected to the electrical power supply system; or
- the said electrical power supply system and an AC load connected to the electrical power supply system; or
- at least one three-phase (or multiphase) AC load, a three-phase (or multiphase) AC source, and the said electrical power supply system, wherein the electrical power supply system being arranged to interconnect the AC load with the e AC source for converting electrical energy supplied by the AC source into electrical energy receivable by the AC load. Preferably the propulsion system comprises:
- the electrical power supply system of to the first aspect (including any embodiment or a combination thereof) and a DC load connected to the electrical power supply system; or
- the said electrical power supply system and an AC load connected to the electrical power supply system; or
- at least one three-phase (or multiphase) AC load with an AC source for converting electrical energy supplied by the AC source into electrical energy receivable by the AC load. Alternatively, or in addition, the propulsion system may be configured for storing a surplus of generated energy in one or more batteries of the smart battery module. In an embodiment AC source is configured so that it can charge the one or more batteries of the smart battery module. The propulsion system may be configured to supply the AC load partially or fully from the stored energy. In an embodiment the propulsion system may comprises a DC source instead of an AC source, which can charge the one or more batteries of the smart battery module. In an embodiment the propulsion system may comprise an DC load instead of an AC load. The DC load can be a motor converter with an intermediate DC link, or any other component that inputs a DC voltage and converts the electric energy into mechanical energy for propelling a vehicle, such as a DC motor. The advantage can be evident, as the electrical power supply system can directly supply the DC load with sufficient electric energy.

The AC load can be an electric AC motor directly connected to the electrical power supply system or any other component that inputs an AC voltage and converts the electric energy into mechanical energy for propelling a vehicle. This advantage can also be evident, as most motor converters known from literature use an intermediate DC link. The intermediate DC link can be omitted by directly connecting the AC load to the electrical supply system, saving space and costs and increasing reliability, as the capacitors used for intermediate DC links can be fault-prone. In addition, it can improve the propulsion system's efficiency, as an intermediate energy conversion can be omitted. In the present disclosure a DC source may be a stack of fuel cells, generating a DC voltage. In the present disclosure the AC load may be an electric motor, or any high power ac load. The electrical propulsion system of the present disclosure can be used to carry out DC to AC conversion, but also as an energy buffer to provide the power difference between the load and the source.

In an embodiment the AC source and/or DC load are external to the propulsion system (in other words the AC source and/or DC load are not part of the propulsion system, but the propulsion system is operably connected to the AC source and/or DC load). In other words, the propulsion system comprises—the electrical power supply system of to the first aspect (including any embodiment or a combination thereof) and a DC load connected to the electrical power supply system. In another embodiment the propulsion system comprises the electrical power supply system of to the first aspect (including any embodiment or a combination thereof) an AC source connected to the electrical power supply system. In another embodiment the propulsion system comprises the electrical power supply system of to the first aspect (including any embodiment or a combination thereof) and a means to operably connect the electrical power supply system to an AC source and/or a means to operably connect the electrical power supply system to a DC load. In such a case, the said propulsion system can perform the rectification function, but also serve as an energy buffer between the AC source and the dc load, allowing the AC source to operate at is most efficient operating point. A DC load can be a motor controller operably coupled with an AC motor, with its DC link taking the DC electric energy at its input and converting it to an AC electric energy at the motor inputs. An AC source can be an external AC source or an onboard AC generator.

The three-phase AC source can supply electric energy as a three-phase AC voltage and a corresponding current, such as a three-phase electric generator. The three-phase AC load can receive electric energy in the form of a corresponding three-phase AC voltage, whereby the electrical power supply system can be situated between the three-phase AC source and the three-phase AC load to convert the electric energy received from the source into electric energy sufficient for the load. A rectifier for converting the AC voltage supplied by the AC source into a DC voltage suitable for a motor converter with a DC link is omitted. Instead, the AC voltage supplied by the AC source can be directly converted into an AC voltage sufficient for the AC load. It can reduce weight and complexity, increasing the propulsion system's overall efficiency. For instance, the AC source can be operated at its optimal operating point, having the highest efficiency. The conversion of electric energy can include the conversion of voltage, current and/or frequency.

As one may notice, the electrical supply system can be used as a DC or AC supply (including any phase numbers) by simply connecting the strings into the desired electrical configuration (in series, parallel, start or delta, and/or zig-zag, etc.) and programming the control unit correspondingly. Consequently, the electrical supply system can be flexibly used in a magnitude of applications, such as the one acting as a propulsion system.

In a first embodiment of the third aspect, when the propulsion system comprises the said electrical power supply system outputting a DC voltage, the DC load can be configured as a motor controller provided with a DC link circuit. The DC link circuit can also be referred to as an intermediate DC link. A plurality of motor controllers can be connected to the electrical power supply system. The DC load can also be a DC charger configured to deliver the electric energy from the vehicle to the grid. Alternatively, the DC load can be a battery pack of another aircraft connected to hybrid aircraft with the said electric power system.

In a second embodiment of the third aspect, when the propulsion system comprises the said electrical power supply system outputting an AC voltage, the AC load can be configured as an electric motor. A plurality of electric motor controllers can be connected to the electrical power supply system. In an embodiment a plurality of electric motors are operably connected to a plurality of AC electric propulsion systems. In an embodiment a plurality of electric motors which share the same mechanical shaft, are operably connected a single electrical propulsion system.

In a third embodiment of the third aspect, the electric motor can be configured as a single-phase or three-phase AC motor.

In a further embodiment of the third aspect, the single-phase or three-phase AC motor can be configured with a stator, wherein the stator comprises a set of main stator windings and a set of auxiliary stator windings. The set of auxiliary stator windings can be energised in the presence of a fault in the main stator windings, thereby providing redundancy, which can increase the overall safety of the propulsion system.

In another embodiment of the third aspect, when the propulsion system comprises the said electrical power supply system converting an AC voltage into an AC voltage, the three-phase AC source can be configured as an electric generator, and the at least one three-phase AC load can be configured as a three-phase motor.

In a different embodiment of the third aspect, the electrical power supply system can be configured to convert the AC voltage supplied by the electric generator into an AC voltage with a different amplitude and/or frequency for supplying the at least one three-phase AC motor with a variable AC voltage can have a time-variant voltage and/or frequency.

Even though the individual embodiments of the third aspect cover different aspects of the disclosure, some or all embodiments can be combined when it is useful and feasible from a technical standpoint.

In a fourth aspect of the disclosure, an electric or hybrid aircraft is disclosed.

The said aircraft comprises:

- at least one smart battery module according to the first aspect (including any embodiment or a combination thereof), or
- the electrical power supply system according to the second aspect (including any embodiment or a combination thereof); or
- a propulsion system according to the third aspect (including any embodiment or a combination thereof).

When the electric or hybrid aircraft features the at least one smart battery module, the electrical power supply system, and/or propulsion system, it can inherit all the advantages outlined herein before. In particular, the overall safety, reliability, and efficiency can be improved while reducing the weight of the aircraft, which can extend, in return, the range. In addition, the costs compared to conventional modules or systems can be reduced.

In a fifth aspect of the disclosure, a method for controlling a voltage average of an output voltage of a smart battery module of the first aspect (including any embodiment or a combination thereof) is disclosed.

The method comprises the steps of:

- receiving a setpoint from a unit (e.g. control unit) that is external to the smart battery module;
- converting the DC voltage into the output voltage. The setpoint may be a voltage setpoint and or current setpoint.

In an embodiment the method further comprises, the local controller of the smart battery module adjusting the setpoint. In an embodiment the respective local controller of each smart battery module adjusts the set point so as to balance the smart battery modules in the string. In an embodiment the local controller adjusts the set point so as to balance any one or more of voltage, temperature, state of charge (SOC), state of health (SOH), of the smart battery modules in the string.

In an embodiment the method further comprises controlling the voltage average of the output voltage depending on the setpoint.

The disclosure for the output voltage, the voltage average, etc. provided herein before can apply correspondingly. In particular, the unit external to the smart battery module can be the control unit of the electrical power supply or propulsion system.

In a first embodiment of the fifth aspect, the method can comprise the steps of:

receiving a voltage setpoint and or current setpoint (or current limit) from a control until (preferably from a control unit external to the smart battery module);

receiving a synchronisation signal from the unit external to the smart battery module;

synchronising a timing of consecutive switching cycles in dependency of a synchronisation signal;

operating a first and preferably a second GaN power semiconductor switch based on received voltage setpoint and or current setpoint (or limit) and/or based on the synchronised timing.

Preferably, in a first embodiment of the fifth aspect, the method can comprise the steps of:

receiving a voltage setpoint and or current setpoint (or current limit) from a control until (preferably from a control unit external to the smart battery module);

receiving a synchronisation signal from the unit external to the smart battery module;

synchronising a timing of consecutive modulation carriers in dependency of a synchronisation signal;

operating a first and preferably a second GaN power semiconductor switch based on the synchronised timing and/or the received voltage setpoint and/or current setpoint (or limit).

Operating the smart battery module, in particular its consecutive switching cycles in a time synchronous manner with respect to the synchronisation signal can reduce electromagnetic interference or emissions, as the spectrum emitted (including the harmonics) can be predictable and dedicated measures for filtering can be foreseen.

In a second embodiment of the fifth aspect, the method can comprise the steps of:

receiving a timing setpoint from the unit external to the smart battery module;

varying the timing of consecutive switching cycles based on timing setpoint. Preferably, in a second embodiment of the fifth aspect, the method may further comprise the steps of, receiving the order of the smart battery modules in the string and the total number of operational smart battery modules in the string; determining a timing setpoint for the timing of consecutive switching cycles based on the received order of the smart battery modules in the string and the total number of operational smart battery modules in the string. Preferably a timing set point for the timing of consecutive switching cycles is determined at each smart battery module in the string. In a preferred embodiment the method comprises the steps of, receiving the order of the smart battery modules in the string and the total number of operational smart battery modules in the string; receiving a voltage setpoint for the string of battery modules; determining a timing setpoint for the timing of consecutive switching cycles, and adjusting the output voltage of each respective smart battery module in the string so that the voltage setpoint for the string is achieved, based on the received order of the smart battery modules in the string and the total number of operational smart battery modules in the string. In an embodiment the semiconductor stage of each smart battery module in the string is operated so that the voltage setpoint for the string is achieved at the output of the string. Preferably, the voltage setpoint for the string is received by the respective local controller of each the smart battery module in the string. Preferably the voltage setpoint for the string is provided by a control unit. Preferably the local controller of each smart battery module operates the semiconductor stage of its respective smart battery module so that the voltage setpoint for the string is achieved at the output of the string.

In an embodiment the local controller of one or more of the smart battery modules in the string (preferably each of the respective local controllers of each of the respective smart battery modules in the string) is configured to monitor any one or more of, voltage and/or temperature monitoring, and/or state of health (SOH), and/or state of charge (SOC). In an embodiment the local controller of one or more of the smart battery modules in the string (preferably each of the respective local controllers of each of the respective smart battery modules in the string) is configured to adapt the output voltage and/or power of the smart battery module to ensure voltage and/or temperature and/or state of health (SOH) and/state of charge (SOC), is equal to the other smart battery modules in the string (e.g. in the string of smart battery modules in an electric propulsion system).

In a third embodiment of the fifth aspect, the method can comprise the steps of:

detecting a failure in the smart battery module;

adjusting a bypass switch and/or a second GaN power semiconductor switch from a non-conductive state into a conductive state. It can also comprise the step of sending a signal that indicating the detection of the failure to a control unit (preferably the control unit is external to the smart battery module). The control unit may be configured to adapt the voltage and/or timing setpoint(s) in response to the indication of the failure.

Even though the individual embodiments of the fifth aspect cover different aspects of the disclosure, some or all embodiments can be combined when it is useful and feasible from a technical standpoint. The steps indicated for the fifth aspect can be processed or executed by a controller or other control instance in the order as defined. However, some of the steps may be executed or processed more frequently than others.

In a sixth aspect of the disclosure, a method for operating an electrical power supply system of the second aspect (including any embodiment or a combination thereof) is disclosed.

The method comprises the step of:

transmitting a common setpoint or a plurality of individual setpoints to each controller comprised in a plurality of smart battery modules for providing common output voltage.

The disclosure for the common setpoint, plurality of individual setpoints, common output voltage, etc. provided herein before can apply correspondingly.

In a first embodiment of the sixth aspect, the method can comprise the step of:

transmitting a synchronisation signal to each controller for synchronising the timing of each switching cycle of the plurality of smart battery modules.

It can be important, especially for the electromagnetic emission or interference, that the plurality of smart battery modules operate in a time synchronous manner to each other.

In a second embodiment of the sixth aspect, the method can comprise the step of:

transmitting a timing setpoint to each controller for varying the timing of each switching cycle of the plurality of smart battery modules.

In a third embodiment of the sixth aspect, the method can comprise the step of:

determining one timing setpoint for each controller;

transmitting the timing setpoint determined for each controller to the respective controller.

In a further embodiment of the sixth aspect, the method can comprise the steps of:

setting the common setpoint or the plurality of individual setpoints to a time-invariant control value; or varying a control value of the common setpoint or the plurality of individual setpoints over time.

In another embodiment of the sixth aspect, the method can comprise any one or more of the following steps:

measuring the temperature of the individual smart battery modules, determining the average temperature of the measured temperatures; and communicating the average temperature of the smart battery modules in the string and/or (part of) the system, to the corresponding group of smart battery modules (preferably to the local controller of each respective smart battery module in the string); and/or measuring the battery module voltage values of the individual smart battery modules, determining the average voltage of the measured battery module voltage, and communicating their average voltage in to the each of the smart battery modules in the string (preferably to the local controller of each respective smart battery module in the string); and/or measuring the state-of-health (SOH) of the individual smart battery modules, determining the average state of health of the measured states of health, and communicating their average state of health to each of the smart battery modules in the string and/or (part of) the system (preferably to the local controller of each respective smart battery module in the string); and/or measuring the state-of-charge (SOC) of the individual smart battery modules, determining the average state of charge of the measured states of charge, and communicating their average state of charge to each of the smart battery modules in the string and/or (part of) the system (preferably to the local controller of each respective smart battery module in the string).

In another embodiment of the sixth aspect, the method can comprise the steps of:

receiving a notification on the detection of a failure from a smart battery module;

determining a new control value or values;

varying the control value of the common setpoint or the plurality of individual setpoints over time using the new control value or values.

This can be useful, as the functioning smart battery modules can compensate for the failure.

Even though the individual embodiments of the sixth aspect cover different aspects of the disclosure, some or all embodiments can be combined when it is useful and feasible from a technical standpoint. The steps indicated for the sixth aspect can be processed or executed by a controller or other control instance in the order as defined. However, some of the steps may be executed or processed more frequently than others.

In a seventh aspect of the disclosure, a method for operating a propulsion system of the third aspect (including any embodiment or a combination thereof), is disclosed.

The method comprises the steps of:

determining a common setpoint or a plurality of individual voltage and/or current setpoints;

transmitting said setpoint or setpoints to the respective controller comprised in a plurality of smart battery modules.

In a first embodiment of the seventh aspect, the method can comprise the steps of:

setting the common setpoint or the plurality of individual setpoints to a time-invariant control value if a DC load is to the connected propulsion system; or varying a control value of the common setpoint or the plurality of individual setpoints over time if an AC load and/or an AC source is connected to the propulsion system.

In a second embodiment of the seventh aspect, said setpoint or setpoints can be determined in dependency on a control value provided by a control instance external to the propulsion system. The control instance can be the vehicle controller or any other control instance taking care of vehicle functions.

Even though the individual embodiments of the seventh aspect cover different aspects of the disclosure, some or all embodiments can be combined when it is useful and feasible from a technical standpoint.

In an eighth aspect of the disclosure, a flexibly configurable electrical power supply or propulsion system is disclosed.

The electrical power supply or propulsion system comprises an electrical power supply of the second aspect (including any embodiment or a combination thereof); or a propulsion system of the third aspect (including any embodiment or a combination thereof, and including the electrical power supply system), wherein a waveform of an output voltage supplied to a load connected to the electrical power supply or propulsion system is configurable by reconfiguring at least one control parameter in the controller. Alternatively, or in addition, the waveform of the output voltage can be exclusively dependent on the control of the common setpoint or the plurality of individual setpoints and a timing setpoint.

The advantage is evident. Instead of reconfiguring the electrical power supply or propulsion system by changing or connecting hardware components differently, reprogramming the control unit can generate different waveforms. The electrical power supply or propulsion system can be used in a wide range of applications with little effort required to reconfigure the system for different applications. This can save time and effort and can reduce costs.

In a ninth aspect of the disclosure, a use of a smart battery module of the first aspect (including any embodiment or a combination thereof) is disclosed. The smart battery module may be used in replacement of a battery module or a battery pack configured to output an uncontrolled DC output voltage. Such battery modules or battery packs are known from the prior art, wherein the use and replacement inherit all the advantages disclosed herein before.

In a tenth aspect of the disclosure, a use of an electrical power supply system of the second aspect (including any embodiment or a combination thereof) is disclosed. The electrical power supply system may be used in replacement of a DC to DC, DC to AC, AC to DC, AC to AC converter or motor controller, each configured with an intermediate DC link. Advantageously, by using the electrical power supply system in replacement allows for low-harmonics waveforms, less use of filters, redundancy and availability, improved system controllability, improved system configurability to different applications, and added safety monitoring features. Another possible advantage is that the DC link can be omitted, wherein the use and replacement inherit all the advantages disclosed herein before.

BRIEF DESCRIPTION OF THE DRAWINGS

Exemplar embodiments of the disclosure are disclosed in the description and illustrated by the drawings in which.

DETAILED DESCRIPTION

System Overview

Figure 1A:
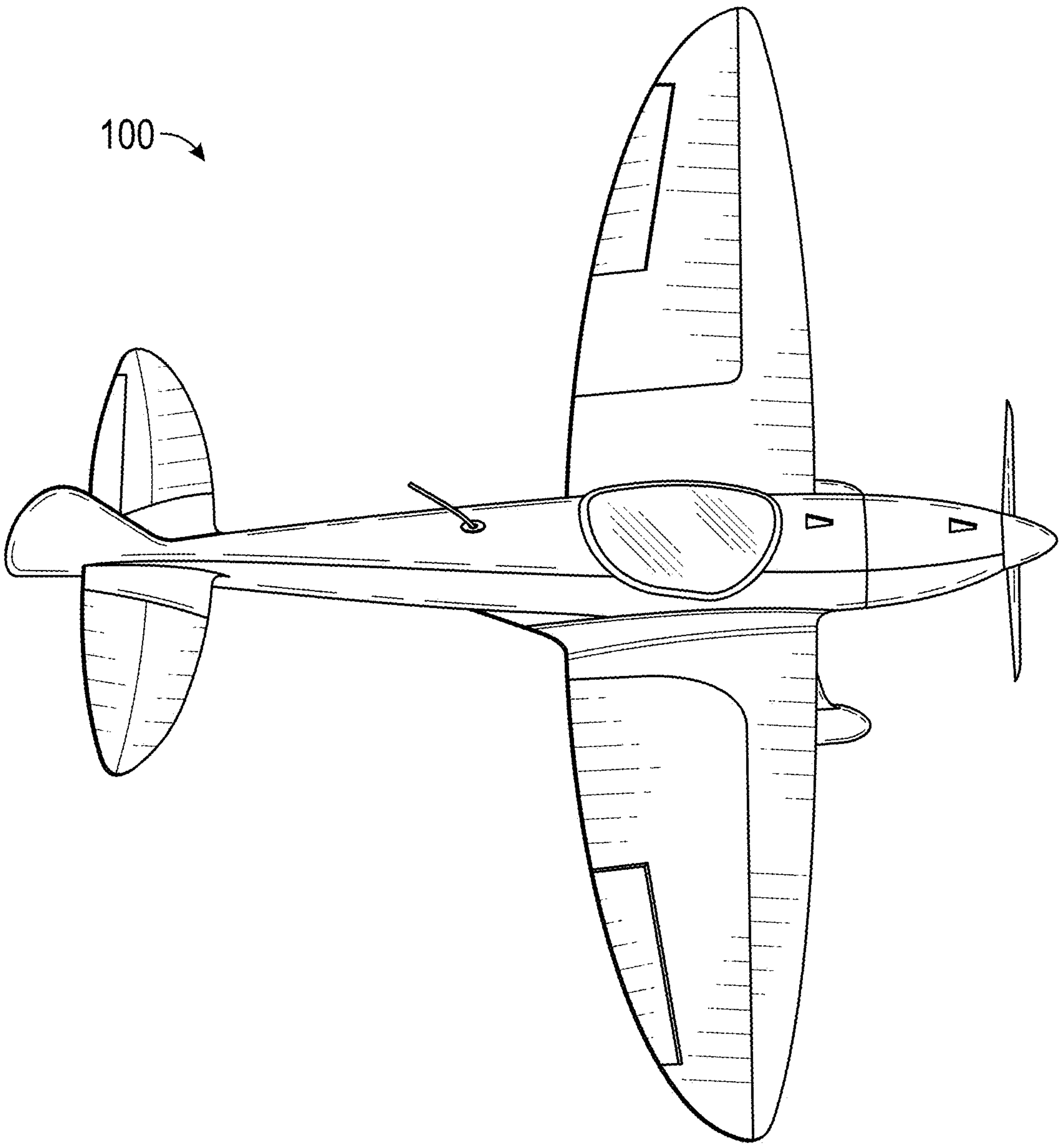
FIG. 1A illustrates an aircraft, such as an electric or hybrid aircraft.
Figure 1B:
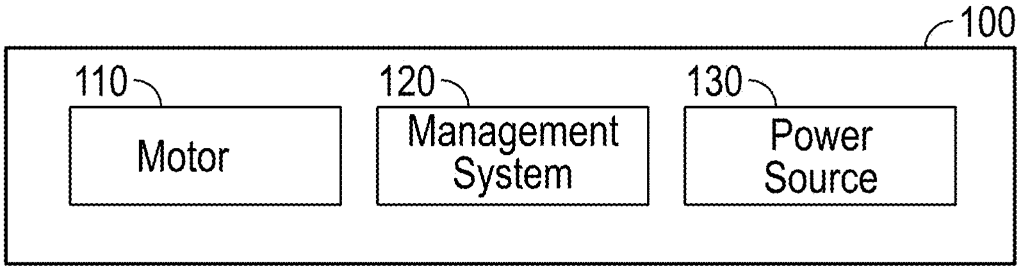
FIG. 1B illustrates a simplified block diagram of an aircraft.

FIG. 1A illustrates an aircraft 100, such as an electric or hybrid aircraft, and FIG. 1B illustrates a simplified block diagram of the aircraft 100. The aircraft 100 includes a motor 110, a management system 120, and a power source 130. The motor 110 can be used to propel the aircraft 100 and cause the aircraft 100 to fly and navigate. The management system 120 can control and monitor of the components of the aircraft 100, such as the motor 110 and the power source 130. The power source 130 can power the motor 110 to drive the aircraft 100 and power the management system 120 to enable operations of the management system 120. The management system 120 can include one or more controllers as well as other electronic circuitry for controlling and monitoring the components of the aircraft 100.

Figure 2:
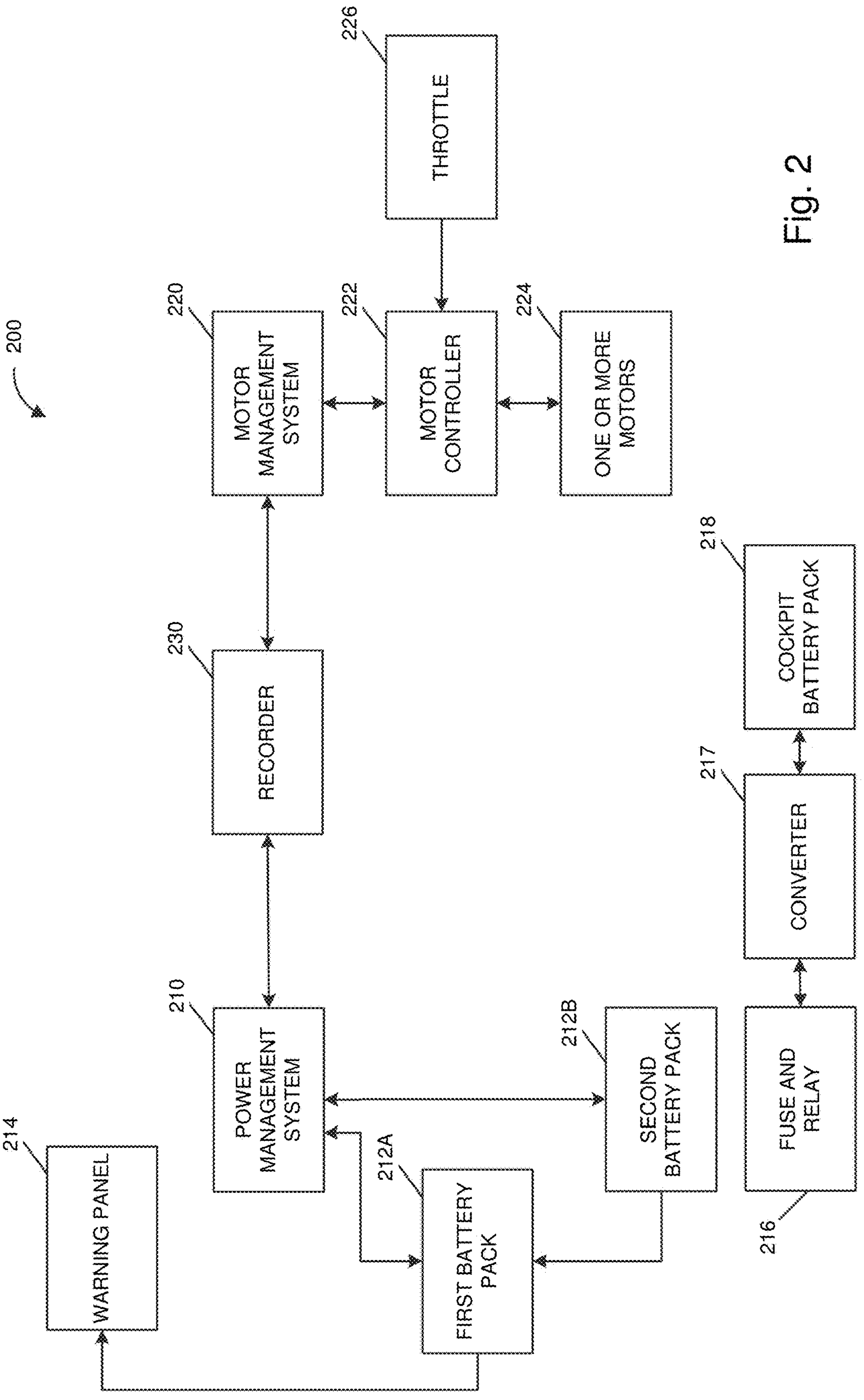
FIG. 2 illustrates management systems for operating an aircraft.

FIG. 2 illustrates components 200 of an aircraft, such as the aircraft 100 of FIGS. 1A and 1B. The components 200 can include a power management system 210, a motor management system 220, and a recorder 230, as well as a first battery pack 212A, a second battery pack 212B, a warning panel 214, a fuse and relay 216, a converter 217, a cockpit battery pack 218, a motor controller 222, one or more motors 224, and a throttle 226.

The power management system 210, the motor management system 220, and the recorder 230 can monitor communications on a communication bus, such as a controller area network (CAN) bus, and communicate via the communication bus. The first battery pack 212A and the second battery pack 212B can, for instance, communicate on the communication bus enabling the power management system 210 to monitor and control the first battery pack 212A and the second battery pack 212B. As another example, the motor controller 222 can communicate on the communication bus enabling the motor management system 220 to monitor and control the motor controller 222.

The recorder 230 can store some or all data communicated (such as component status, temperature, or over/undervoltage information from the components or other sensors) on the communication bus to a memory device for later reference, such as for reference by the power management system 210 or the motor management system 220 or for use in troubleshooting or debugging by a maintenance worker. The power management system 210 and the motor management system 220 can each output or include a user interface that presents status information and permits system configurations. The power management system 210 can control a charging process (for instance, a charge timing, current level, or voltage level) for the aircraft when the aircraft is coupled to an external power source to charge a power source of the aircraft, such as the first battery pack 212A or the second battery pack 212B.

The warning panel 214 can be a panel that alerts a pilot or another individual or computer to an issue, such as a problem associated with a power source like the first battery pack 212A. The fuse and relay 216 can be associated with the first battery pack 212A and the second battery pack 212B and usable to transfer power through a converter 217 (for example, a DC-DC converter) to a cockpit battery pack 218. The fuse and relay 216 can protect one or more battery poles of the first battery pack 212A and the second battery pack 212B from a short or overcurrent. The cockpit battery pack 218 may supply power for the communication bus.

The motor management system 220 can provide control commands to the motor controller 222, which can in turn be used to operate the one or more motors 224. The motor controller 222 may further operate according to instructions from the throttle 226 that may be controlled by a pilot of the aircraft. The one or more motors can include an electric brushless motor.

The power management system 210 and the motor management system 220 can execute the same or similar software instructions and may perform the same or similar functions as one another. The power management system 210, however, may be primarily responsible for power management functions while the motor management system 220 may be secondarily responsible for the power management functions. Similarly, the motor management system 220 may be primarily responsible for motor management functions while the power management system 210 may be secondarily responsible for the motor management functions. The power management system 210 and the motor management system 220 can be assigned respective functions, for example, according to system configurations, such as one or more memory flags in memory that indicate a desired functionality. The power management system 210 and the motor management system 220 may include the same or similar computer hardware.

The power management system 210 can automatically perform the motor management functions when the motor management system 220 is not operational (such as in the event of a rebooting or failure of the motor management system 220), and the motor management system 220 can automatically perform the power management functions when the power management system 210 is not operational (such as in the event of rebooting or failure of the power management system 210). Moreover, the power management system 210 and the motor management system 220 can take over the functions from one another without communicating operation data, such as data about one or more of the components being controlled or monitored by the power management system 210 and the motor management system 220. This can be because both the power management system 210 and the motor management system 220 may be consistently monitoring communications on the communication bus to generate control information, but the control information may be used if the power management system 210 and the motor management system 220 has primary responsibility but not if the power management system 210 and the motor management system 220 does not have primary responsibility. Additionally or alternatively, the power management system 210 and the motor management system 220 may access data stored by the recorder 230 to obtain information usable to take over primary responsibility.

System Architecture

Electric and hybrid aircraft (rather than aircraft powered during operation by combustion) have been designed and manufactured for decades. However, electric and hybrid aircraft have still not yet become widely used for most transport applications like carrying passengers or goods.

This failure to adopt may be in large part because designing an aircraft that is sufficiently safe to be certified by certification authorities may be very difficult. The certification of prototypes may moreover not be sufficient to certify for commercial applications. Instead, a certification of each individual aircraft and its components may be required.

This disclosure provides at least some approaches for constructing electric powered aircraft from components and systems that have been designed to pass certification requirements so that the aircraft itself may pass certification requirements and proceed to active commercial use.

Certification requirements can be related to a safety risk analysis. A condition that may occur with an aircraft or its components can be assigned to one of multiple safety risk assessments, which may in turn be associated with a particular certification standard. The condition can, for example, be catastrophic, hazardous, major, minor, or no safety effect. A catastrophic condition may be one that likely results in multiple fatalities or loss of the aircraft. A hazardous condition may reduce the capability of the aircraft or the operator ability to cope with adverse conditions to the extent that there would be a large reduction in safety margin or functional capability crew physical distress/excessive workload such that operators cannot be relied upon to perform required tasks accurately or completely or serious or fatal injury to small number of occupants of aircraft (except operators) or fatal injury to ground personnel or general public. A major condition can reduce the capability of the aircraft or the operators to cope with adverse operating condition to the extent that there would be a significant reduction in safety margin or functional capability, significant increase in operator workload, conditions impairing operator efficiency or creating significant discomfort physical distress to occupants of aircraft (except operator), which can include injuries, major occupational illness, major environmental damage, or major property damage. A minor condition may not significantly reduce system safety such that actions required by operators are well within their capabilities and may include a slight reduction in safety margin or functional capabilities, slight increase in workload such as routine flight plan changes, some physical discomfort to occupants or aircraft (except operators), minor occupational illness, minor environmental damage, or minor property damage. A no safety effect condition may be one that has not effect on safety.

An aircraft can be designed so that different subsystems of the aircraft are constructed to have a robustness corresponding to their responsibilities and any related certification standards, as well as potentially any subsystem redundancies. Where a potential failure of the responsibilities of a subsystem would likely be catastrophic, the subsystem can be designed to be simple and robust and thus may be able to satisfy difficult certification standards. The subsystem, for instance, can be composed of non-programmable, non-stateful components (for example, analog or non-programmable combinational logic electronic components) rather than programmable components (for example, a processor, a field programmable gate array (FPGA), or a complex programmable logic device (CPLD)) or stateful components (for example, sequential logic electronic components) and activate indicators such as lights rather than more sophisticated displays. On the other hand, where either (i) a subsystem of an aircraft monitors a parameter redundantly with another subsystem of the aircraft that is composed of non-programmable, non-stateful components or (ii) a potential failure of the responsibilities of a subsystem would likely be less than catastrophic, the subsystem can be at least partly digital and designed to be complicated, feature-rich, and easier to update and yet able to satisfy associated certification standards. The subsystem can, for instance, include a processor that outputs information to a sophisticated display for presentation.

In some implementations, some or all catastrophic conditions monitored for by an aircraft can be monitored for with at least one subsystem that does not include a programmable component or a stateful component because certifications for programmable components or stateful components may demand statistical analysis of the responsible subsystems, which can be very expensive and complicated to certify. Such implementations can moreover be counter-intuitive at least because an electric or hybrid aircraft may include one or more relatively advanced programmable or stateful components to enable operation of the electric or hybrid aircraft, so the inclusion of one or more subsystems in the aircraft that does not include any programmable components or any stateful components may be unexpected because the one or more relatively advanced programmable or stateful components may be readily and easily able to implement the functionality of the one or more subsystems that does not include any programmable components or any stateful components.

An aircraft monitoring system can include a first subsystem and a second subsystem. The first subsystem can be supported by an aircraft housing and include non-programmable, non-stateful components, such as analog or non-programmable combinational logic electronic components. The non-programmable, non-stateful components can monitor a component supported by the aircraft housing and output a first alert to notify of a catastrophic condition associated with the component. The non-programmable, non-stateful components can, for instance, activate an indicator or an audible alarm for a passenger aboard the housing to output the first alert. The indicator or audible alarm may remain inactive unless the indicator is outputting the first alert. Additionally or alternatively, the non-programmable, non-stateful components can output the first alert to a computer aboard or remote from the aircraft (for example, to automatically trigger actions to attempt to respond to or address the catastrophic condition, such as to stop charging or activate a fire extinguisher, a parachute, or an emergency landing procedure or other emergency response feature) or an operator of the aircraft via a telemetry system. The non-programmable, non-stateful components may, moreover, not be able to control the component or at least control certain functionality of the component, such as to control a mode or trigger an operation of the component.

The second subsystem can be supported by the aircraft housing and include a processor (or another programmable or stateful component), as well as a communication bus. The processor can monitor the component from communications on the communication bus and output a second alert to notify of a catastrophic condition or a less than catastrophic condition associated with the component. The processor can, for instance, activate an indicator or audible alarm for a passenger aboard the housing to output the second alert. Additionally or alternatively, the processor can output the second alert to a computer aboard or remote from the aircraft (for example, to automatically trigger actions to attempt to address the catastrophic condition, such as to activate a fire extinguisher, a parachute, or an emergency landing procedure) or an operator of the aircraft via a telemetry system. The processor may control the component. The non-programmable, non-stateful components of the first subsystem additionally may not be able to communicate via the communication bus.

An example of such a design and its benefits are next described in the context of battery management systems. Notably, the design can be additionally or alternatively applied to other systems of a vehicle that perform functions other than battery management, such as motor control.

Battery Management Example

Battery packs including multiple battery cells, such as lithium-ion cells, can be used in electric cars, electric aircraft, and other electric self-powered vehicles. The battery cells may be connected in series or in parallel to deliver an appropriate voltage and current.

Battery cells in battery packs can be managed and controlled by battery management systems (BMS). A BMS can be a circuit that manages a rechargeable battery cell by controlling its charging and discharge cycles, preventing it from operating outside its safe operating area, balancing the charge between cells, or the like. BMS can also monitor battery parameters, such as the temperature, voltage, current, internal resistance, or pressure of the battery cell, and report anomalies. BMS can be provided by various manufacturers as discreet electronic components.

Damage to battery cells can be very serious incidents that may cause fire, explosions, or interruption of the powered circuit. Therefore, any damage to a battery in a vehicle, such as an electric airplane, may desirably be reported immediately and reliably to the pilot or driver of the vehicle. A reliable monitoring of battery cells by BMS can be critical for the safety of electric airplanes.

However, BMS can have failings in rare occurrences that cause problems with battery cells which may not be reported correctly. For example, an overvoltage or overtemperature condition can, in some situations, affect not only a battery cell, but also its BMS, so that the failure of the battery cell is either not detected or not reported correctly. Even if the BMS functions correctly, a connecting bus between the BMS and the cockpit might be defective and prevent warning signals from being transmitted.

In order to prevent this risk, battery cells can be monitored with a second, redundant BMS. If both BMS are of the same type, a defect or conception flaw that affects one BMS may also affect the redundant BMS as well, so that the gain in reliability can be limited. The present disclosure provides at least approaches to increase the reliability of the detection of malfunctions of battery cells in an electric vehicle, such as an electric aircraft. Redundant monitoring of parameters of each battery cell can be performed with two different circuits. Because a second, redundant monitoring circuit may include non-programmable, non-stateful components rather than processors, sequential logic electronic components, or programmable combinational logic electronic components, its certification can be easier, and its reliability may be increased. For example, because the second, redundant circuit may be processorless (i.e. without a processor), may not include any sequential or programmable combinational logic electronic components, and may not rely on any software (for example, executable program code that is executed by a processor), its certification is made easier than if the second, redundant circuit relied on processors, sequential or programmable combinational logic electronic components, or software.

The second, redundant monitoring circuit can provide for a redundant monitoring of battery parameters and for a redundant transmission of those parameters, or warning signals depending on those parameters. The second battery monitoring system may transmit analog or binary signals but not multivalued digital signals. The second battery monitoring circuit may not manage the charge and discharge of battery cells, but instead provide for monitoring of battery parameters, and transmission of parameters or warning signals. Therefore, the second, redundant battery monitoring circuit can be made simple, easy to certify, and reliable.

Figure 3:
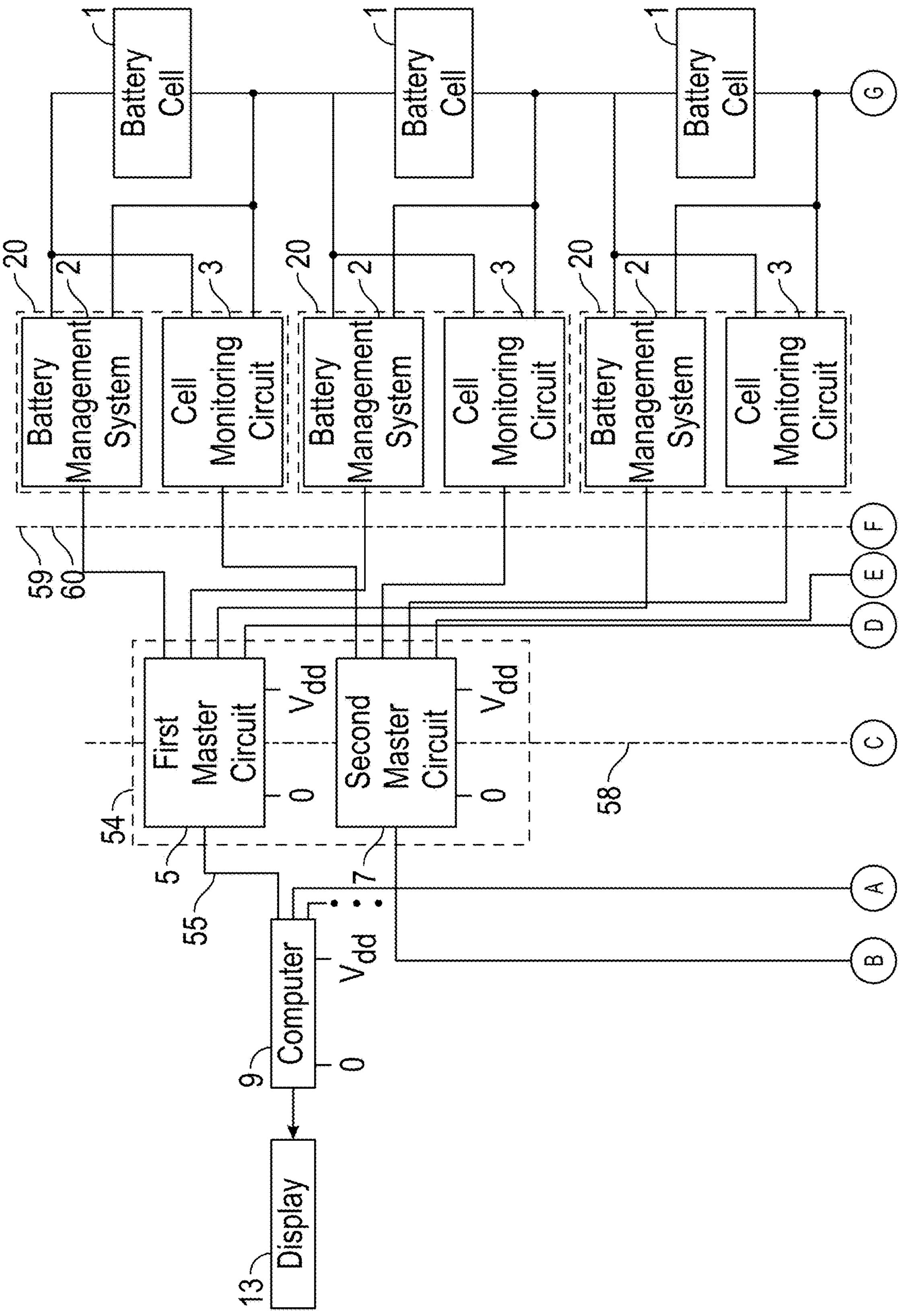
FIG. 3 illustrates an aircraft monitoring system.
Figure 3:
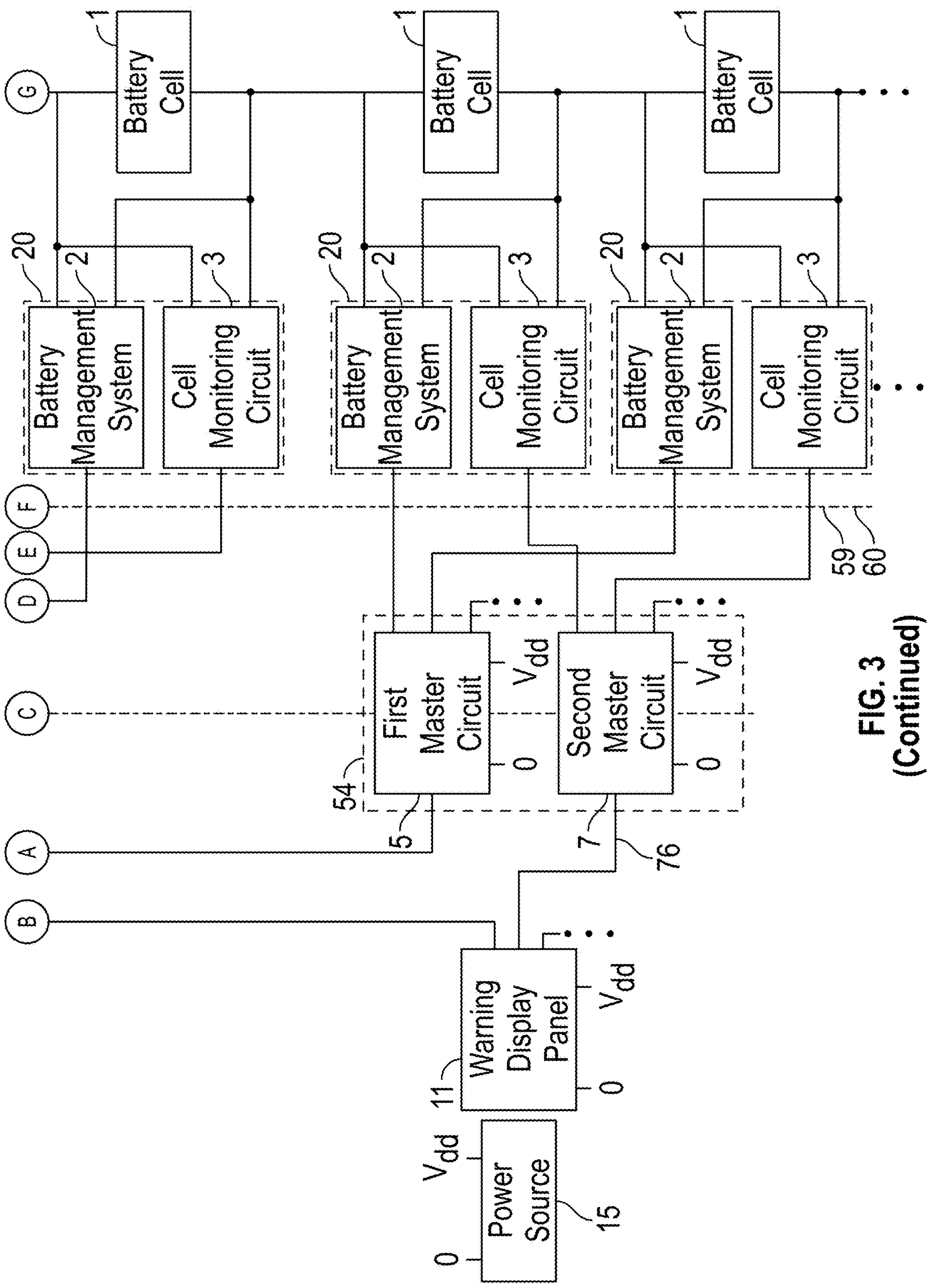

FIG. 3 illustrates a battery monitoring system. This system can be used in an electric vehicle, such as an electric aircraft, a large size drone or unmanned aerial vehicle, an electric car, or the like, to monitor the state of battery cells 1 in one of multiple battery packs and report this state or generate warning signals in case of dysfunctions.

The battery cells 1 can be connected in series or in parallel to deliver a desired voltage and current. FIG. 3 shows serially connected battery cells. The total number of battery cells 1 may exceed 100 cells in an electric aircraft. Each of the battery cells 1 can be made up of multiple elementary battery cells in parallel.

Figure 4:
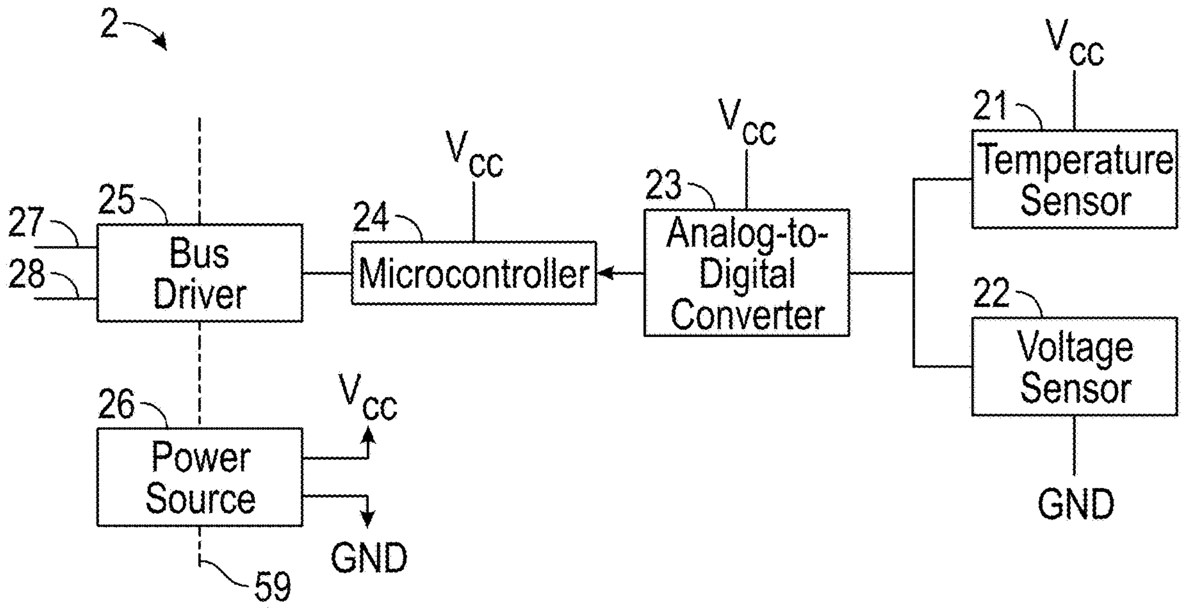
FIGS. 4 and 5 illustrate implementations of battery monitoring systems.

A first battery monitoring circuit can control and monitor the state of each battery cell 1. The first battery management circuit can include multiple BMSs 2, each of the BMSs 2 managing and controlling one of the battery cells 1. The BMSs 2 can each be made up of an integrated circuit (for instance, a dedicated integrated circuit) mounted on one printed circuit board (PCB) of the PCBs 20. One of the PCBs 20 can be used for each of the battery cells 1. FIG. 4 illustrates example components of one of the BMSs 2.

The control of a battery cell can include control of its charging and discharge cycles, preventing a battery cell from operating outside its safe operating area, or balancing the charge between different cells.

The monitoring of one of the battery cells 1 by one of the BMSs 2 can include measuring parameters of the one of the battery cells 1, to detect and report its condition and possible dysfunctions. The measurement of the parameters can be performed with battery cell parameter sensors, which can be integrated in the one of the BMSs 2 or connected to the one of the BMSs 2. Examples of such parameter sensors can include a temperature sensor 21, a voltage sensor 22, or a current sensor. An analog-to-digital converter 23 can convert the analog values measured by one or more of the parameter sensors into multivalued digital values, for example, 8 or 16 bits digital parameter values. A microcontroller 24, which can be part of each of the BMSs 2, can compare the values with thresholds to detect when a battery cell temperature, battery cell voltage, or battery cell current is outside a range.

The BMSs 2 as slaves can be controlled by one of multiple first master circuits 5. In the example of FIG. 3, each of the first master circuits 5 can control four of the BMSs 2. Each of the first master circuits 5 can control eight of the BMSs 2, or more than eight of the BMSs 2. The first master circuits 5 can control more BMS and more battery cells in yet other implementations. The first master circuits 5 can be connected and communicate over a digital communication bus 55.

The first master circuits 5 can also be connected to a computer 9 that collects the various digital signals and data sent by the first master circuits 5, and may display information related to the battery state and warning signals on a display 13, such as a matrix display. The display 13 may be mounted in the vehicle's cockpit to be visible by the vehicle's driver or pilot. Additionally or alternatively, the computer 9 can output the information to a computer remote from the aircraft or to control operations of one or more components of the aircraft as described herein.

The BMSs 2 can be connected to the first master circuits 5 over a digital communication bus, such as a CAN bus. A bus driver 25 can interface the microcontroller 24 with the digital communication bus and provide a first galvanic isolation 59 between the PCBs 20 and the first master circuits 5. In one example, the bus drivers of adjacent BMSs 2 can be daisy chained. For example, as shown in FIG. 4, the bus driver 25 is connected to the bus driver 27 of the previous BMS and to the bus driver 28 of the next BMS.

Each of the BMSs 2 and their associated microcontrollers can be rebooted by switching its power voltage Vcc. The interruption of Vcc can be controlled by the first master circuits 5 over the digital communication bus and a power source 26.

Figure 6:
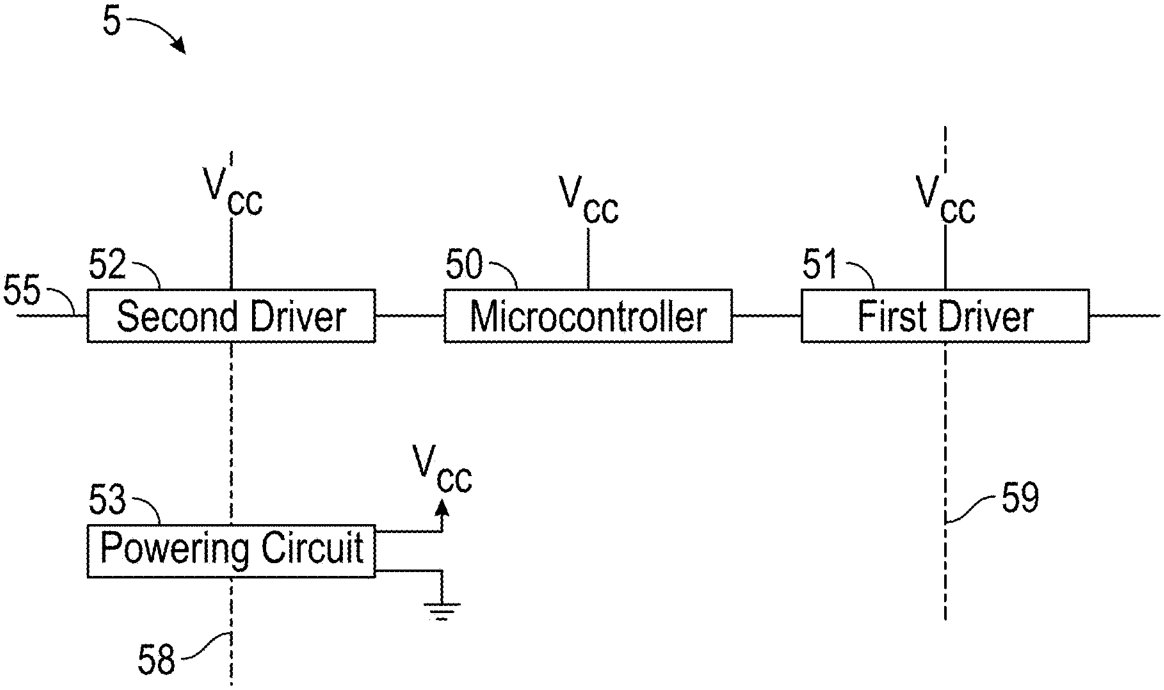
FIGS. 6 and 7 illustrate implementations of master circuits for monitoring battery monitoring systems.

FIG. 6 illustrates example components of one of the first master circuits 5. The one of the first master circuits 5 can include a first driver 51 for connecting the one of the first master circuits 5 with one of the BMSs 2 over the digital communication bus, a microcontroller 50, and a second driver 52 for connecting the first master circuits 5 between themselves and with the computer 9 over a second digital communication bus 55, such as a second CAN bus. A second galvanic isolation 58 can be provided between the first and second master circuits 5, 7 and the computer 9. The second galvanic isolation 58 can, for example, be 1500 VDC, 2500 Vrms, 3750 Vrms, or another magnitude of isolation. The microcontroller 50, the first driver 51, and the second driver 52 can be powered by a powering circuit 53 and may be mounted on a PCB 54, one such PCB can be provided for each of the first master circuits 5.

FIG. 3 further illustrates a second battery monitoring circuit, which can be redundant of the first battery monitoring circuit. This second battery monitoring circuit may not manage the battery cells 1; for example, the second battery monitoring circuit may not control charge or discharge cycles of the battery cells 1. The function of the second battery monitoring circuit can instead be to provide a separate, redundant monitoring of each of the battery cells 1 in the battery packs, and to transmit those parameters or warning signals related to those parameters, such as to the pilot or driver or a computer aboard or remote from the aircraft as described herein. The second battery monitoring circuit can monitor the state of each of the battery cells 1 independently from the first battery monitoring circuit. The second battery monitoring circuit can include one of multiple cell monitoring circuits 3 for each of the battery cells. The parameters or warning signals may moreover, for example, be used by the second battery monitoring circuit to stop charging (for instance, by opening a relay to disconnect supply of power) of one or more battery cells when the one or more battery cells may be full of energy and a computer of the aircraft continues to charge the one or more battery cells.

Figure 5:
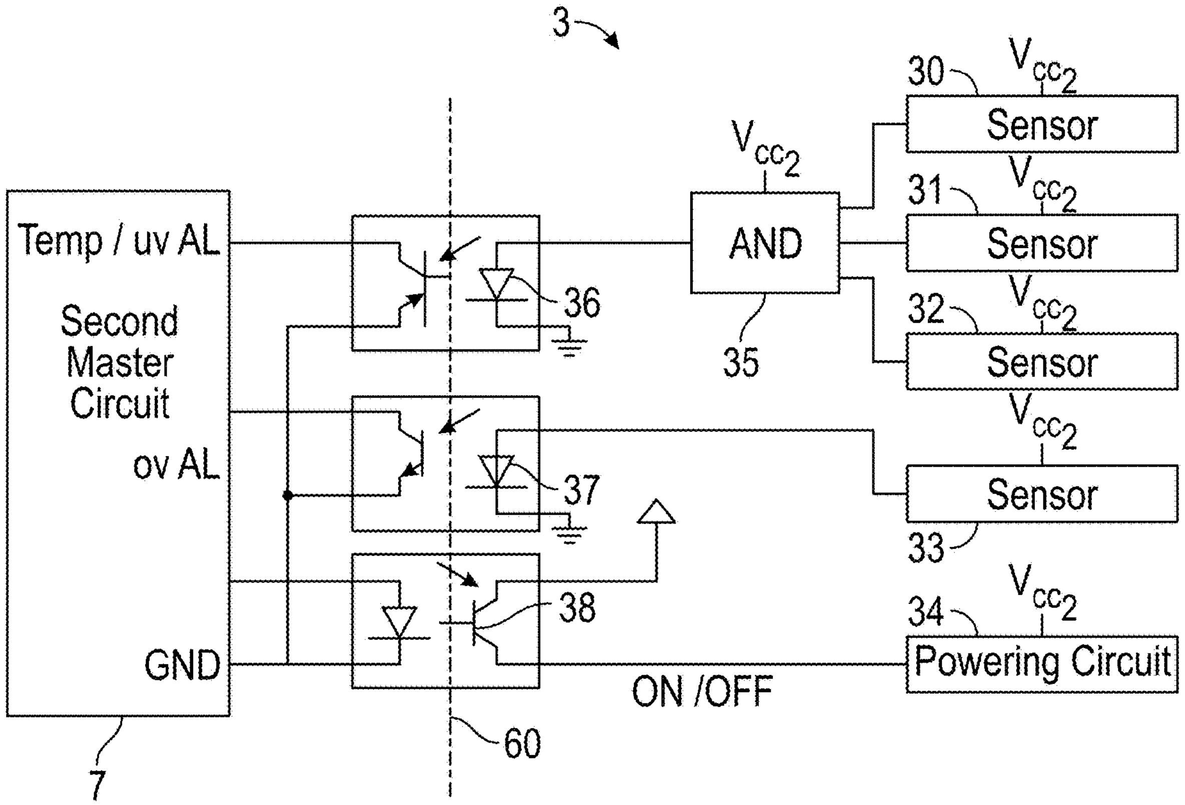

FIG. 5 illustrates example components of one of the cell monitoring circuits 3. Each of the cell monitoring circuits 3 can include multiple cell parameter sensors 30, 31, 32, 33 for measuring various parameters of one of the battery cells 1. The sensor 30 can measure a first temperature at a first location in one battery cell and detect an overtemperature condition; the sensor 31 can measure a second temperature at a second location in the same battery cell and detect an overtemperature condition; the sensor 32 can detect an undervoltage condition in the same battery cell; and the sensor 33 can detect an overvoltage condition on the same battery cell. The undervoltage condition can be detected, for example, when the voltage at the output of one battery cell is under 3.1 Volts or another threshold. The overvoltage condition might be detected, for example, when the voltage at the output of one battery cell is above 4.2 Volts or yet another threshold. The thresholds used can depend, for instance, on the type of battery cell 1 or a number of elementary cells in the cell. Therefore, each or some of the sensors 30-33 can include a sensor as such and an analog comparator for comparing the value delivered by the sensor with one or two thresholds, and outputting a binary value depending on the result of the comparison. Other battery cell parameter sensors, such as an overcurrent detecting sensor, can be used in other implementations.

Various parameters related to one of the battery cells 1 can be combined using a combinational logic circuit 35, such as an AND gate. The combinational logic circuit 35 may not include programmable logic. In the example of FIG. 5, binary signals output by the sensors 30, 31, and 32 are combined by a Boolean AND gate into a single warning signal, which can have a positive value (warning signal) if and only if the temperature measured by the two temperature sensors exceeds a temperature threshold and if the voltage of the cell is under a voltage threshold. The detection of an overvoltage condition by the sensor 33, in the example of FIG. 5, may not combined with any other measure and can be directly used as a warning signal.

The warning signals delivered by the combinational logic 35 or directly by the parameter sensors 30-33 can be transmitted to a second master circuit 7 over lines 76, which can be dedicated and different from the digital communication bus used by the first battery monitoring circuit. Optocouplers 36, 37, 38 provide a third galvanic isolation 60 between the components 30-38 and the second master circuit 7. The third galvanic isolation 60 can provide the same isolation as the first galvanic isolation 59, such as 30V isolation, or the third galvanic isolation 60 may provide a different isolation form the first galvanic isolation 59.

The sensors 30-33 and the combinational logic element 35 can be powered by a powering circuit 34 that delivers a power voltage Vcc2. This powering circuit 34 can be reset from the second master circuit 7 using an ON/OFF signal transmitted over the optocoupler 38.

The sensors 30-33 and the combinational logic element 35 can be mounted on a PCB. One such PCB can be provided for each of the battery cells 1. The sensors 30-33 and the combinational logic element 35 can be mounted on the same PCB 20 as one of the BMSs 2 of the first battery monitoring circuit.

Figure 7:
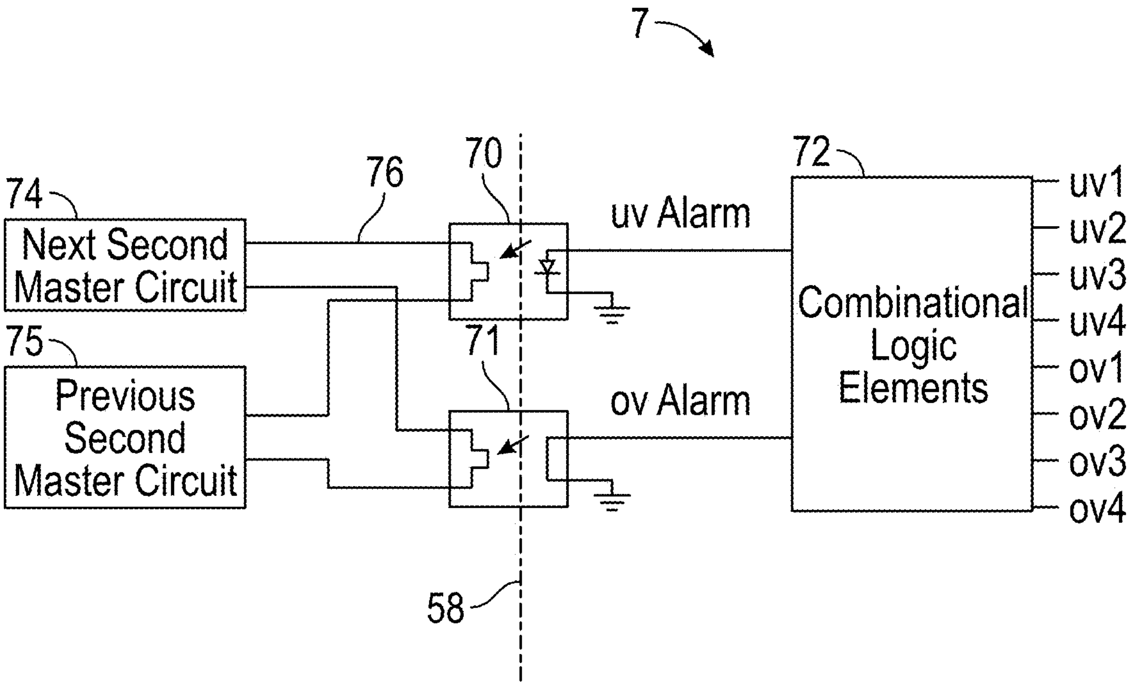

FIG. 7 illustrates example components of one of the second master circuits 7. In the example of FIG. 5, the one of the second master circuits 7 can include a combinational logic element 72, which may not include programmable logic, for combining warning signals, such as overtemperature/under-voltage warning signals uv1, uv2, . . . or overvoltage signals ov1, ov2, . . . from different battery cells into combined warning signals, such as a general uv (undervoltage condition in case of overtemperature) warning signal and a separate overvoltage warning signal ov. Those warning signals uv, ov can be active when any of the battery cells 1 monitored by the one of the second master circuits 7 has a failure. They can be transmitted over optocouplers 70, 71 and lines 76 to the next and previous second master circuits 74, 75, and to a warning display panel 11 in the cockpit of the vehicle for displaying warning signals to the driver or pilot. The warning display panel 11 can include lights, such as light emitting diodes (LEDs), for displaying warning signals.

With the disclosed design of the cell monitoring circuits 3 and the second master circuits 7, no dormant alarms may remain undetected. For example, if a cable may be broken or a power supply is inactive, the warning panel 11 can correctly show an alarm despite the broken cable or the inactive power supply. This can be accomplished, for instance, by using an inverted logic so that if the warning panel 11 does not receive a voltage or a current on an alarm line, an indicator may activate, but if the warning panel 11 does receive the voltage or the current on the alarm line, the indicator can deactivate.

The one of the second master circuits 7 can be mounted on a PCB. One such PCB can be provided for each of the second master circuits 7. One of the second master circuits 7 can be mounted on the same PCB 54 as one of the first master circuits 5 of the first battery monitoring circuit.

As can be seen, the second battery monitoring circuit can include exclusively non-programmable, non-stateful components (such as, analog components or non-programmable combinational logic components). The second battery monitoring circuit can be processorless, and may not include any sequential or programmable combinational logic. The second battery monitoring circuit may not run any computer code or be programmable. This simplicity can provide for a very reliable second monitoring circuit, and for a simple certification of the second battery monitoring circuit and an entire system that include the second battery monitoring circuit.

The second battery monitoring circuit can be built so that any faulty line, components, or power source triggers an alarm. In one example, an "0" on a line, which may be caused by the detection of a problem in a cell or by a defective sensor, line, or electronic component, can be signalled as an alarm on the warning panel; the alarm may only be removed when all the monitored cells and all the monitoring components are functioning properly. For example, if the voltage comparator or temperature sensor is broken, an alarm can be triggered.

The computer 9, the display 13, and the warning display panel 11 in the cockpit can be powered by a power source 15 in the cockpit, which may be a cockpit battery and can be independent of other power sources used to power one or more other components.

Motor and Battery System

Battery packs including multiple battery cells, such as lithium-ion cells, can be used in electric cars, electric aircraft, and other electric self-powered vehicles. The battery cells can be connected in series or in parallel to deliver an appropriate voltage and current.

In electrically driven aircraft, the battery packs can be chosen to fulfill the electrical requirements for various flight modes. During short time periods like take off, the electric motor can utilise a relatively high power. During most of the time, such as in the standard flight mode, the electric motor can utilise a relatively lower power, but may consume a high energy for achieving long distances of travel. It can be difficult for a single battery to achieve these two power utilisations.

The use of two battery packs with different power or energy characteristics can optimise the use of the stored energy for different flight conditions. For example, a first battery pack can be used for standard flight situations, where high power output may not be demanded, but a high energy output may be demanded. A second battery pack can be used, alone or in addition to the first battery pack, for flight situations with high power output demands, such as take-off manoeuvring.

An electrical powering system can charge the second battery pack from the first battery pack. This can allow recharging of the second battery pack during the flight, subsequent to the second battery pack being used in a high power output demanding flight situation. Therefore, the second battery pack can be small, which can save space and weight. In addition, this can allow different battery packs for different flight situations that optimise the use of the battery packs.

The electrical powering system can also charge the second battery pack by at least one motor which works as generator (the motor may also accordingly be referred to as a transducer). This can allow recharging of the second battery pack during the flight or after the second battery pack has been used in a high power output demanding flight situation. Therefore, the second battery pack can be small, which can save space and weight. In addition, the different battery packs can allow the recovery of braking energy. Braking energy during landing or sinking recovered by a generator motor can create high currents which may not be recovered by battery packs used for traveling long distances. By using a second battery pack suitable for receiving high power output in a short time, more braking energy can be recovered via the second battery pack than the first battery pack, for example.

The electrical powering system can also include a third battery pack, which includes a supercapacitor. Because supercapacitors can receive and output large instantaneous power or high energy in a short duration of time, the third battery pack can further improve the electrical powering system in some instances. A supercapacitor may, for example, have a capacitance of 0.1 F, 0.5 F, 1 F, 5 F, 10 F, 50 F, 100 F, or greater or within a range defined by one of the preceding capacitance values.

FIGS. 8 to 13 illustrate multiple electrical power systems.

Figure 8:
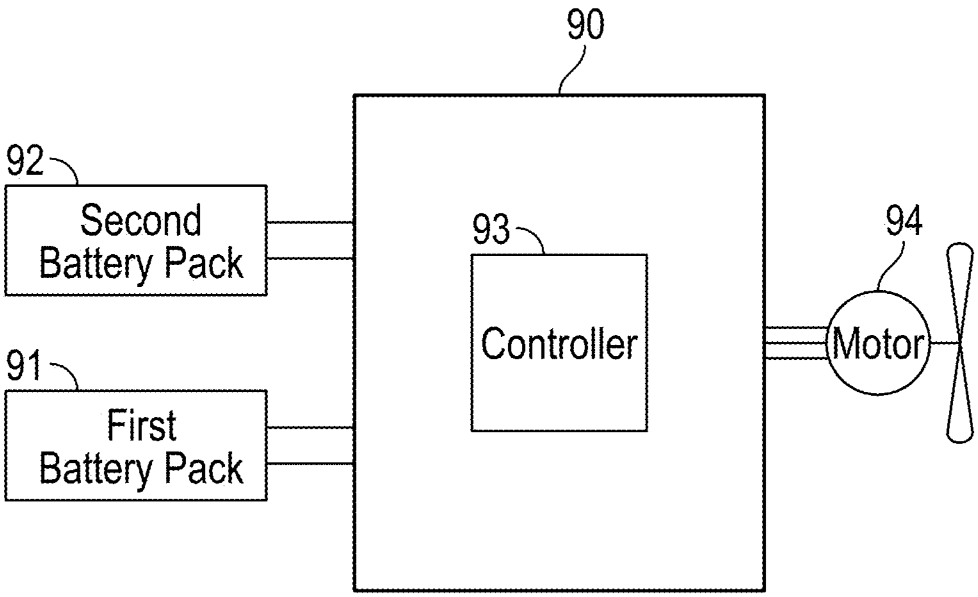
FIGS. 8, 9, 10, 11, 12, and 13 illustrate schematic views of implementations of a power management system.

FIG. 8 shows an electrical powering system that includes a first battery pack 91, a second battery pack 92, a circuit 90, and at least one motor 94.

The first battery pack 91 and the second battery pack 92 can each store electrical energy for driving the at least one motor 94. The first battery pack 91 and the second battery pack 92 can have different electrical characteristics. The first battery pack 91 can have a higher energy capacity per kilogram than the second battery pack 92, and the first battery pack 91 can have a higher power capacity (watt hours) than the second battery pack 92. Moreover, the first battery pack 91 can have a lower maximum, nominal, or peak power than the second battery pack 92; the first battery pack 91 can have a lower maximum, nominal, or peak current than the second battery pack 92; or, the first battery pack 91 can have a lower maximum, nominal, or peak voltage than the second battery pack 92. More than one or even all of the mentioned electrical characteristics of the first battery pack 91 and the second battery pack 92 can be different. However, only one of the mentioned electrical characteristics may be different or at least one other characteristic than the mentioned electrical characteristics may be different. The first battery pack 91 and the second battery pack 92 can have the same electrical characteristics.

The type or the material composition of the battery cells of the first battery pack 91 and the second battery pack 92 can be different. The type or the material composition of the battery cells of the first battery pack 91 and the second battery pack 92 can be the same, but an amount of copper or an arrangement of conductors can be different. In one example, the first battery pack 91 or the second battery pack 92 can be a lithium-ion (Li-ion) battery or a lithium-ion polymer (Li-Po) battery. The second battery pack 92 may include a supercapacitor (sometimes referred to as a supercap, ultracapacitor, or Goldcap).

The first battery pack 91 can include relatively high energy-density battery cells that can store a high amount of watt-hours per kilogram. The first battery pack 91 can include low power battery cells. The first battery pack 91 can provide a DC voltage/current/power or can be connected by a (two phase or DC) power line with the circuit 90.

The second battery pack 92 can include relatively low energy-density battery cells. The second battery pack 92 can include relatively high power battery cells. The second battery pack 92 can provide a DC voltage/current/power or is connected by a (two phase or DC) power line with the circuit 90.

The first battery pack 91 can form an integrated unit of mechanically coupled battery modules or the first battery pack 91 may be an electrically connected first set of battery modules. Similarly, the second battery pack 92 can form an integrated unit of mechanically coupled battery modules or the second battery pack 92 may be an electrically connected second set of battery modules. Some or all of the battery modules of each of first battery pack 91 or the second battery pack 92 can be stored in one or more areas of a housing of an aircraft, such as a within a wing or nose of the aircraft.

The first battery pack 91 can have a total energy capacity that exceeds a total energy capacity of the second battery pack 92. For example, a ratio of the total energy capacity of the first battery pack 91 and the total energy capacity of the second battery pack 92 can be 2:1, 3:1, 4:1, 5:1, 10:1, 20:1, 40:1, or 100:1 or within a range defined by two of the foregoing ratios.

The electrical powering system can include an external charging interface for charging the first battery pack 91 or the second battery pack 92 when the aircraft is on the ground and connected to a charging station outside of the aircraft.

Each, some, or one of the at least one motor can be an electric motor. The at least one motor 94 can be connected to the circuit 90. The at least one motor 94 can receive over the circuit 90 electrical energy/power from the first battery pack 91 or the second battery pack 92 to drive the at least one motor 94. For example, the at least one motor 94 can be a three phase motor, such as a brushless motor, which is connected via a three phase AC power line with the circuit 90. However, the at least one motor 94 can instead be a different type of motor, such as any type of DC motor or a one phase AC motor. The at least one motor 94 can move a vehicle, such as an airborne vehicle like an aircraft. The at least one motor 94 can drive a (thrust-generating) propeller or a (lift-generating) rotor. In addition, the at least one motor 94 can also function as a generator. The electrical powering system or the at least one motor 94 can include two or more electric motors as described further herein.

Figure 11:
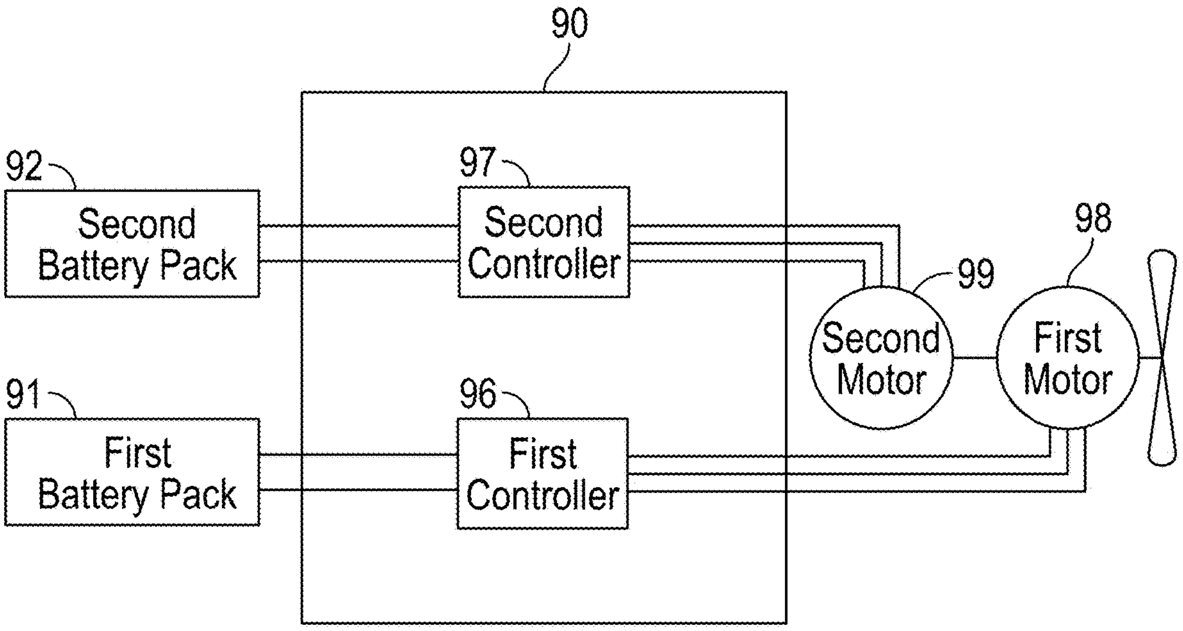
Figure 12:
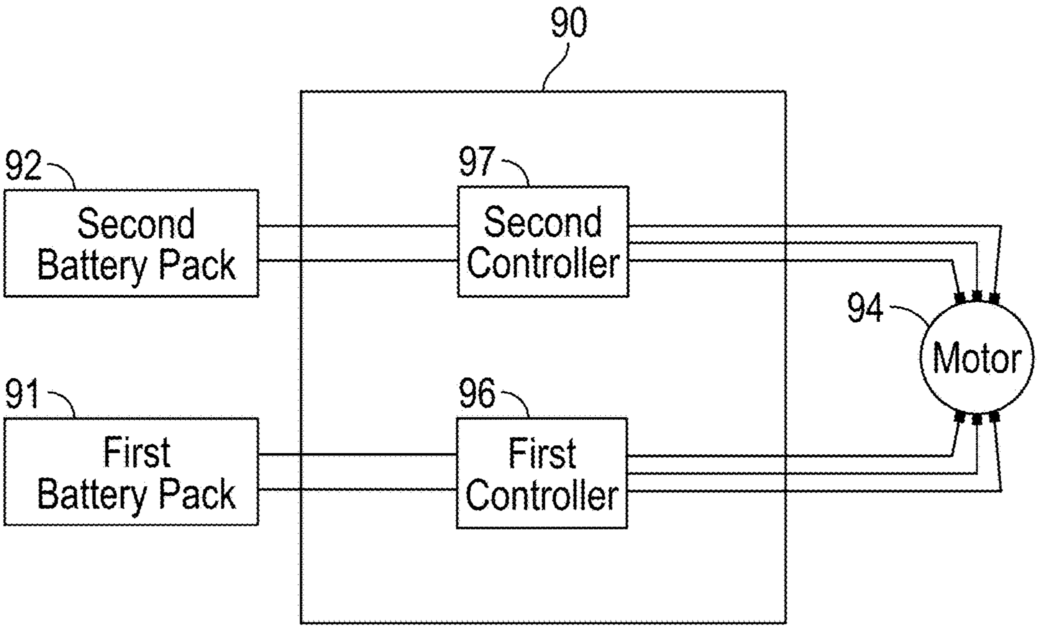
Figure 13:
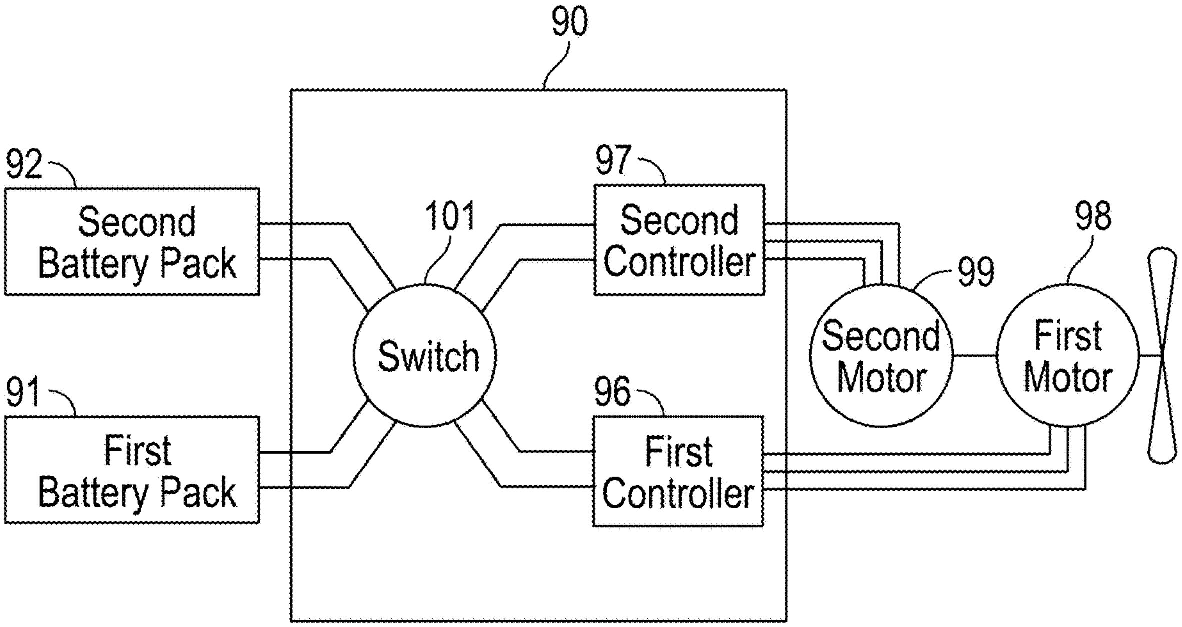

The different motors of the at least one motor 94 can have the same or different characteristics. The at least one motor 94 can be a motor with a first set of windings connected with a first controller 96 and with a second set of windings connected with a second controller 97, as shown for example in FIG. 12. This can allow use of the at least one motor 94 as generator and motor at the same time or to power the at least one motor 94 from the first controller 96 and the second controller 97. The at least one motor 94 can include a first motor 98 and a second motor 99 as shown for example in FIGS. 11 and 13. The first and the second motor 98 and 99 can be mechanically connected such that the rotors of the first and second motor 98 and 99 are mechanically coupled, for instance for powering both the same propeller or rotor (as shown in FIGS. 11 and 13). The first and the second motor 98 and 99 can, for example, drive the same axis which rotates the propeller or rotor. However, the first and second motor 98 and 99 may not be mechanically coupled and may drive two distinct propellers or rotors. The at least one motor 94 can include more than two motors M1, M2, . . . Mi which are mutually connected, or multiple mutually connected motors.

The circuit 90 can be connected with the first battery pack 91, the second battery pack 92, and the at least one motor 94.

The circuit 90 can include a controller 93 connected with the first battery pack 91, the second battery pack 92, and the at least one motor 94. The controller 93 can, for example, be connected over a two phase or DC power line with the first battery pack 91 and the second battery pack 92 or connected over a three phase power line with the at least one motor 94. The controller 93 can transform, convert, or control the power received from the first battery pack 91 or the second battery pack 92 into motor driving signals for driving the at least one motor 94. The controller 93 can include a power converter for converting the DC current of the first battery pack 91 or the second battery pack 92 into a (three phase) (AC) current for the at least one motor 94 (power converter working as inverter). The power converter can treat different input DC voltages (if the first battery pack 91 and the second battery pack 92 have different DC voltages). If the at least one motor 94 acts as generator, the power converter can convert the current generated from each phase of the at least one motor 94 into a DC current for loading the first battery pack 91 or the second battery pack 92 (power converter working as rectifier). The controller 93 can create the motor driving signals for the at least one motor 94 based on user input.

Figure 10:
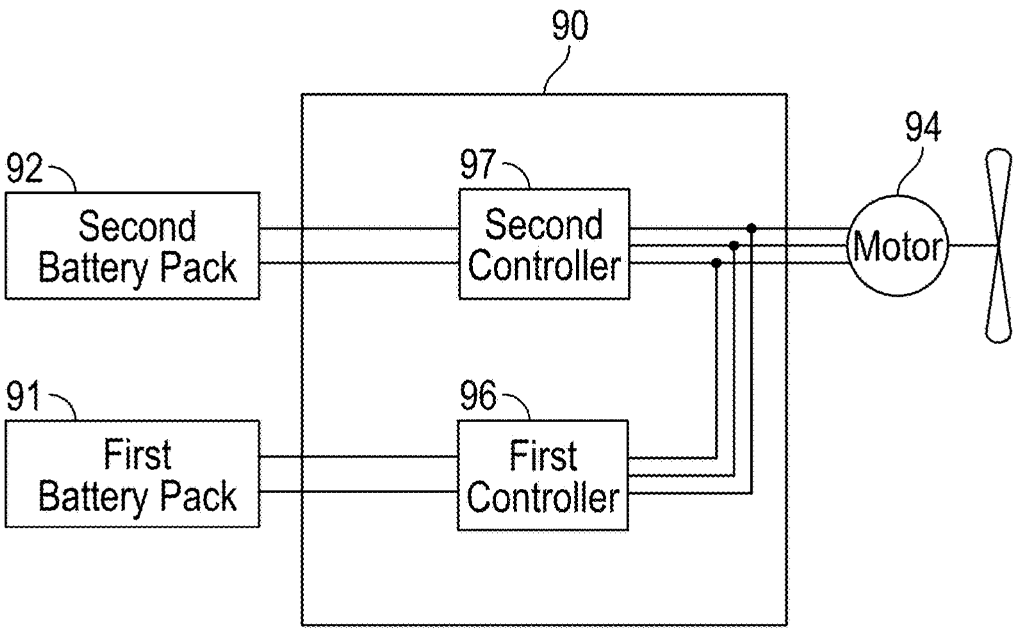

The controller 93 can include more than one controller. The controller 93 can include, for instance, a first controller 96 for powering the at least one motor 94 from at least one of the first battery pack 91 and the second battery pack 92 and a second controller 97 for powering the at least one motor 94 from at least one of the first battery pack 91 or the second battery pack 92. The features described for the controller 93 can apply to the first controller 96 or the second controller 97. Examples of such a circuit are shown in the FIGS. 10 to 13. In FIGS. 10 to 12, the first controller 96 powers the at least one motor 94 from the first battery pack 91 and the second controller 97 powers the at least one motor 94 from the second battery pack 92. The first controller 96 and the second controller 97 can power the at least one motor 94 as shown in FIG. 10 or the at least one motor 94 with different driving windings (or poles) as shown in FIG. 12.

As shown in FIGS. 11 and 13, the first controller 96 can drive a first motor 98 and the second controller 97 can drive a second motor 99. The first controller 96 and the second controller 97 can be flexible and drive the first motor 98 or the second motor 99 depending on a switching state of a switch 101 as shown in FIG. 13. The first controller 96 and the second controller 97 can be different. For example, the input DC voltage of the first controller 96 and the second controller 97 from the first battery pack 91 and the second battery pack 92 can be different. However, the first controller 96 and the second controller 97 can instead be identical.

The circuit 90 can select from at least two of the following connection modes. In a first connection mode, the first battery pack 91 can be electrically connected over the controller 93 with the at least one motor 94, while the second battery pack 92 may be electrically disconnected from the at least one motor 94. In the first connection mode, power can flow between the at least one motor 94 and the first battery pack 91, but may not flow between the at least one motor 94 and the second battery pack 92. In a second connection mode, the second battery pack 92 can be electrically connected over the controller 93 with the at least one motor 94, while the first battery pack 91 may be electrically disconnected from the at least one motor 94. In the second connection mode, power can flow between the at least one motor 94 and the second battery pack 92, but may not between the at least one motor 94 and the first battery pack 91. In a third connection mode, the first battery pack 91 and the second battery pack 92 can be electrically connected over the controller 93 with the at least one motor 94. In the third connection mode, power can flow between the at least one motor 94 and the first battery pack 91 and the second battery pack 92. Electrical switches can be used to perform this selection between different connection modes, and the electrical switches can be between the controller 93 and first battery pack 91 and the second battery pack 92, in the controller 93, or between the controller 93 and the at least one motor 94. If the at least one motor 94 has more than one motor, there can be further connection modes. The first battery pack 91 can be connected with the first motor 98 and not the second motor 99 (fourth connection mode) or with the second motor 99 and not the first motor 98 (fifth connection mode) or with the first motor 98 and the second motor 99 (sixth connection mode). The second battery pack 92 can be connected with the first motor 98 and not the second motor 99 (seventh connection mode) or with the second motor 99 and not the first motor 98 (eighth connection mode) or with the first motor 98 and the second motor 99 (ninth connection state). The first battery pack 91 and the second battery pack 92 can be connected with the first motor 98 and not the second motor 99 (tenth connection mode) or with the second motor 99 and not the first motor 98 (eleventh connection mode) or with the first motor 98 and the second motor 99 (twelfth connection state). The numbering of the connection modes can be arbitrarily chosen. If there may additionally be a third battery pack, there can be correspondingly more potential connection modes between the at least one motor and the three battery packs.

The circuit 90 can select from at least two of the following drive modes. In a first drive mode, the at least one motor 94 can be driven by the first battery pack 91 (without using the power of the second battery pack 92). In this first drive mode (which may be referred to as a standard drive mode), the circuit 90 can be in the first connection mode. Alternatively, in the first drive mode, the circuit 90 can also be in the third connection mode, while no power flows from the second battery pack 92 to the at least one motor 94. This standard drive mode can be used when the power consumption of the least one motor 94 may be low, such as during steady flight conditions, gliding flight, or landing of an aircraft. In a second drive mode (which may be referred to as a high energy drive mode), the at least one motor 94 can be driven by the second battery pack 92 (without using the power of the first battery pack 91). In this second drive mode, the circuit 90 can be in the second connection mode. Alternatively, in the second drive mode, the circuit 90 can also be in the third motor connection mode, while no power flows from the first battery pack 91 to the at least one motor 94. This second drive mode can be used when the power consumption of the at least one motor 94 may be high, such as during maneuvering, climb flight, or take off. In a third drive mode (which may be referred to as a very high energy drive mode), the at least one motor 94 can be simultaneously driven by the first battery pack 91 and the second battery pack 92. In this third drive mode, the circuit 90 can be in the third connection mode. This third drive mode can be used when the power consumption of the least one motor 94 may be high, such as during maneuvering, climb flight, or take off.

The circuit 90 can include a detector for detecting the power requirements of a present flight mode. The detection can be performed from user input or sensor measurements, such as by measuring the current in the motor input line. The circuit 90 can select the drive mode or the connection mode based at least on the detection result of this detector.

The selection between connection modes can depend at least on the charging level of the different battery packs. For example, a high-power battery pack can be used instead, or in addition to, a high energy-density battery pack when the charge of the high energy-density battery pack is low.

The electrical powering systems of FIGS. 8 to 13 can be configured such that the second battery pack 92 can be charged from the first battery pack 91, such as via the circuit 90. Moreover, the electrical powering systems can be configured such that the second battery pack 92 can be charged from the first battery pack 91 while the first battery pack 91 powers or drives the at least one motor 94.

Figure 9:
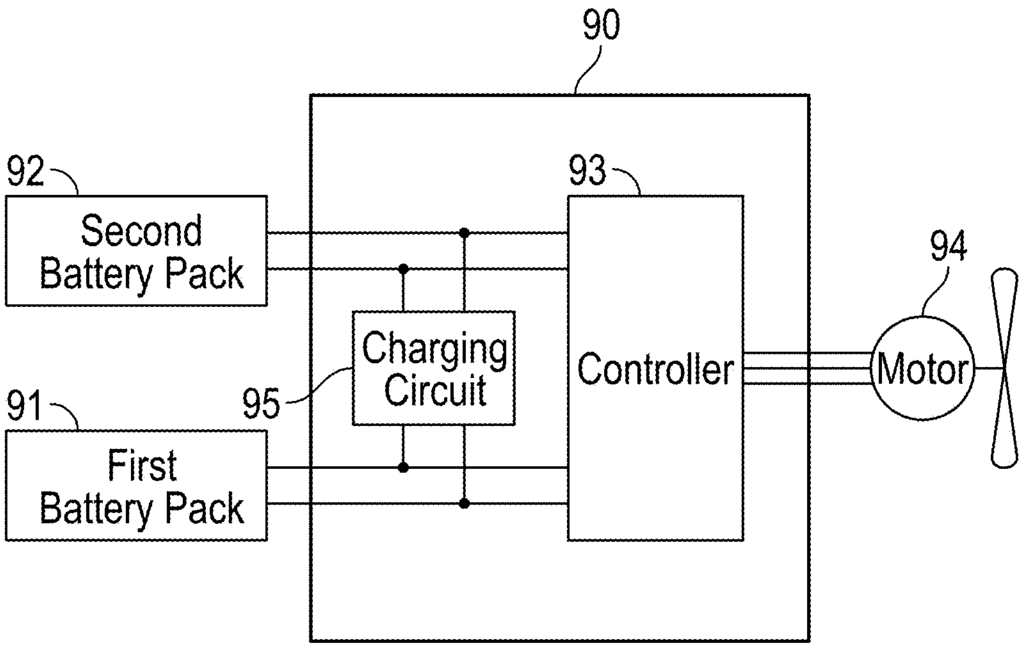

In FIGS. 9 to 11, the circuit 90 can electrically connect the first battery pack 91 and the second battery pack 92 for charging. The connection can be steady or realised by a switch which switches between a first battery connection mode in which the first battery pack 91 and the second battery pack 92 are electrically connected and a second battery connection mode in which the first battery pack 91 and the second battery pack 92 are electrically disconnected. As explained further herein, the first battery connection mode can be realised by connecting the first battery pack 91 and the second battery pack 92 over a charging circuit 95 or over the controller 93 or over one or more other controllers.

In FIG. 9, the circuit 90 the charging circuit 95 for charging the second battery pack 92 from the first battery pack 91. The charging circuit 95 can control energy flow from the first battery pack 91 to the second battery pack 92 and may transfer the energy without transferring the energy through the controller 93. The charging circuit 95 can include a switch (not shown) for connecting the first battery pack 91 with the second battery pack 92 for charging. Such a switch may have the advantage that the charging process can be controlled by a user or by a microprocessor. For example, if the full power of the first battery pack 91 is desired to power the at least one motor 94, the process of charging the second battery pack 92 may automatically be interrupted. However, the charging circuit 95 can instead work switchless so that the process of charging automatically starts when a certain electrical parameter, like the voltage or capacitance of the second battery pack 92, falls below a certain threshold.

If the voltage of the first battery pack 91 and the second battery pack 92 may be different, the charging circuit 95 can include a DC/DC converter for converting the DC voltage of the first battery pack 91 into the DC voltage of the second battery pack 92. The second battery pack 92 can be charged from the first battery pack 91 at the same time that the at least one motor 94 is driven by the first battery pack 91 or at a time that the at least one motor 94 is not powered, such as by the first battery pack 91.

In FIG. 10, the second battery pack 92 can be charged over the first controller 96 and the second controller 97. The first battery pack 91 can provide energy and power for the first controller 96, which can convert this energy and power into the electrical driving signals for the at least one motor 94. For charging the second battery pack 92, the electrical driving signals from the first controller 96 can be converted by the second controller 97 into the charging signal (DC voltage) for the second battery pack 92. The electrical driving signals for the at least one motor 94 from the first controller 96 can be used for charging the second battery pack 92 and for driving the at least one motor 94 at the same time. This can allow the second battery pack 92 to charge from the first battery pack 91 at the same time that the at least one motor 94 may be driven by the electrical driving signals from the first controller 96. The second battery pack 92 can however instead be charged by the electrical drive signals without powering the motor at the same time.

Instead of or in addition to electrically connecting the first battery pack 91 with the second battery pack 92 for transferring electrical energy from the first battery pack 91 to the second battery pack 92, the first battery pack 91 can be mechanically connected with the second battery pack 92 for transferring mechanical energy to charge the second battery pack 92 from the first battery pack 91.

In FIG. 11, mechanical charging can be realised by driving the first motor 98 from the first battery pack 91 (over the first controller 96) and generating energy from the second motor 99 which is mechanically connected to the first motor 98 and working as generator. The energy generated by the second motor 99 can be used to charge the second battery pack 92 (by converting the generated motor signals of the second motor 99 via the second controller 97 into the charging signal (DC voltage) of the second battery pack 92). This can allow the second battery pack 92 to charge from the first battery pack 91 at the same time that the at least one motor 94 is driven by the energy from the first battery pack 91.

In FIG. 12, mechanical charging can be realised by driving the at least one motor 94 from the first battery pack 91 (such as over the first controller 96) with the first set of windings of the at least one motor 94 and generating energy from the at least one motor 94 over the second set of windings of the at least one motor 94 which can function as a generator. The energy generated by the second set of windings can be used to charge the second battery pack 92 by converting the generated motor signals of the at least one motor 94 via the second controller 97 into the charging signal (DC voltage) of the second battery pack 92. This can allow the second battery pack 92 to charge from the first battery pack 91 at the same time that the at least one motor 94 is driven by the energy from the first battery pack 91. Moreover, this can enable the second battery pack 92 to charge from the first battery pack 91 without utilising separate circuitry, such as a DC/DC converter, which would increase a weight of the aircraft.

FIG. 13 shows a switch 101 which can select from different battery packs or connection modes as described herein. This can allow the first battery pack 91 to connect with the second battery pack 92 (first battery connection mode) to charge the second battery pack 92 directly from the first battery pack 91. This can allow the first battery pack 91 to connect with (i) one of the first controller 96 or the second controller 97, (ii) one of the first motor 98 or second motor 99 and the second battery pack 92 with the other of the first controller 96 or the second controller 97, or (iii) the first motor 98 and the second motor 99 to charge the second battery pack 92 mechanically. This can allow for selection of the first motor 98 or the second motor 99 to be driven by the first battery pack 91 or the second battery pack 92.

The design of FIG. 13 can give the flexibility to choose among electrical charging or mechanical charging.

The second battery pack 92 can be charged by the at least one motor 94 which can work as a generator. When the at least one motor 94 may work as a generator, the generation can be driven by braking energy, such as during descent or landing of the aircraft. The second battery pack 92 can as a result recover energy without affecting the functioning of the first battery pack 91 for long distances. When the at least one motor 94 may work as a generator, the generation can be driven from the first battery pack 91 to charge the second battery pack 92. The second battery pack 92 can be charged by the at least one motor 94 working as a generator while the same motor or another motor of the at least one motor 94 can be driven by the energy from the first battery pack 91, such as for instance described with respect to FIGS. 11, 12, and 13.

The electrical powering system can include a third battery pack (not shown). The second battery pack 92 and the third battery pack can have different electrical characteristics. The second battery pack 92 can, for instance, have a higher energy capacity than the third battery pack. The second battery pack 92 can have a higher energy density than the third battery pack. The second battery pack 92 can have a lower maximum, nominal, or peak power than the third battery pack. The second battery pack 92 can have a lower maximum, nominal, or peak current than the third battery pack. The second battery pack 92 can have a lower maximum, nominal, or peak voltage than the third battery pack. The type or the material composition of the battery cells of the second battery pack 92 and the third battery pack can be different or the same. The third battery pack can include a supercapacitor. The third battery pack can increase a maximum power that may be delivered or recovered by the electrical powering system. The power recovered by the at least one motor 94 acting as a generator from a braking action can, for example, immediately be recovered in the third battery pack up to a high recover power level. The third battery pack can be charged from the first battery pack 91 or the second battery pack 92, such as even while the at least one motor 94 may be driven from the power of the first battery pack 91 or the second battery pack 92.

Modular Battery System

The power sources in an electric or hybrid aircraft can be modular and distributed to optimise a weight distribution or select a center of gravity for the electric or hybrid aircraft, as well as maximise a use of space in the aircraft. Moreover, the batteries in an electric or hybrid aircraft can desirably be designed to be positioned in place of a combustion engine so that the aircraft can retain a similar shape or structure to a traditional combustion powered aircraft and yet may be powered by batteries. In such designs, the weight of the batteries can be distributed to match that of a combustion engine to enable the electric or hybrid aircraft to fly similarly to the traditional combustion powered aircraft.

Figure 14A:
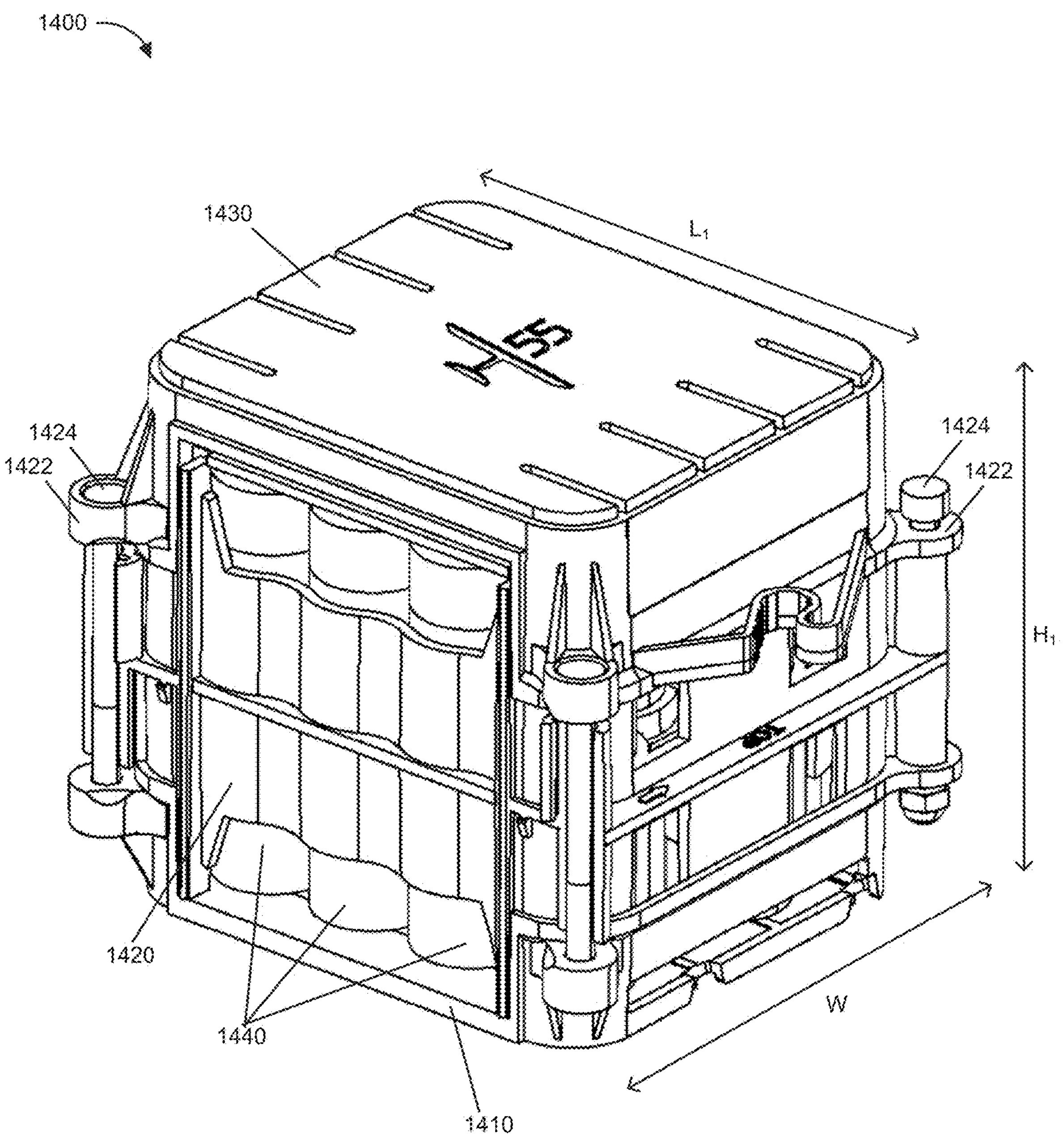
FIGS. 14A and 14B illustrate a battery module usable in an aircraft.

FIG. 14A illustrates a battery module 1400 usable in an aircraft, such as the aircraft 100 of FIGS. 1A and 1B. The battery module 1400 can include a lower battery module housing 1410, a middle battery module housing 1420, an upper battery module housing 1430, and a multiple battery cells 1440. The multiple battery cells 1440 can together provide output power for the battery module 1400. The lower battery module housing 1410, the middle battery module housing 1420, or the upper battery module housing 1430 can include slots, such as slots 1422, that are usable to mechanically couple the lower battery module housing 1410, the middle battery module housing 1420, or the upper battery module housing 1430 to one another or to another battery module. Supports, such as supports 1424 (for example, pins or locks), can be placed in the slots to lock the lower battery module housing 1410, the middle battery module housing 1420, or the upper battery module housing 1430 to one another or to another battery module.

The battery module 1400 can be constructed so that the battery module 1400 is evenly cooled by air. The multiple battery cells 1440 can include 16 total battery cells where the battery cells are each substantially shaped as a cylinder. The lower battery module housing 1410, the middle battery module housing 1420, or the upper battery module housing 1430 can be formed of or include plastic and, when coupled together, have an outer shape substantially shaped as a rectangular prism. The lower battery module housing 1410, the middle battery module housing 1420, or the upper battery module housing 1430 can together be designed to prevent a fire in the multiple battery cells 1440 from spreading outside of the battery module 1400.

The battery module 1400 can have a length of L1, a width of W, and a height of H1. The length of L1, the width of W, or the height of H1 can each be 50 mm, 65 mm, 80 mm, 100 mm, 120 mm, 150 mm, 200 mm, 250 mm or within a range defined by two of the foregoing values or another value greater or less than the foregoing values.

Figure 14B:
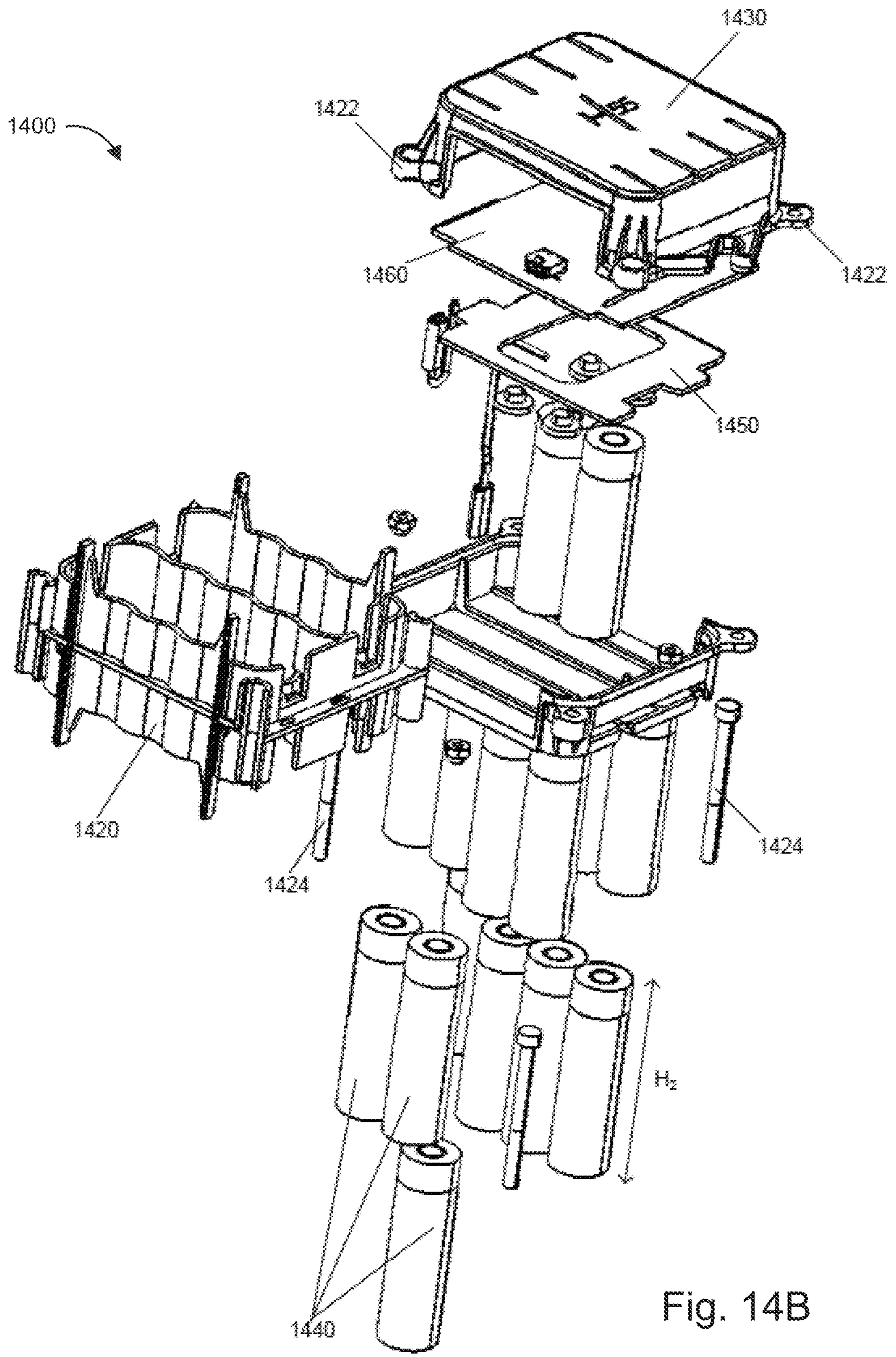

FIG. 14B illustrates an exploded view of the battery module 1400 of FIG. 14A. In the exploded view, a plate 1450 and a circuit board assembly 1460 of the battery module 1400 is shown. The plate 1450 can be copper and may electrically connect the multiple battery cells 1440 in parallel with one another. The plate 1450 may also distribute heat evenly across the multiple battery cells 1440 so that the multiple battery cells 1440 age at the same rate. The circuit board assembly 1460 may transfer power from or to the multiple battery cells 1440, as well as include one or more sensors for monitoring a voltage or a temperature of one or more battery cells of the multiple battery cells 1440. The circuit board assembly 1460 may or may not provide galvanic isolation to the battery module 1400 with respect to any components that may be electrically connected to the battery module 1400. Each of the multiple battery cells 1440 can have a height of H2, such as 30 mm, 50 mm, 65 mm, 80 mm, 100 mm, 120 mm, 150 mm or within a range defined by two of the foregoing values or another value greater or less than the foregoing values.

Figure 15A:
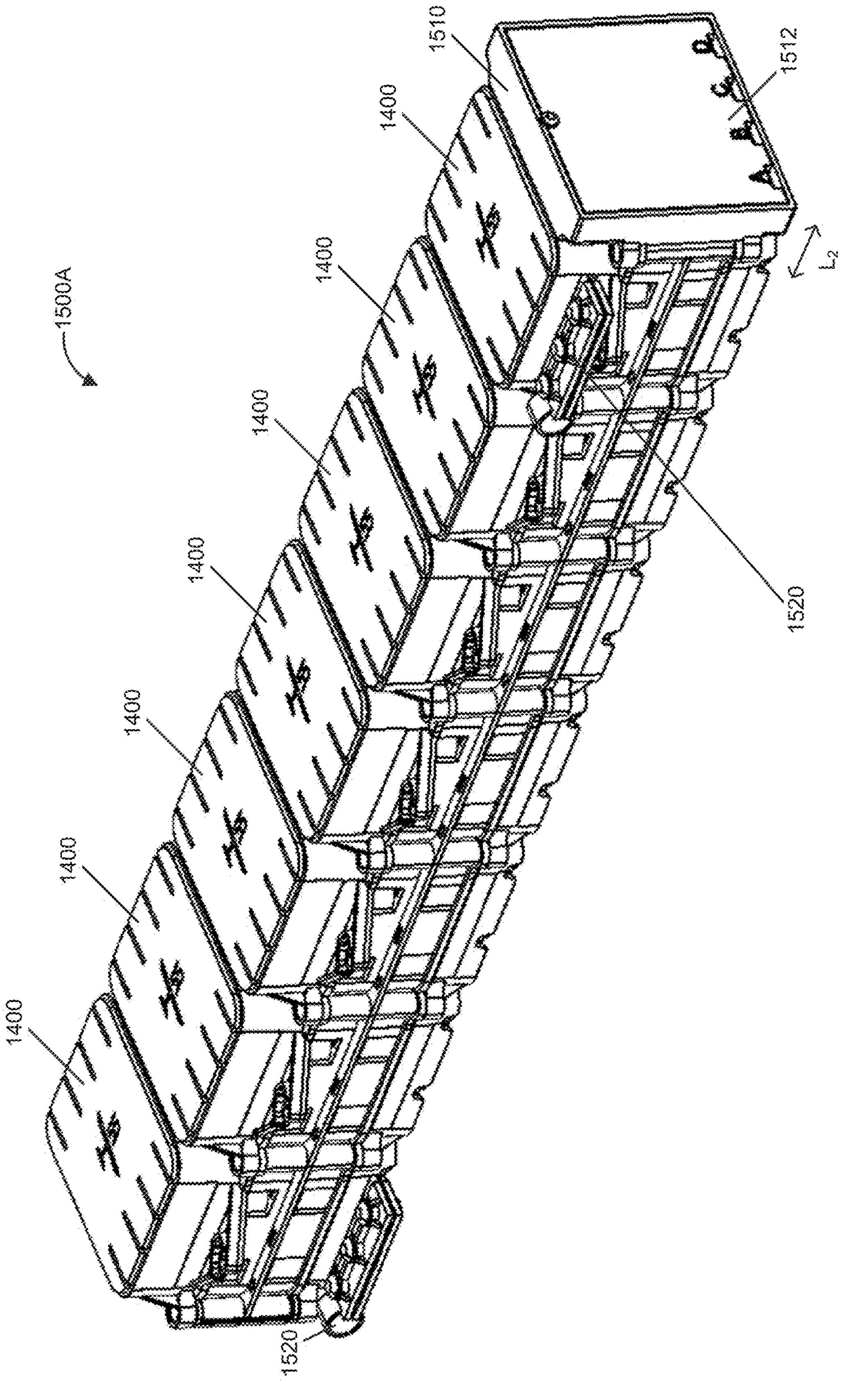
FIGS. 15A and 15B illustrate a power source formed of multiple battery modules.

FIG. 15A illustrate a power source 1500A formed of multiple battery modules 1400 of FIGS. 14A and 14B. The multiple battery modules 1400 of the power source 1500A can be mechanically coupled to one another. A first side of one battery module 1400 can be mechanically coupled to a first side of another battery module 1400, and a second side of the one battery module 1400 that is opposite the first side can be mechanically coupled to a first side of yet another battery module 1400. The multiple battery modules 1400 of the power source 1500A can be electrically connected in series with one another. As illustrated in FIG. 15A, the power source 1500A can include seven of the battery modules 1400 connected to one another. The power source 1500A may, for example, have a maximum power output between 1 kW and 60 kW during operation, a maximum voltage output between 10 V and 120 V during operation, or a maximum current output between 100 A and 500 A during operation.

The power source 1500A can include a power source housing 1510 mechanically coupled to at least one of the battery modules. The power source housing 1510 can include an end cover 1512 that covers a side of the power source housing 1510. The power source housing 1510 can have a length of L2, such as 3 mm, 5 mm, 10 mm, 15 mm, 20 mm, 25 mm, 30 mm, 40 mm, 50 mm or within a range defined by two of the foregoing values or another value greater or less than the foregoing values. The width and the height of the power source housing 1510 can match the length of L1 and the width of W of the battery module 1400.

The power source 1500A can include power source connectors 1520. The power source connectors 1520 can be used to electrically connect the power source 1500A to another power source, such as another of the power source 1500A.

Figure 15B:
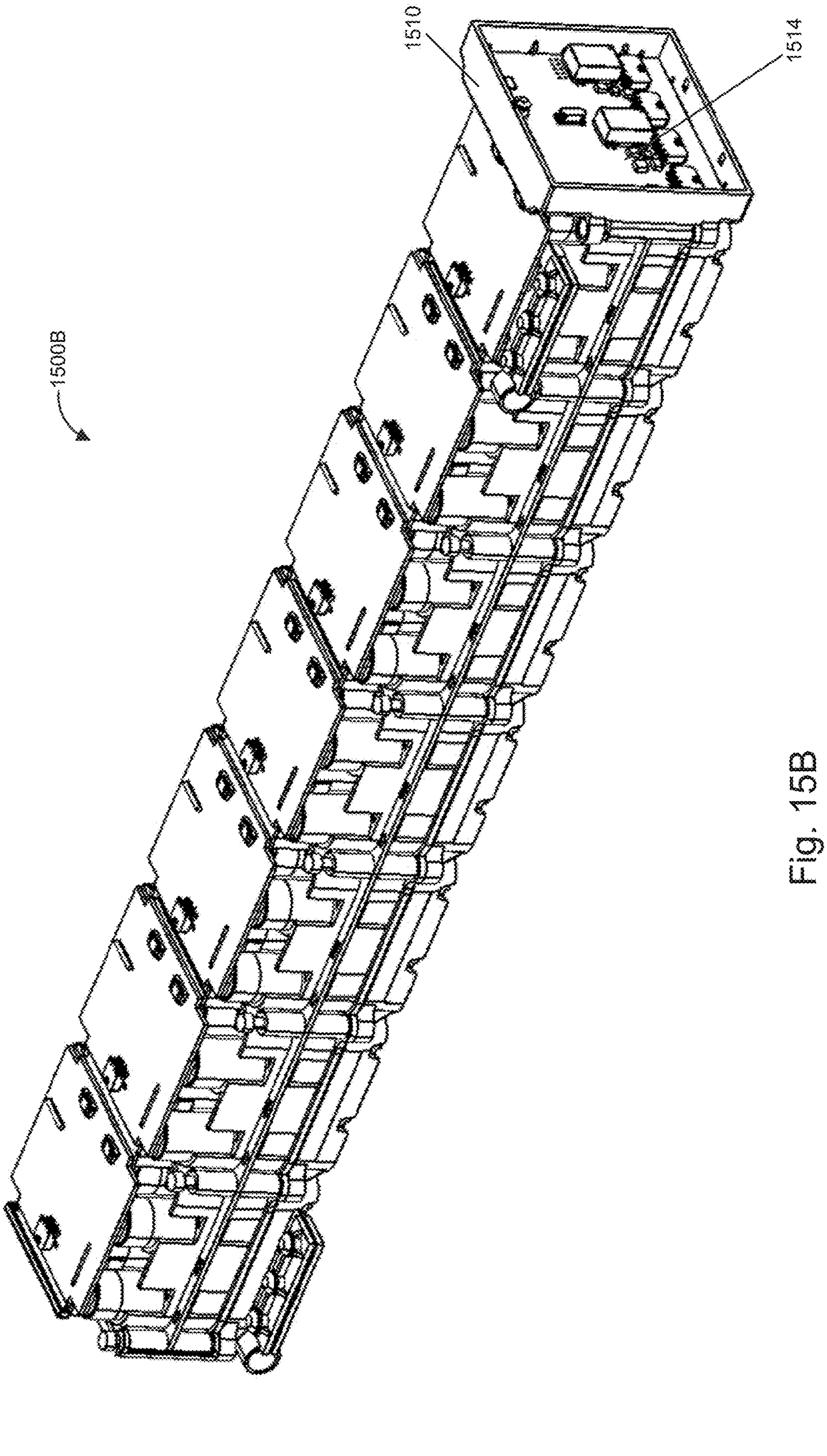

FIG. 15B illustrates a power source 1500B that is similar to the power source 1500A of FIG. 15A but with the end cover 1512 and the upper battery module housings 1430 of the battery modules 1400 removed. Because the end cover 1512 has been removed, a circuit board assembly 1514 of the power source 1500B is now exposed. The circuit board assembly 1514 can be electrically coupled to the battery modules 1400. The circuit board assembly 1514 can additionally provide galvanic isolation (for instance, 2500 Vrms) for the power source 1500B with respect to any components that may be electrically connected to the power source 1500B. The inclusion of galvanic isolation in this manner may, for instance, enable grouping of the battery modules 1400 together so that isolation may be provided to the grouping of the battery modules 1400 rather than individual modules of the battery modules 1400 or a subset of the battery modules 1400. Such an approach may reduce the costs of construction because isolation can be expensive, and a single isolation may be used for multiple of the battery modules 1400.

Figure 16:
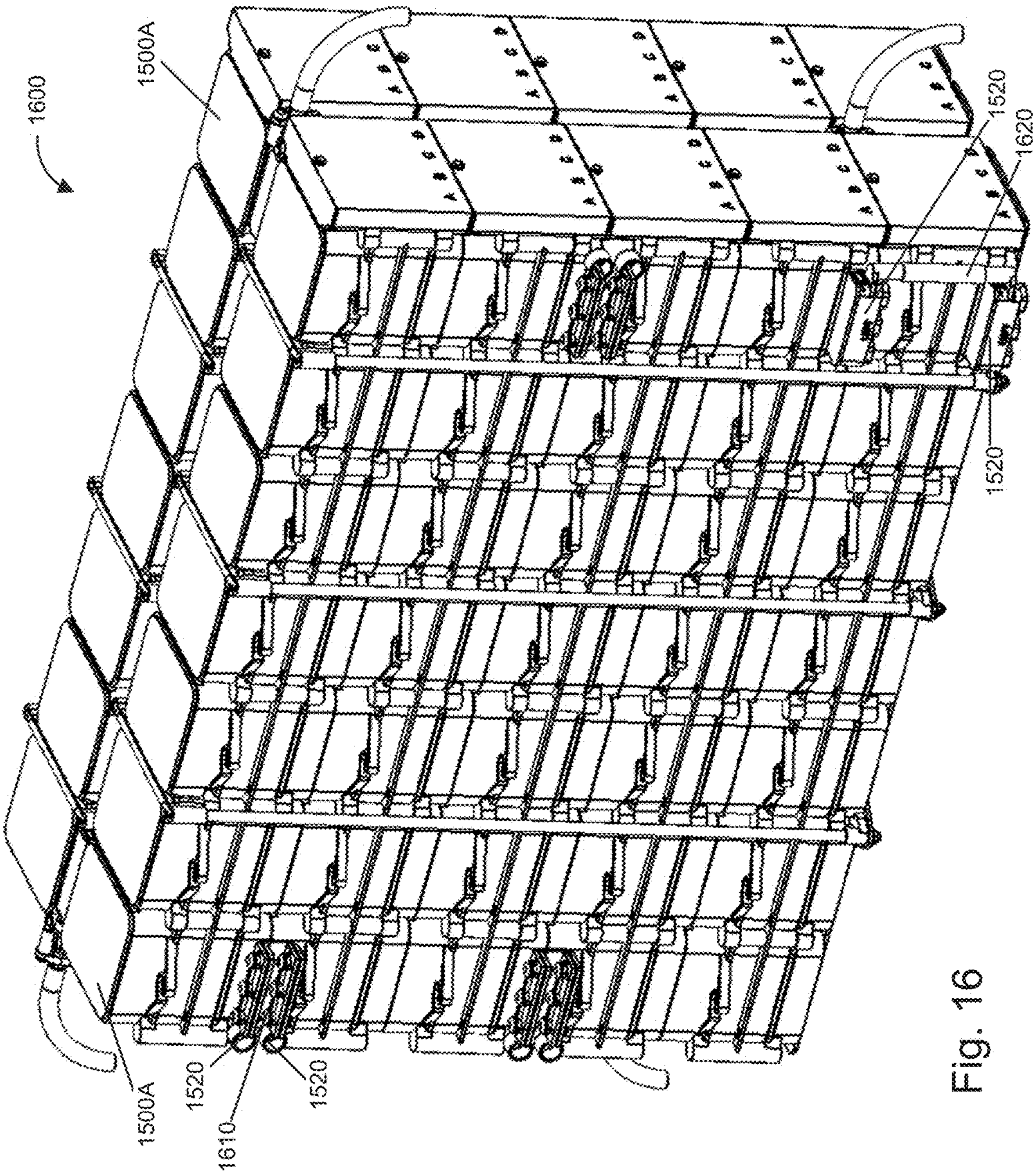
FIG. 16 illustrates multiple power sources arranged and connected for powering an aircraft.

FIG. 16 illustrates a group 1600 of multiple power sources 1500A of FIG. 15A arranged and connected for powering an aircraft, such as the aircraft 100 of FIGS. 1A and 1B. The multiple power sources 1500A of the group 1600 can be mechanically coupled to or stacked on one another. The multiple power sources 1500A of the group 1600 can be electrically connected in series or parallel with one another, such as by a first connector 1610 or a second connector 1620 that electrically connects the power source connectors 1520 of two of the multiple power sources 1500A. As illustrated in FIG. 16, the group 1600 can include 10 power sources (for instance, arranged in a 5 row by 2 column configuration). In other examples, a group may include a fewer or greater number of power sources, such as 2, 3, 5, 7, 8, 12, 15, 17, 20, 25, 30, 35, or 40 power sources.

The grouping of the multiple power sources 1500A to form the group 1600 or another different group may allow for flexible configurations of the multiple power sources 1500A to satisfy various space or power requirements. Moreover, the grouping of the multiple power sources 1500A to form the group 1600 or another different group may permit relatively easy or inexpensive replacement of one or more of the multiple power sources 1500A in the event of a failure or other issue.

Figure 17A:
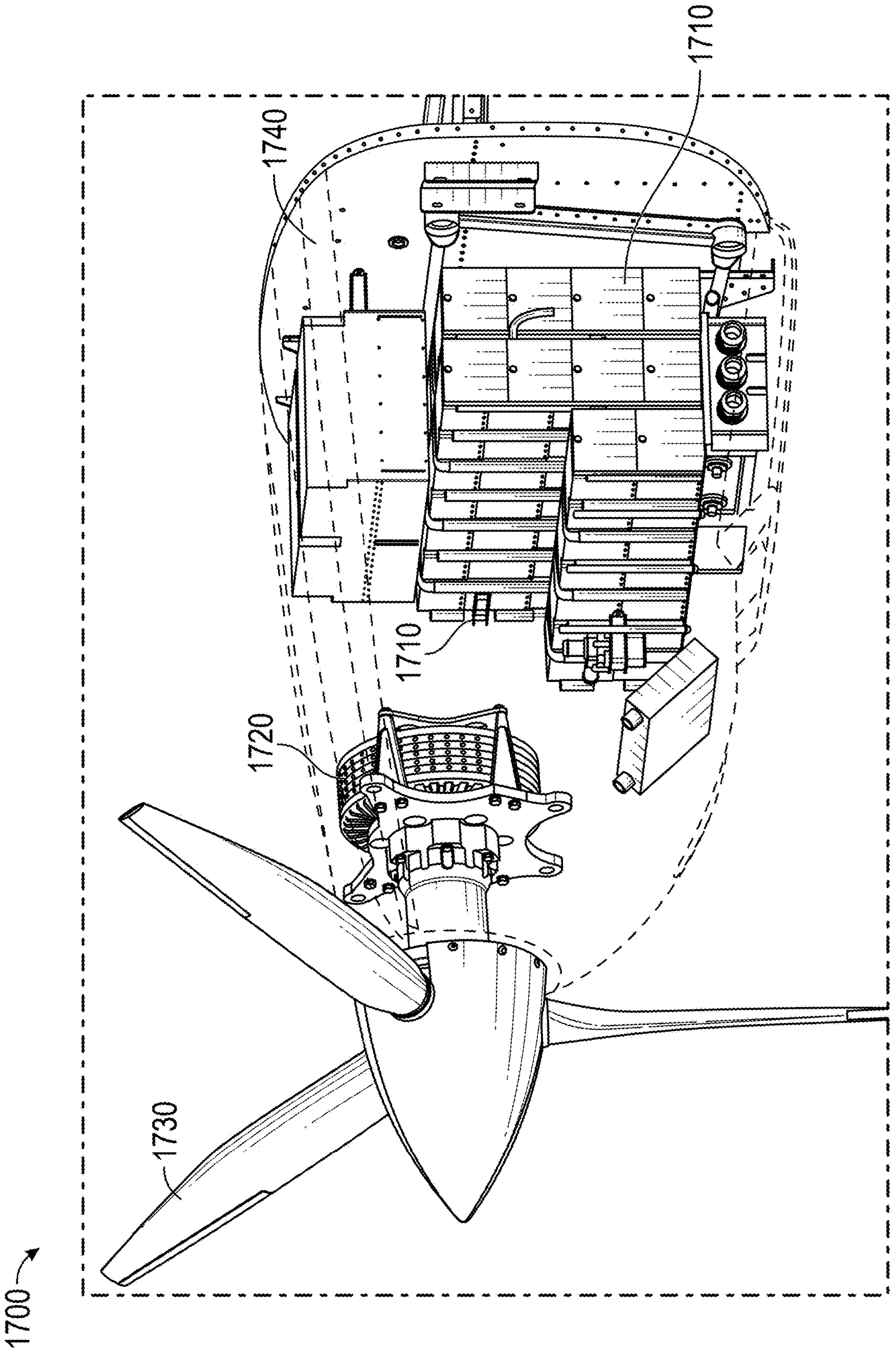
FIGS. 17A and 17B illustrate multiple power sources positioned in a nose of an aircraft for powering the aircraft.

FIG. 17A illustrates a perspective view of a nose 1700 of an aircraft, such as the aircraft 100 of FIGS. 1A and 1B, that includes multiple power sources 1710, such as multiple of the power source 1500A, for powering a motor 1720 that operates a propeller 1730 of the aircraft. The multiple power sources 1710 can be used to additionally or alternatively power other components of the aircraft. The multiple power sources 1710 can be sized and arranged to optimise a weight distribution and use of space around the nose 1700. The motor 1720 and the propeller 1730 can be attached to and supported by a frame of the aircraft by supports, which can be steel tubes, and connected by multiple fasteners, which be bolts with rubber shock absorbers. A firewall 1740 can provide barrier between the multiple power sources 1710 and the frame of the aircraft in the event of a first at the multiple power sources 1710. An enclosure composed of glass fiber, metal, or mineral composite can be around the multiple power sources 1710 to protect from water, coolant, or fire.

Figure 17B:
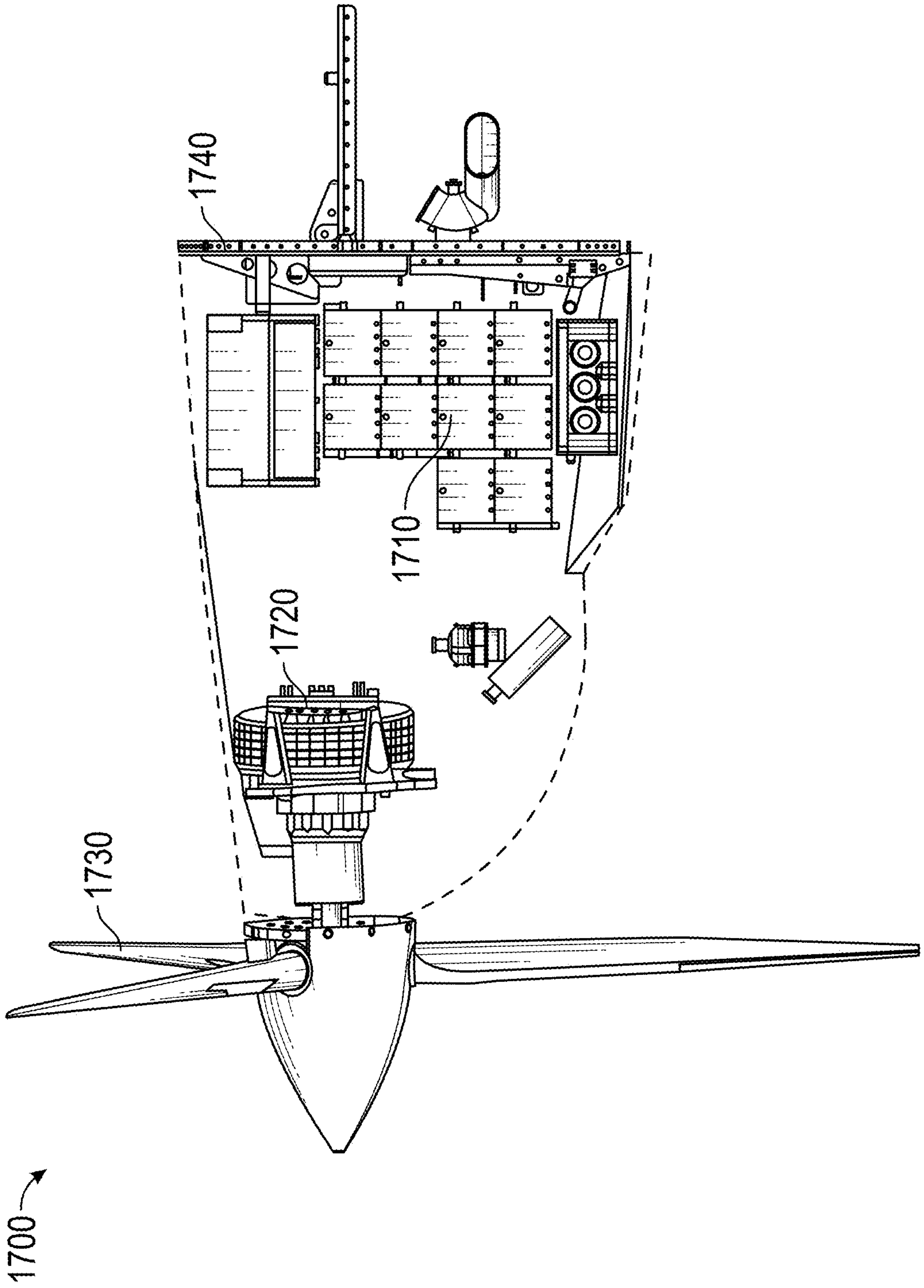

FIG. 17B illustrates a side view of the nose 1700 of FIG. 17A.

Figure 18A:
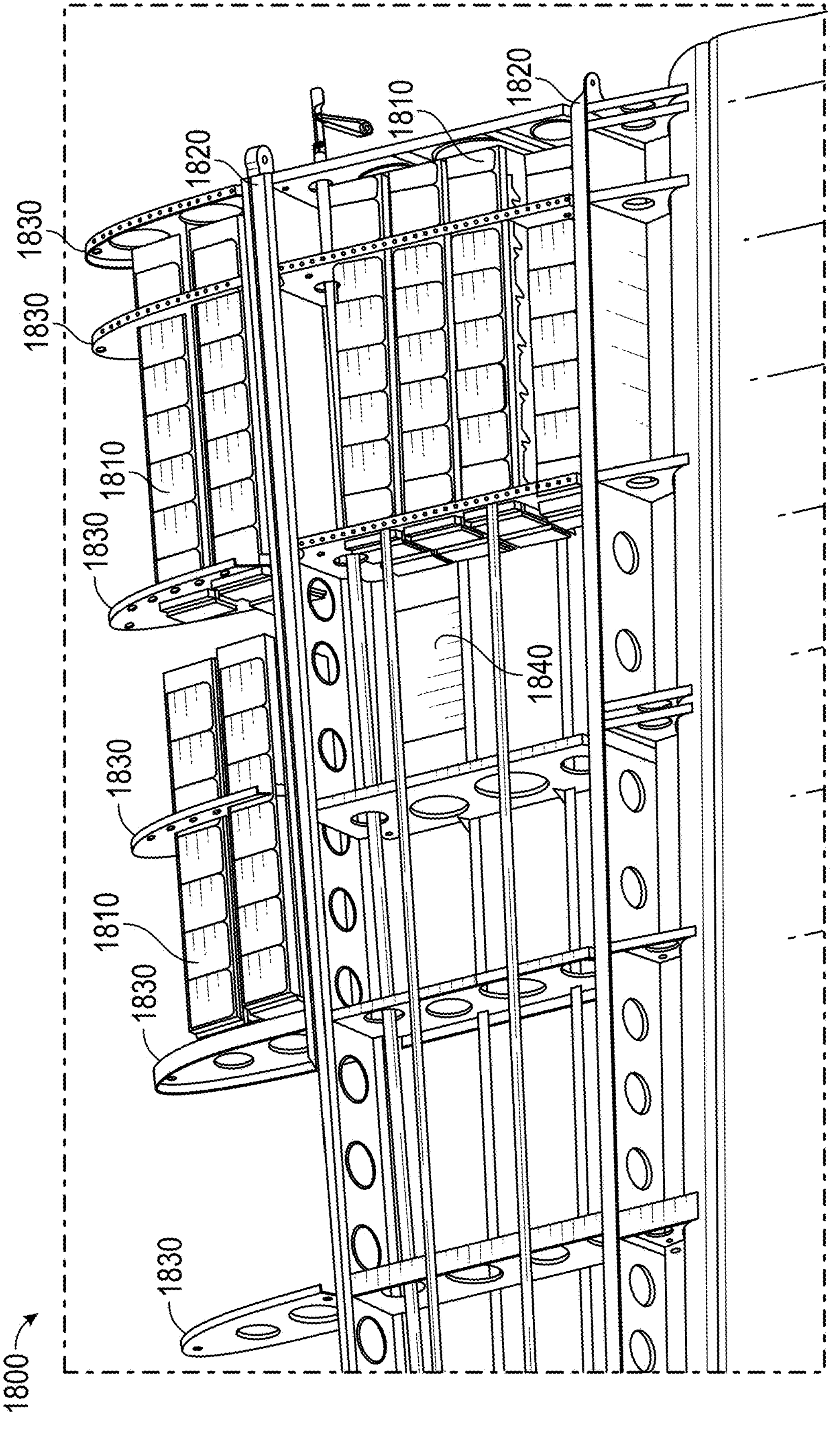
FIGS. 18A and 18B illustrate multiple power sources positioned in a wing of an aircraft for powering the aircraft.

FIG. 18A illustrates a top view of a wing 1800 of an aircraft that includes multiple power sources 1810, such as multiple of the power source 1500A, for powering one or more components of the aircraft. The multiple power sources 1810 can be sized and arranged to optimise a weight distribution and use of space around the wing 1800. For example, the multiple power sources 1810 can be positioned within, between, or around horizontal support beams 1820 or vertical support beams 1830 of the wing 1800. A relay 1840 can further be positioned in the wing 1800 as illustrated and housed in a sealed enclosure. The relay 1840 may open if there is not a threshold voltage on a breaker panel or if a pilot opens breakers to shut down the multiple power sources 1810.

Figure 18B:
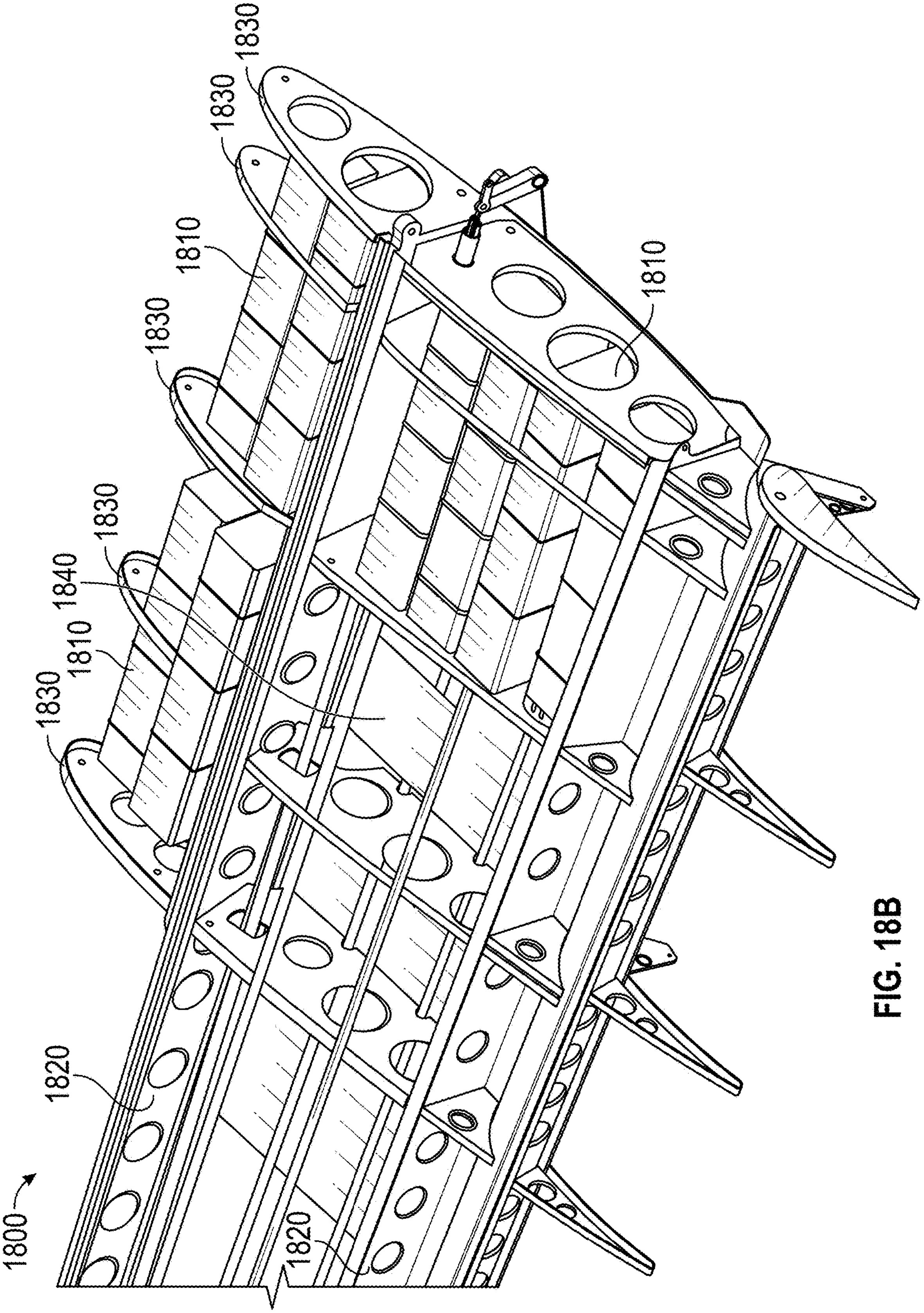

FIG. 18B illustrates a perspective view of the wing 1800 of FIG. 18A.

State-of-the-Art Propulsion System

Figure 19A:
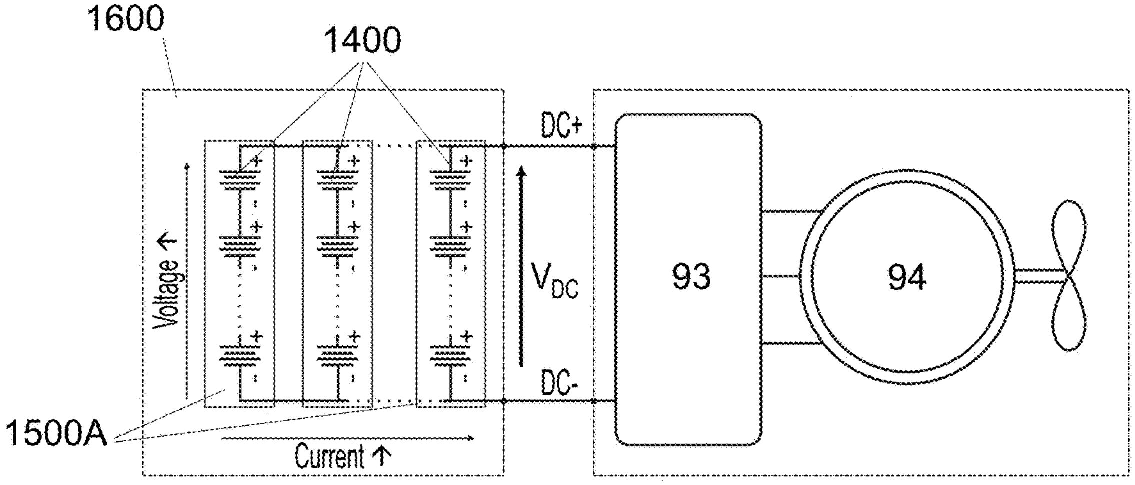
FIGS. 19A to 19C illustrate a state-of-the-art propulsion system of an aircraft.
Figure 19B:
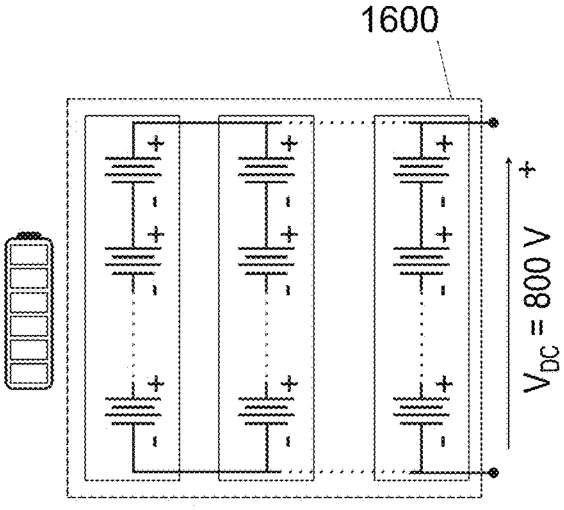
Figure 19C:
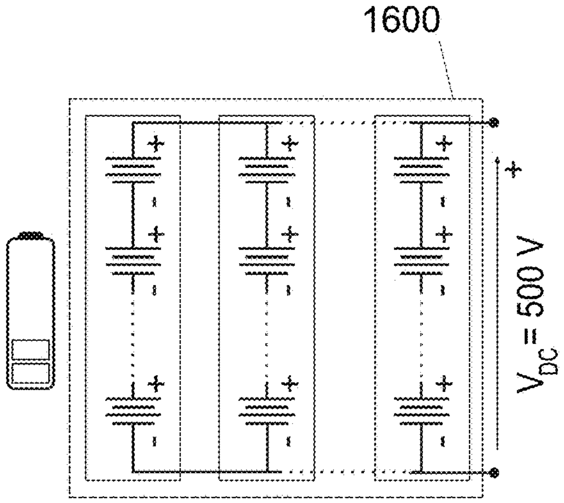

FIGS. 19A to 19C illustrate a state-of-the-art propulsion system used in an electrical or hybrid aircraft. The propulsion system illustrated in FIG. 19A comprises a group 1600 of multiple power sources in the following termed battery pack 1500A arranged and connected for providing an electrical energy source correspondingly as of FIG. 16. Each battery pack 1500A, also termed as string, comprises a plurality of battery packs, in the following termed as battery modules 1400 connected in series.

A battery module 1400 can be configured, as illustrated in FIG. 14A or 14B, thereby comprising a plurality of battery cells. The battery cells can be lithium-ion cells, each provided in a cylindrical shape. Other shapes, such as pouch cells, can be used instead. The technology or cell chemistry used can be one or a combination of the following: Lithium Nickel Manganese Cobalt Oxide, Lithium Nickel Cobalt Aluminium Oxide, Lithium Nickel Cobalt Manganese Aluminum Oxide, Lithium Manganese Oxide, Lithium Iron Phosphate, Lithium Cobalt Oxide, or Lithium Titanate. Some cell technologies listed are more suitable for aviation applications than others. In particular, cell technologies that have a high energy density and, at the same time, a low susceptibility to thermal events can be preferred.

The voltage of each battery pack 1500A, corresponding to the DC voltage VDC, can be flexibly configured by adding or removing battery modules 1400 to the in-series connected battery modules 1400. The output voltage of each battery pack 1500A results from the sum of the individual battery modules 1400 output voltages. The output current capability of the group 1600 acting as said power source can be flexibly configured by paralleling or removing paralleled battery packs 1500A. The energy source's output current corresponds to the sum of the individual currents supplied by each battery pack 1500A. The target/power supplyable by the group 1600 can be designed by initially defining a desired DC voltage, connecting the battery modules 1400 in series, and then paralleling further battery packs 1500A. Even though only three in-series connected battery modules 1400 per battery pack 1500A, and only three in parallel connected battery packs 1500A are illustrated, the group 1600 can be configured with any different number of battery modules 1400 or battery packs 1500A connected in series or parallel.

Battery packs 1500A comprising parallel connected battery modules 1400, or parallel connected strings of battery modules 1400, are known in the prior art and could be used in the aspects described in the disclosure. Serially connected battery packs 1500A are also known in the prior art and could be used in the aspects described in the disclosure.

The propulsion system illustrated also comprises a motor controller 93 connected at its input end to the group 1600 of multiple battery packs 1500A, and at its output end to a motor 94. The motor controller 93 converts the DC voltage VDC supplied at its input end to a three-phase AC voltage with variable amplitude and frequency at its output end for providing the motor 94 with electrical energy. The motor 94 can be configured as a three-phase induction or synchronous motor. The motor controller 93 outputs and controls the three-phase AC voltage, as required for the respective operating point of the motor 94.

FIGS. 19B and 19C show a detailed view of the group 1600 of multiple battery packs connected in parallel, illustrated in FIG. 19A, under varying state of charge conditions (battery symbol on the left) of the battery modules, in particular of the battery cells comprised therein.

When the multiple battery packs are fully charged (battery symbol six bars), the group 1600 supplies a DC voltage VDC of 800 V, as indicated in the example FIG. 19B. However, when the multiple power sources are partly discharged (battery symbol two bars), the group 1600 supplies a DC voltage VDC of 500 V, as illustrated in the example of FIG. 19C. Thus, the DC voltage VDC supplied by the group 1600 representing an energy source depends on the state of charge of the multiple battery packs, respectively, of the battery cells comprised therein. A failure of a single battery module comprised in a battery pack leads to the loss of a complete battery pack. In worst-case scenarios, the entire power source may be disconnected, thereby degrading the current supply capabilities of the group 1600. Disconnecting an entire power source also reduces the amount of suppliable electrical energy.

A further disadvantage of the state-of-the-art propulsion system using the energy source shown in FIGS. 19A to 19C is that it needs to be specifically designed for the highest voltages. The insulation coordination of each battery module needs to be designed for the highest suppliable voltage (including some safety margin). Therefore, many or all electrical and electronic components, such as cables, connectors, voltage and current sensors, processors, etc., need to be selected for the highest voltage. Suppose a battery pack is designed for supplying a DC voltage of 800 Vdc; all the components that are in contact with or in the vicinity of the supply voltage may need to be designed for or need to withstand at least 800 Vdc, preferably at least 1200 Vdc. This drastically limits the amount of selectable standard components and can increase the costs for the battery modules. In addition, this adds additional complexity to the design of the battery modules and other components of the battery packs.

The examples of the smart battery module, the electrical supply system and the propulsion system as illustrated in FIGS. 20A to 24 address and mitigate some of the disadvantages mentioned before. In addition, they provide further advantages that will become apparent in the following.

Smart Battery Module

Figure 20A:
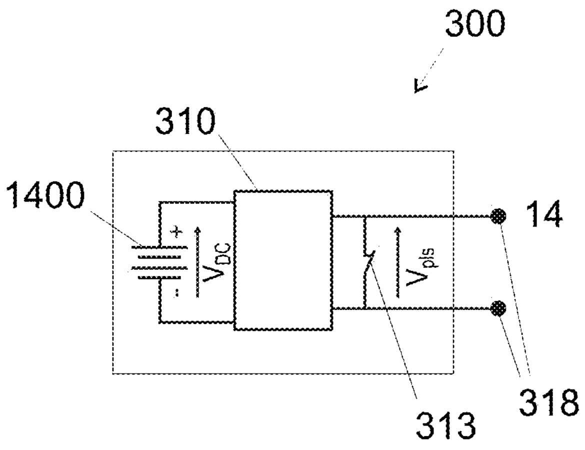
FIGS. 20A to 20D illustrate a smart battery module and variants of a pulsed DC voltage.

An example of a smart battery module 300 as storage module is shown in FIG. 20A. It comprises at least one battery module 1400, including a plurality of battery cells (not illustrated). The battery module 1400 can be configured as illustrated in FIG. 14A or 14B. However, the battery module 1400 can also be configured differently, and it can comprise any number of battery cells, and/or fuel cells, and/or supercapacitors, in any chemical, electrical or mechanical configuration or shape. A selection of cell technology and/or cell chemistry was presented before.

The battery module 1400 can be configured to output a DC voltage VDC. In this example, the DC voltage VDC supplied can vary between 50V and 36V (or lower), depending on the state of charge of the battery cells comprised in the battery module 1400.

The terminals of the battery module 1400 are connected to a power converter 310, whereby the power converter 310 can be configured as a DC/DC converter known from prior art. The power converter 310 can convert the input DC voltage into an output voltage that can be lower, higher or equal to the DC voltage at its input. The output voltage of the power converter 310 can be a DC voltage, and the output voltage can be outputted at the terminals 318 of the smart battery module 300. The power converter 310 can be configured as a buck, boost or buck-boost converter. The power converter 310 can be an isolated, a non-isolated DC/DC converter, and/or it can be inverting or not inverting, meaning that the output voltage can have an inverted or not inverted polarity compared to the DC voltage VDC supplied by the battery module 1400.

The terminals 318 of the smart battery module 300 can be short-circuited by controlling the switch 313 (and/or controlling a switch of the semiconductor stage 311) from a non-conducting state into a conducting state. The switch 313 can be a mechanical switch, such as a relay. In addition, the switch 313 can be configured as a normally-closed switch, thereby automatically short-circuiting the terminals 318 in the absence of a supply voltage.

In a preferred example, however, the power converter 310 is configured as a pulsed DC/DC converter for supplying a pulsed DC voltage Vpls, which has successive pulses (pulse train) at the output terminals 318. The average value of the pulsed DC voltage Vpls can be varied, e.g. by controlling the pulse width using pulse width modulation techniques. In this specific example, the highest average voltage outputted by the pulsed DC/DC converter can correspond to approximately the DC voltage VDC supplied by the battery module 1400 particularly when the pulse width corresponds to 100% of a switching period. In contrast, the lowest average voltage can correspond to zero volts. Other maximal, minimal, and average voltages, depending on the intended application, can be considered. The power converter 310 can contain semiconductor switches whose switching frequency can be variably changed. The switching frequency can be higher than 100 kHz, or higher than 200 kHz or higher than or equal to 250 kHz.

As mentioned before, the DC voltage VDC supplied by the battery module 1400 varies depending on the state of charge of the battery cells comprised in the battery module. In an embodiment by changing the pulse width, the power converter 310 can counteract this variation, thus supplying a non-varying stable output voltage (being it a DC voltage or pulsed DC voltage) at its terminals 318 independent from the state of charge mentioned before, at least in the voltage range mentioned before.

The battery module 1400, the power converter 310 and the switch 313 can be comprised or placed in a common housing for embodying the smart battery module 300. The housing can be made of a plastic material, thereby providing electrical insulation. Alternatively, the housing can be made of a conducting metallic material, such that it can act as a common potential reference for all components comprised in the housing.

Figure 20B:
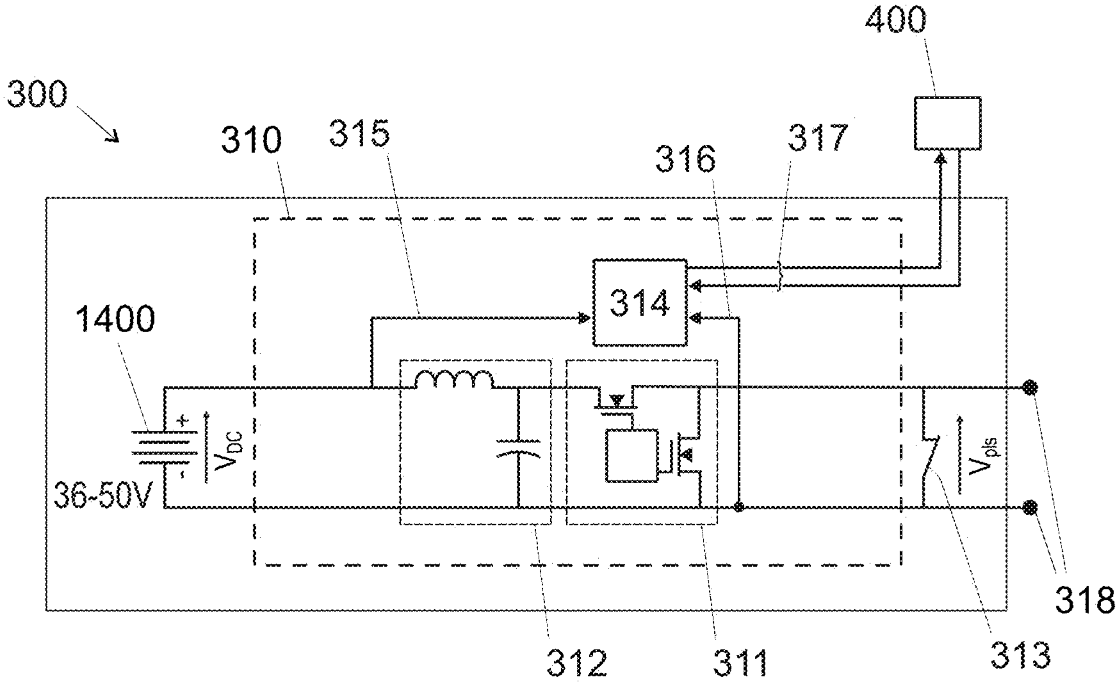

FIG. 20B illustrates the smart battery module 300 of FIG. 20A in an example and greater detail. The battery module 1400 is connected to the input end, and the by-pass switch 313 is connected to the output end of the power converter 310 for short-circuiting the terminals 318. The power converter 310 comprises an optional input filter stage 312 at its input end and a semiconductor stage 311 at its output end (between the terminals and the switch 313). The inductor of the filter stage 312 is connected in this example to the positive pole of the battery module 1400. The capacitor of the filter stage 312 is connected between the positive rail and the negative rail, whereby the negative rail is connected to the negative pole of the battery module 1400. The filter stage 312 as illustrated however, is one possibility for implementation. The smart battery module 300 can also comprise a first filter stage situated as illustrated and a second filter stage situated at the output end of the smart battery module 300. Each of the two said two filter stages can be configured in a LC configuration comprising an inductor in series with one rail and a capacitor connected to the two rails. Alternatively, or in addition, the first filter stage is configured as a double LC filter, whereby each stage of the double LC filter can be configured with a different resonance frequency. It should be understood that the filtering stage 312 may take any suitable form. In an embodiment a boost stage can be provided instead of a filter stage 312; the boost stage can be configured to provide both the voltage regulation and filtering.

The semiconductor stage 311 comprises a first semiconductor switch connected in series with the inductor of the filter stage 312 and the positive output rail, and a second semiconductor switch connected between the positive and negative output rail. The second semiconductor switch can be optional and can be used as an alternative or in addition to the switch 313 for short-circuiting the terminals. A diode might replace the second semiconductor switch. However, in the presence of both semiconductor switches, the first and second semiconductor switches are preferably alternately operated. The semiconductor switches used in the semiconductor stage 311 are fast switching high current semiconductor switches, such as IGBTs, MOSFETs, JFETs, etc. to mention a few. Preferably, Gallium Nitride, Gallium Arsenide or Silicon Carbide semiconductor switches are used for this purpose. The second semiconductor switch can be configured as a normally-on semiconductor switch, operating asynchronously to the first when connected to a common gate supply. This can be useful for this purpose as the terminals of the smart battery module 300 are short-circuited in the absence of a (gate) supply voltage.

The power converter 310 also comprises a voltage sensor 315 for measuring the voltage supplied by the battery module 1400, whereby the voltage sensor 315 is situated between the battery module 1400 and the filter stage 312. The power converter 310 may further comprise a second voltage sensor for measuring the voltage output from the filter stage 312; preferably the second voltage sensor may be operably connected between the filter stage 312 and the semiconductor stage 311 so as to measure the voltage at a node between the output of the filter stage 312 and the input to the semiconductor stage 311. In a variation of the embodiment shown in FIG. 20B, a boost stage may be provided in place of the filter stage 312; in this case the optional second voltage sensor may be operably connected between the boost stage and the semiconductor stage 311 (i.e. the second voltage sensor may be operably connected between the boost stage and the semiconductor stage 311) so as to measure the voltage at a node between the output of the boost stage and the input to the semiconductor stage 311. In addition, the power converter 310 may further comprise a third voltage sensor which is configured to measure the voltage at the output terminals of the semiconductor stage 311. It should be understood that in an embodiment the voltage sensor 315, and the second voltage sensor, and third voltage sensor are defined by three independent voltage sensors, but in another embodiment the voltage sensor 315, and the second voltage sensor, and third voltage sensor may be defined by the same single voltage sensor configured to sense voltage at each of the three locations in the assembly. Referring back to FIG. 20B, the power converter 310 comprises a current sensor 316 for measuring the current outputted by the power converter 310, respectively, by the smart battery module 300. The current sensor 316 is situated in the negative output rail between the semiconductor stage 311 and the switch 313 or in the negative output rail between the semiconductor stage 311 and the terminals 318, in the absence of the switch 313. In addition, the power converter 310 may comprise a second current sensor which is configured to measure the current of the battery assembly 1400. The second current sensor may be operably connected between the battery module 1400 and the filter stage 312; preferably the second current sensor is connected to the negative rail between the battery module 1400 and the filter stage 312. In the variation of the embodiment shown in FIG. 20B, wherein a boost stage is provided in place of the filter stage 312; in this case the optional second current sensor may be operably connected between the battery module 1400 and the boost stage; preferably second current sensor is connected to the negative rail between the battery module 1400 and the boost stage. It should be understood that in an embodiment the current sensor 316 and the second current sensor, are defined by two independent current sensors, but in another embodiment the current sensor 316 and the second current sensor may be defined by the same single current sensor configured to sense current at each of the two locations in the assembly. The controller 314 is operably connected to the voltage and the current sensor(s) 315, 316 in the assembly (including to any of the optional second and third voltage sensors and second current sensor, mentioned above) and the measurement signals are output to and processed by the controller 314. In addition, the controller 314 is operably coupled to the semiconductor switches in the semiconductor stage 311 over an interposed gate drive unit comprised in said semiconductor stage 311. The controller also is operably coupled to the switch 313 if present. The controller 314 can be foreseen as a control unit closest to the hardware and can be designed exclusively for controlling and monitoring the components contained in the smart battery module 300. The controller 314 is configured as a commercial off-the-shelf microcontroller or DSP. In an embodiment the smart battery module 300 may further comprise, or may be further operable connected to, a voltage sensor that is configured to measure the input voltage of an semiconductor stage 311 and is operably connected to the microcontroller.

Figure 25A:
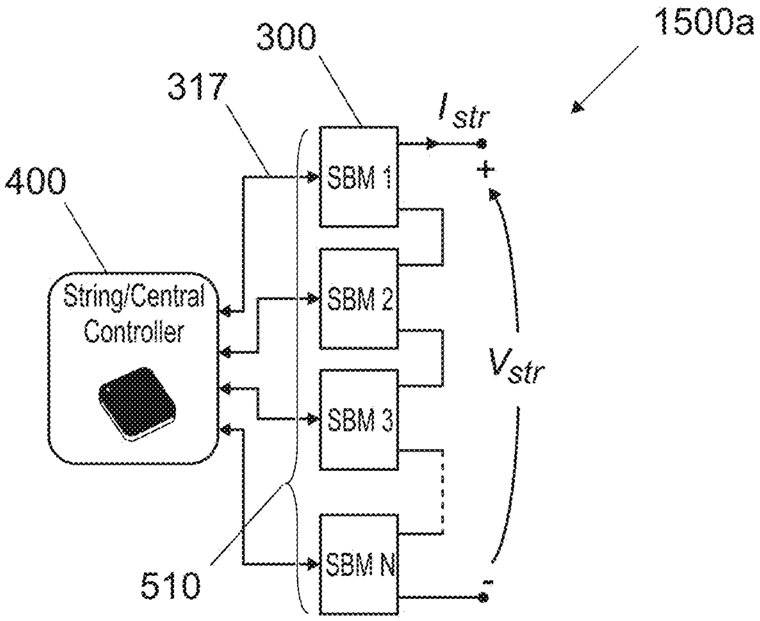
FIG. 25A illustrates an electrical supply system according to an embodiment of the present disclosure.
Figure 25B:
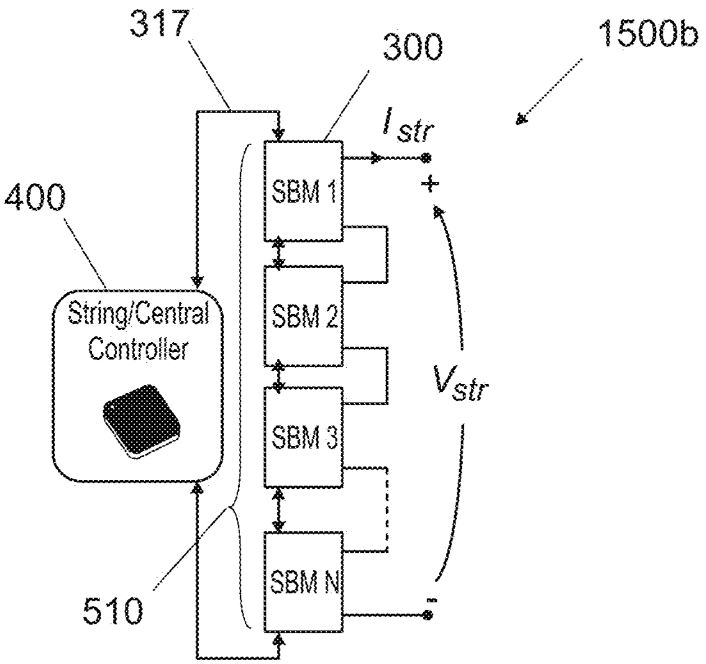
FIG. 25B illustrates an electrical supply system according to an embodiment of the present disclosure.

The controller 314 is also operably coupled to a control device 400 external to the smart battery module 300 over a bi-directional communication line 317. The controller 314 could be a processor, such as a digital signal processor, or an FPGA, for example. The controller 314 have a dedicated communication line with the external control device 400 (as illustrated in FIG. 25A), or can communicate through a shared communication bus, as shown in FIG. 25B.

The controller 314 receives a synchronisation signal and a control value for a voltage setpoint from the control device 400. The synchronisation signal can be a pulse or any other analogue or digital signal. The controller 314 can be configured to detect internal failures or errors of the smart battery module 300, such as under-voltage at its input end, overvoltage at its input or output end, overcurrent at its input or output end, insulation fault, etc. The controller 314 can be arranged to share failures or other internal status information with the control device 400 over the communication line 317.

Instead of receiving only a voltage setpoint from the control device 400, the controller 314 can receive an output voltage feed-forward setpoint and a current setpoint/reference. The controller 314 controls the output current according to the current command and limits the output voltage in dependency to the output voltage feed-forward setpoint, or vice versa. Alternatively, the controller 314 can receive a voltage feed-forward setpoint and a current setpoint or limit. In the following the output voltage feed-forward setpoint and a current or limit are termed control values. This control method can be useful if the smart battery modules 300 are arranged in strings and the strings are paralleled. In said configuration each controller then contributes to ensuring that the string current is (which is common to all the smart battery modules 300) corresponds to its current setpoint. This is particularly important in case of multiple paralleled strings, where without such a current control loop, current sharing would be unequal.

Once the controller 314 receives the control value(s) from the control device 400, the controller 314 opens the switch 313 and/or controls the second semiconductor switch into a non-conductive state, so the terminals 318 are not short-circuited. In addition, the controller 314 controls the first semiconductor switch to provide the demanded voltage in the form of the pulsed DC voltage Vpls measurable between the terminals 318. The voltage average supplied can correspond to the control value or to the output voltage feed-forward setpoint mentioned before. The controller 314 controls the switching frequency and/or the related pulse width of the first semiconductor switch for specifically setting the voltage average of the pulsed DC voltage Vpls corresponding to the control value or to the output voltage feed-forward setpoint. Alternatively, as mentioned, the controller 314 controls the switching frequency and/or the related pulse width of the first semiconductor switch for specifically the output current in dependency on the current setpoint. Alternatively, or in addition, the controller 314 may be configured to control the switching frequency and/or the related pulse width of the first semiconductor switch as a function of a predefined balancing function(s), with respect to the temperature, State-of-charge, state-of-health, or battery voltage. The controller 314 also synchronises its switching cycles to the synchronisation signal received from the control device 400.

The controller 314 can be configured with an internal clock unit, which automatically synchronizes the switching cycles executed by the gate drive unit with the synchronisation signal.

As one can notice, the power converter 310 preferably lacks a capacitor at the circuit output for smoothing the pulsed DC voltage Vpls. The control of the power converter 310 is simple, as only one semiconductor switch or a pair of semiconductor switches needs to be permanently switched to convert the DC voltage VDC supplied by the battery module 1400 into the output voltage provided between the terminals 318. In addition, the power converter 310 is highly efficient owing to the use of the wide bandgap semiconductor switches mentioned before.

The power converter 310 allows to charge the plurality of battery cells comprised in the battery module 1400. Suppose a voltage is applied to the terminals 318, a current can flow in the positive output rail through the body diode or channel of the first semiconductor switch and the inductor of the filter stage 312 into the battery module 1400. The voltage between the terminals 318 may be higher than the actual voltage of the battery module 1400 to cause a current to flow. The current flowing can be interrupted by activating the second semiconductor switch. In fact, the power converter 310 allows a bi-directional flow of electrical energy.

Figure 20C:
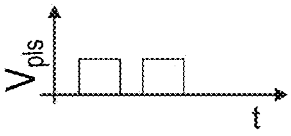

FIG. 20C illustrates the output voltage measurable between the terminals of the smart battery module while the power converter is operating over time t. It can be noticed that the power converter outputs the pulsed DC voltage Vpls, whereby the amplitude of said pulsed DC voltage Vpls corresponds to approximately the semiconductor stage 311 input DC voltage. This pulsed DC voltage Vpls can have the maximal average value close to (e.g. within a predefined range of) the voltage supplied by the battery module in cases when an input filter is used. In a variation of the embodiment wherein a boost stage is provided in place of the filter stage 312 the pulsed DC voltage Vpls can have a maximal average value different to the battery module voltage. The equation for the pulse width controlled by the controller can be written as:

$$W = \frac{T_{on}}{T_{period}} \quad (1)$$

where:

W denotes the pulse width as a fractional number;

$T_{on}$ denotes the duration of the signal being in the "on" state, corresponding to the conduction time of the first semiconductor switch; and $T_{period}$ denotes the total time taken to complete one switching cycle and corresponds to the reciprocal of the switching frequency.

The voltage average of the pulsed DC voltage Vpls can be approximated by the equation:

$$V_{avg,pls} = W \cdot V_{DC} \quad (2)$$

where:

$V_{avg,pls}$ denotes the voltage average disregarding losses, such as conduction losses;

W denotes the pulse width; and $V_{DC}$ denotes the DC voltage at the input end of the semiconductor stage 311.

As mentioned before, the voltage average $V_{avg,pls}$ can be controlled by simply changing and controlling the pulse width W. In fact, by measuring the input voltage of the semiconductor stage 311 using a the voltage sensor (such as the afore-mentioned second voltage sensor), the controller can determine or calculate the pulse width required for outputting the voltage average of the pulsed DC voltage Vpls due to the linear relationship. The same methodology can be used to control the output current. The current sensor measures the output current, and the pulse width is varied until the output current corresponds to the current command. The control mode explained in FIG. 20C is valid if the first semiconductor switch is switched and the second semiconductor switch remains in its non-conductive state or if the first and the second semiconductor switches are switched alternately to one another.

It needs to be noted that even though only a few control methods were outlined before, namely a simple output voltage control and a current control, other control methods may be used instead.

Figure 20D:
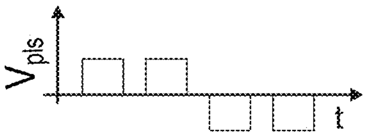
Figure 25C:
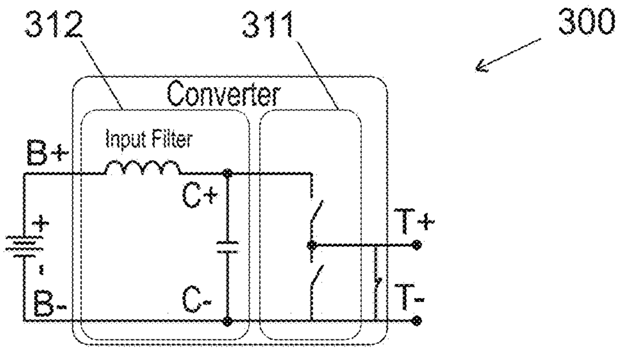
FIG. 25C shows an exemplary configuration that the smart battery modules in the electrical supply systems of the present disclosure can have, comprising an input filter and a semiconductor stage.
Figure 25D:
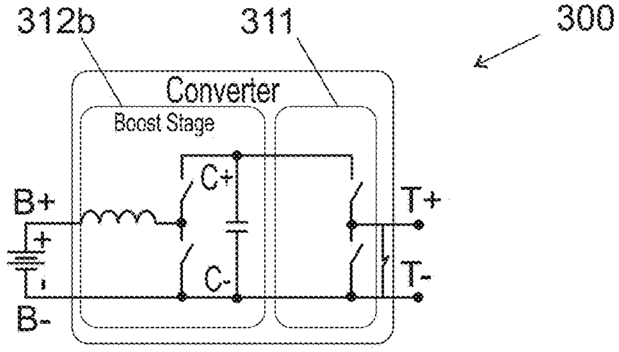
FIG. 25D shows an exemplary configuration that the smart battery modules in the electrical supply systems of the present disclosure can have, comprising a boost stage and a semiconductor stage.
Figure 25E:
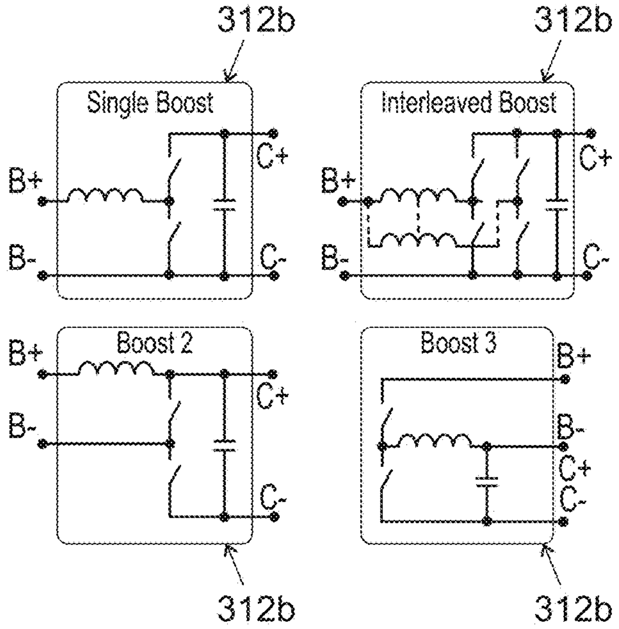
FIG. 25E illustrates some examples of some possible input filter configurations, possible boost stage configurations, that the smart battery modules in the electrical supply systems of the present disclosure can have.
Figure 25F:
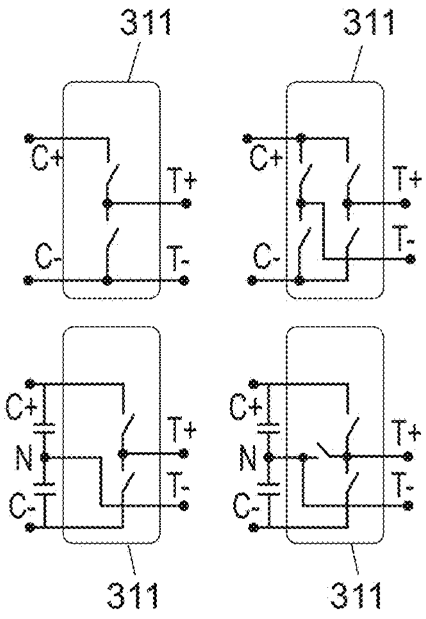
FIG. 25F illustrates some examples of some possible semiconductor stage configurations that the smart battery modules in the electrical supply systems of the present disclosure can have.

FIG. 20D illustrates the output voltage measurable between the terminals of the smart battery module in an example where the first and the second semiconductor switch of FIG. 20B constituting a half-bridge are replaced by a full-bridge (as illustrated in FIG. 25F), thereby comprising in total four semiconductor switches, whereby the semiconductor switches are switched crosswise. By slightly changing the design of the semiconductor stage, the smart battery module 300 of FIG. 20B can output a pulsed DC voltage Vpls with positive and negative pulses, as illustrated in FIG. 20D. The voltage average output from the battery module 300 can thus be controlled to provide both positive and negative average output voltage, enabling further concepts, as will become apparent in the following. Of course, the power converter can still be configured to allow a bi-directional flow of electrical energy to charge or drain energy from the battery module 300. Alternative semiconductor stage configurations, comprising only of a half-bridge and DC middle point, or of a t-type neutral point clamped converter are also possible, as illustrated in FIG. 25F. These alternative provide the possibility to control the average value of the output voltage to have an arbitrary positive or negative value.

Electrical Supply and Propulsion System

Figure 21A:
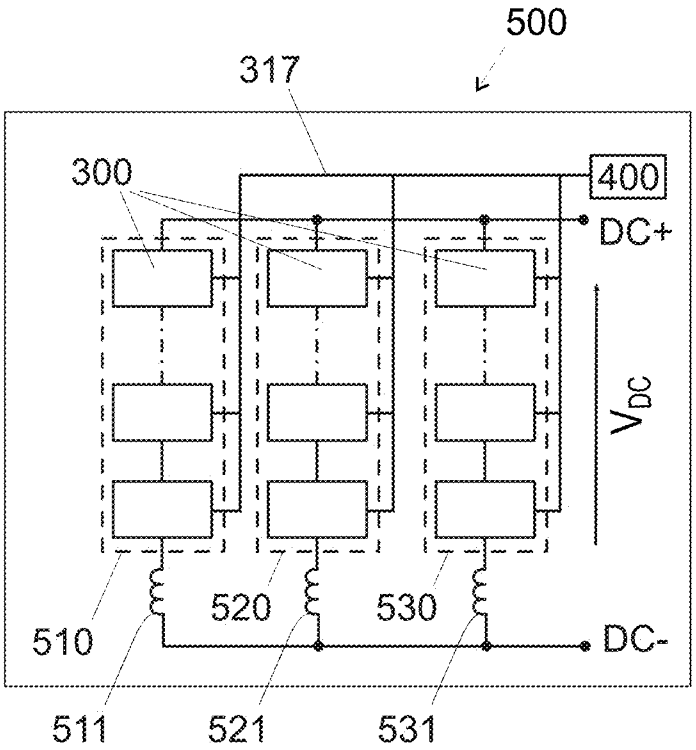
FIGS. 21A and 21B illustrate an electrical power supply system arranged for supplying a DC voltage.
Figure 21B:
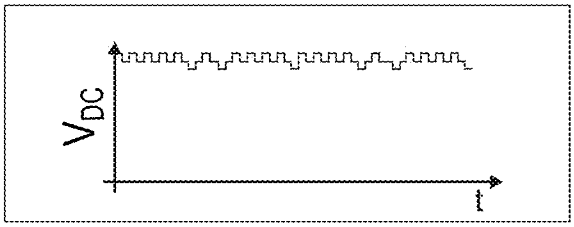

FIGS. 21A and 21B illustrate an electrical supply system 500 composed of a plurality of smart battery modules 300. The electrical supply system 500 comprises three strings 510, 520, 530 wherein each string 510, 520, 530 holds a plurality of smart battery modules 300, each configured as shown in and explained for FIGS. 20A to 20C, connected in series. Therefore, each battery pack 510, 520, 530 can supply a total voltage corresponding to the sum of the individual output voltages supplied by the smart battery modules 300 comprised in the related battery pack. The number of illustrated battery packs 510, 520, 530, smart battery modules 300, and inductances 511, 521, 531 is for illustrative purposes only and not limiting. The electrical supply system 500 can comprise any number thereof.

Each string is also connected to or comprises an inductance 511, 521, 531 in series with one of the in-series connected smart battery modules 300. Each inductance 511, 521, 531 can be configured as a choke or inductor with a ferrite core. More preferably, instead of using concentrated components holding ferrite materials, each inductance 511, 521, 531 is embodied as a cable or a conductor, in which parasitic inductance and resistance are used to establish a required impedance. This can be achieved thanks to the high switching frequency of the semiconductor switches. Each string 510, 520, 530 is connected to the positive DC rail at one end. The positive rail can be configured as a busbar, cable or any other component suitable for collecting and conducting the energy supplied at the one end. The inductance 511, 521, 531 associated with each string 510, 520, 530 is connected to the negative rail equally configured as the positive rail. The inductances 511, 521, 531 are used for limiting and smoothing the current.

Each controller of the smart battery modules 300 is operably connected over the bi-directional communication line 317 to the control unit 400. The bi-directional communication line 317 can be configured as a communication bus, such as a field bus (including safety or real-time field bus). Possible but not exclusive configuration and control modes are discussed in the following.

The control unit 400 sends recurring or periodic synchronisation signals to all controllers so they can synchronize their internal clock with the synchronisation signal sent by the control unit 400. The synchronisation signal can be sent at a much lower frequency than the internal clock of the controller, for example less than one every minute. This can save bandwidth if a communication bus is used.

In return, each controller sends the measured input voltage, corresponding to the DC voltage supplied by the related battery module, to the control unit 400 over the bi-directional communication line 317. The control unit 400 calculates a corresponding control value or a set of control values for each controller, and the individual control value(s) is sent to the controller of each smart battery module 300.

In the configuration that twenty smart battery modules 300 per battery pack 510, 520, 530 (as a non-limiting example) are connected in series, each battery module comprised in the corresponding smart battery module supplies a voltage of 40V, and the desired DC voltage VDC* provided by the electrical supply system 500 corresponds to 600V, the control unit 400 sends a control value of 30 V to each controller. Alternatively, the output voltage feed-forward setpoint and the DC current command are send by the control unit 400. In return, each smart battery module 300 controls its output voltage average to 30 V (by setting or controlling the pulse width correspondingly), such that the average of the sum of the output voltages of the in series-connected smart battery modules 300 accumulates to the required DC voltage VDC* supplied by the electrical supply system 500. When the DC current command is send in addition, e.g. with a value of 20 A, the output current is controlled accordingly to this value, which can also result in an output voltage average of 30 V. Suppose the input voltages of each smart battery module 300 vary over time due to a change in the state of charge, the control unit 400 can determine and vary each control value correspondingly, such that the DC voltage VDC* is output independent from the state of charge of the battery module contained in the related smart battery module 300. The said independence is given as long as the level of the output voltage average is lower than the input voltages.

An ideal scenario was assumed in the control mode presented, meaning that the first semiconductor switch of each smart battery module 300 switches synchronised. This can lead to a high voltage ripple in the DC voltage VDC* supplied. More preferably, the smart battery modules 300 of each string 510, 520, 530 switch each first semiconductor switch with a time delay, so that the voltage ripple is reduced. For this purpose, the control unit 400 can send a switching sequence, for example in the form of a delay time, to each controller of each smart battery modules 300. Since the controllers are synchronised with each other due to the synchronisation signal provided by the control unit 400, each controller can delay for a time specified by control unit 400 before a switching action of the first semiconductor switch (and the second semiconductor switch) is carried out. This can considerably reduce the ripple of the voltage. In summary, the first semiconductor switches of the smart battery modules 300 are switched staggered to each other. The same strategy can be followed when the semiconductor stage is configured as a full bridge, cf. FIG. 20D. The control mode of delaying the switching sequence (or successive switching cycles) unfolds its full potential when a large number of smart battery modules 300 are connected in series to form the string 510, 520, 530. Then the slope of the voltage change of the common output voltage can be finely adjusted.

The advantage over the power supply system shown in FIGS. 19A to 19C is obvious. The output voltage is no longer directly dependent on the state of charge of the battery modules and the battery cells contained therein but can be kept constant as long as the state of charge of the battery modules permit. Furthermore, the electrical power supply system 500 can be flexibly provided for a suitable output voltage (series connection) or output current (parallel connection). Furthermore, the failure of a smart battery module 300 does not lead to a whole string being disconnected, but the remaining functioning smart battery modules 300 can compensate for the failure by adjusting their output voltage (if the state of charge permits). The smart battery module 300 facing the failure is bypassed by bringing the bypass switch and/or the second semiconductor switch into a permanent conducting state. In addition, the focus can be set on a high degree of uniformity or reusability so that the electrical energy supply system 500 can be designed cost-efficiently using low-voltage lightweight off-the-shelf standard components. When the controller of a smart battery module 300 detects an internal fault or failure, the controller controls the switch and/or the second semiconductor switch into a conductive state. Furthermore, the fault or failure is reported to the control unit 400 via the bidirectional communication line 317 (see for example FIG. 21A) so that the control unit 400 adjusts the voltage and/or current setpoints for the non-faulty smart battery modules, compensating for the failure of the one faulty smart battery module.

The effort for the insulation coordination can also be reduced, as the smart battery modules 300 only require and need to withstand the voltage supplied by the battery module, which can preferably be below 100V, more preferably below 80V, and most preferably below 60V. Finally, the electrical energy supply system 500 can provide different output voltage forms (also termed waveforms) by simply adapting the control system and the related control mode, which will become apparent in the following.

FIG. 21B illustrates the DC voltage VDC* supplied by the electrical supply system of FIG. 21A controlled according to the control mode mentioned. As it can be noticed, the power supply system outputs an almost perfect DC voltage with a residual periodic variation of the DC voltage level. The residual periodic variation originates from the smart battery modules 300 and their pulsed DC voltage. In real-world applications, the residual voltage variation is not a problem. Strictly speaking, the DC voltage VDC* resembles the DC voltage VDC supplied by the battery modules. The DC voltage VDC* at the string output is slightly different (smoother) due to the smoothing effect of the inductance. Suppose the electrical power supply system 500 is connected to a motor controller (e.g. illustrated in FIG. 19A). In that case, the residual periodic variation will be further reduced or completely cancelled by the DC link capacitors comprised in the motor controller, due to the low pass nature of the effective LC filter. Furthermore, the residual periodic variation for purely resistive loads has no adverse effects, and they can be connected directly to the DC voltage.

The examples illustrated in FIGS. 21A and 21B are related to the generation and supply of the DC voltage. However, the energy supply system can also be configured to supply a single-phase AC voltage. The electrical structure, as illustrated in FIG. 21A remains unchanged, but the control mode needs to be adapted correspondingly. Instead of transmitting a time-invariant control value to the controllers of the smart battery modules 300, the control unit 400 varies the setpoint voltage value over time, such that the voltage measured between the terminals (not referenced in FIG. 21A) is modulated. The control value can be calculated or determined individually for each smart battery module 300 based on the measured and outputted voltage of the battery module or can also be calculated or determined based on the measurement of the energy supply system 500 output voltage using the feedback loop mentioned before. It is noteworthy that in such a system the feedback loop would be most likely closed by the current measurements, i.e. the ac current would be measured and communicated to the control unit 400, which will calculate the corresponding voltage setpoint. In addition, due to the high bandwidth capabilities of the smart battery modules 300, the control can be partly performed in the central controller 400, and partly in a distributed manner, i.e. by the smart battery modules 300. In any of the cases mentioned, the voltage provided by each smart battery module 300 varies over time, dependent on the control value provided and sent to the smart battery modules by the control unit 400. Preferably, the control value can vary around a predetermined average value. For example, this average value can be half the voltage provided by the smart battery modules 300, so that for the positive half-wave of the AC voltage, the control value is increased (starting from the said average value) and for the negative half-wave the control value is reduced. The output single-phase AC voltage then oscillates around an average value corresponding to an offset. The curvature of the single-phase AC voltage supplied by the energy supply system 500 can correspond in this example to the voltage illustrated in FIG. 22B. The frequency between 0 Hz (corresponding to a DC value) and 100 Hz, or even higher such as several kHz can be variably selected. Advantageously, the power supply system 500 can be capable of outputting different voltage forms simply by changing the control strategy, e.g. by adapting the software of the control unit 400, so that the power supply system 500 can be used in a variety of applications and is not necessarily limited to use in motor control applications. When the semiconductor stage is configured as outlined in FIG. 20D, the oscillation around the average value, in particular the need for an offset injection into the output voltage, is omitted, and the energy supply system 500 can output an offset-free sinusoidal AC voltage. Furthermore, the AC voltage provided by the power supply system 500 can be of any shape, provided that the control values are appropriately set by the control unit 400.

The disadvantage of using the power converter of FIG. 20B when outputting an AC voltage, however, is that the smart battery module faces a second harmonic power fluctuation due to its single-phase nature. Suppose the said harmonic fluctuation is not mitigated. In that case, it can penetrate the battery module connected to the input end of the power converter of the first semiconductor switch. Said harmonic power fluctuation can reduce the lifetime of or damage the battery module. Alternatively, the filter stage, as illustrated in FIG. 20B is configured to mitigate said second harmonic power fluctuations, e.g. using an active filter or a boost stage as illustrated in FIG. 25E.

Figure 22A:
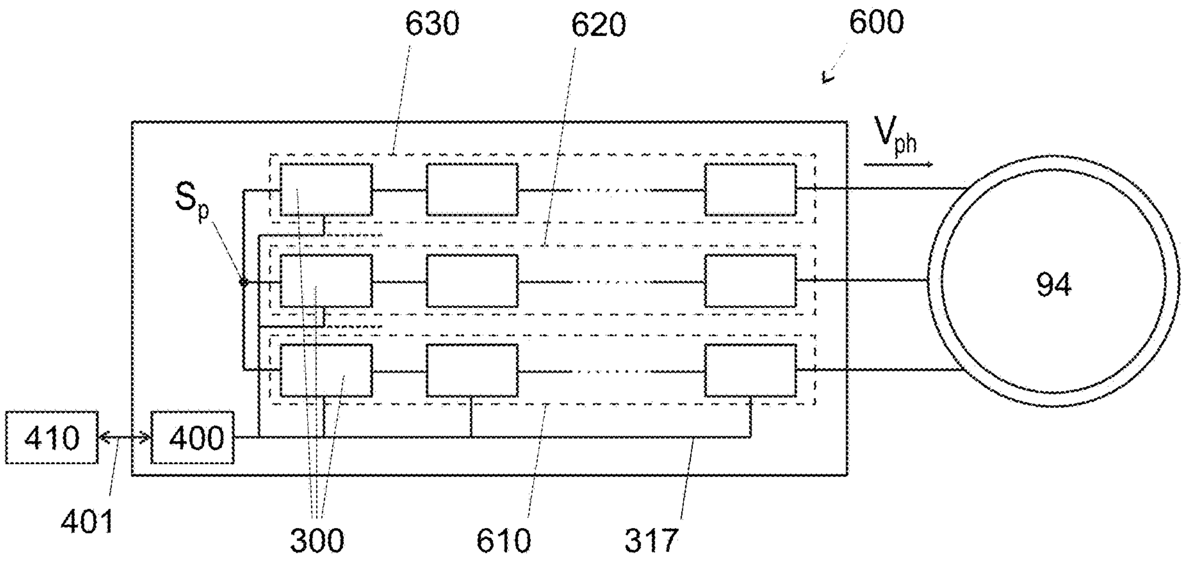
FIGS. 22A and 22B illustrate an electrical power supply system arranged to supply a three-phase AC voltage to an AC motor, thereby constituting a propulsion system.

FIG. 22A illustrates an electrical power supply system 600 arranged to supply a three-phase AC voltage to an AC motor 94, constituting a propulsion system. The AC motor 94 supplied by the electrical power supply system 600 can be configured as an induction or synchronous motor. Preferably, the motor 94 is provided as a permanent synchronous motor. The electrical power supply system 600 comprises a total of three strings 610, 620, 630. Each string 610, 620, 630 comprises a plurality of in series connected smart battery module 300. Each smart battery module 300 is configured as illustrated and explained in FIGS. 20A and 20B.

The control unit 400 is connected over the bi-directional communication line 317 with each smart battery module 300 and is configured with the same functionality as outlined for FIGS. 20B and 21A. In contrast to FIG. 21A, however, the strings 610, 620, 630 lack the series connection of the inductance. In this example, the non-illustrated motor phase inductances replace the said inductances. However, in case of a need of higher power capabilities, parallelizing of strings 610, 620, 630 can require an inductance, where a small inductance, such as provided by a cable parasitic inductance, typically suffices.

The strings 610, 620, 630 are connected at one end to form a star point Sp. At the opposing end, the electrical power supply system 600 supplies a three-phase AC voltage to the motor 94. The number of illustrated strings 610, 620, 630, smart battery modules 300, phase lines, etc., is for illustrative purposes only and is not limiting. Each phase line can also comprise multiple parallel-connected strings for increasing the current output capabilities and more or less in series-connected smart battery modules 300, thereby increasing the voltage output capabilities.

The three-phase AC voltage outputted by the electrical power supply system 600 is variable in its amplitude and frequency, such that the speed and the torque of the motor 94 connected thereto can be variably controlled. In this example, the phase angles of the three output AC voltages are offset by 120°, which is typical for a symmetrical three-phase AC system. The control unit 400 receives over a further bi-directional communication line 401 a setpoint from a higher-level vehicle control unit 410, for example, for the torque that the motor 94 should generate for propelling the vehicle. The control unit 400 correspondingly calculates and determines the required control values for the controllers contained in the smart battery modules 300, so that each smart battery module 300 supplies the voltage according to the control values.

In addition, the control unit 400 varies the control values over time, such that an AC voltage is output for each phase with the abovementioned characteristics, thereby controlling the torque and the speed of the motor 94. The control unit 400 can implement a field-oriented-like control, whose output is the control values for the smart battery modules 300 in each string 610, 620, 630. Consequently, the electrical power supply system 600 replaces a classical motor controller widely used in the state-of-the-art for driving the motor 94.

Figure 22B:
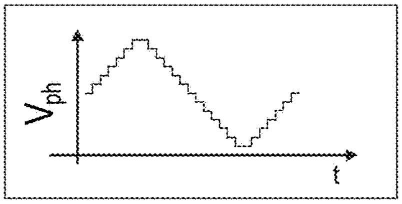

FIG. 22B illustrates the phase voltage Vph of one motor phase of the motor shown in FIG. 22A. As it can be noticed, the phase voltage Vph corresponds to an almost ideal sinewave with a permanent voltage offset. The staircase effects visible are exaggerated but come from switching the smart battery modules of FIG. 22A. As mentioned before, the frequency and the amplitude set or controlled are dependent on the motor operation point related to the setpoint from a higher-level vehicle control unit.

Figure 23A:
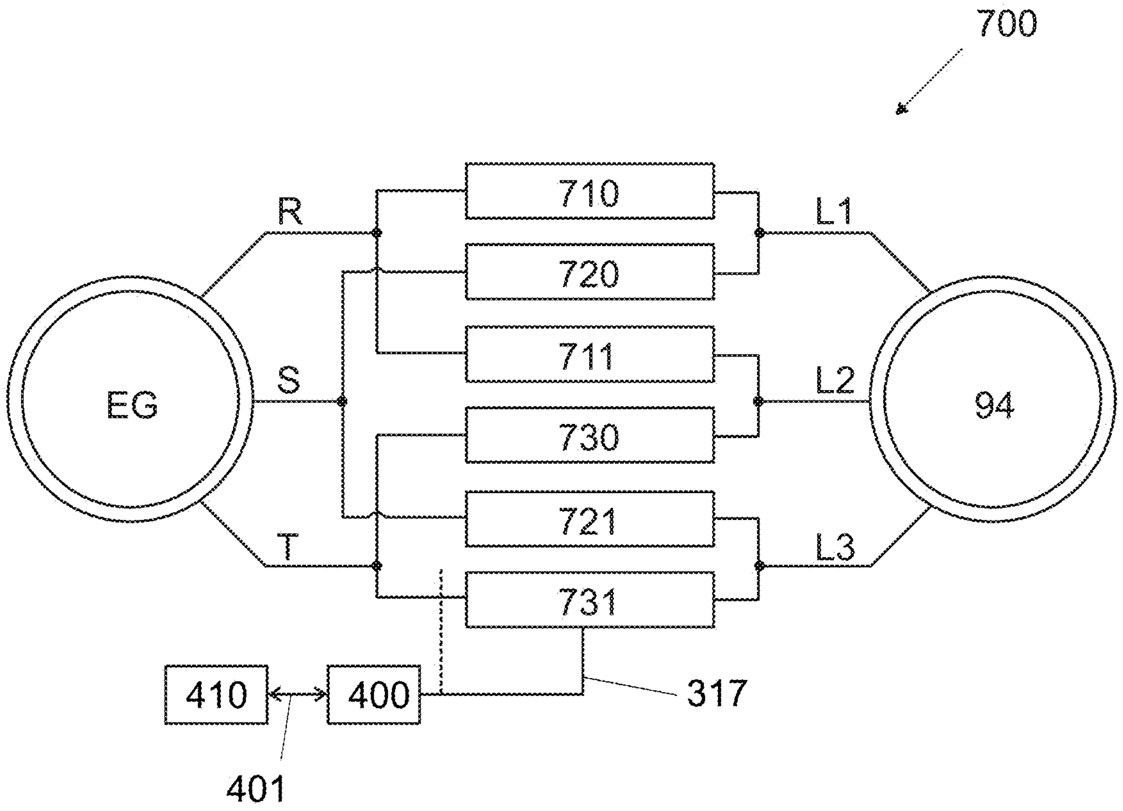
FIGS. 23A to 24B illustrate an electrical power supply and conversion system arranged to convert the electrical energy supplied by an electric generator into electrical energy sufficient for the motor, thereby constituting a propulsion system.

FIG. 23A illustrates an electrical power supply and conversion system 700 arranged to convert the electrical energy supplied by the electric generator EG into electrical energy sufficient for the motor 94. The electric generator EG can be driven by a combustion engine typically used in aviation applications, especially for hybrid aircraft.

The motor 94 can be configured as outlined in FIG. 22A. The electrical power supply and conversion system 700 comprises a plurality of battery packs (or strings) 710, 711, 720, 721, 730, 731 connected in series in a ring circuit with different taps for interfacing the electric generator EG and the motor 94. As mentioned before, the electric generator EG supplies electrical energy in the form of a three-phase AC voltage with variable amplitude and frequency and the motor 94 receives electrical energy also in the form of a three-phase AC voltage with variable amplitude and frequency, thereby the amplitude, the frequency and the phase of the AC voltage outputted by the electric generator EG and the AC voltage inputted by the motor 94 can be arbitrary to each other. The ring circuit constitutes an AC-to-AC converter capable of storing electricity in the battery cells comprised in the smart battery modules. This results from the interconnected strings 710, 711, 720, 721, 730, 731 mentioned interfacing said devices.

The battery packs 710, 711, 720, 721, 730, 731 as such comprise as said a plurality of in-series connected smart battery modules as of FIG. 20B, but with the semiconductor stage configured as a full bridge, such that each smart battery module can output the pulsed DC voltage illustrated in FIG. 20D. The power converter of each smart battery module allows a bidirectional flow of electrical energy.

The electrical power supply and conversion system 700 also comprises the control unit 400, which is operably coupled to each string 710, 711, 720, 721, 730, 731 and the controller of the smart battery module, respectively, through the bi-directional communication line 317 (indicated by the dotted line). The control unit 400 is equally configured as outlined in FIG. 21A or FIG. 22A, and thus provided to send control values to the controllers of the smart battery modules dependent on the required energy conversion. The control unit 400 correspondingly receives over the further bi-directional communication line 401 a setpoint related to the required energy conversion from the higher-level vehicle control unit 410, for example, the torque that the motor 94 should apply. The operation of the combustion engine driving the electric generator EG can also be controlled by the vehicle control unit 410, or by a different not illustrated control instance.

In summary, as illustrated, the interconnection of the strings 710, 711, 720, 721, 730, 731 offer the possibility of interfacing the electric generator EG with the electric motor 94, whereby each can run at an arbitrary frequency. This can provide the advantage of running the electric generator EG at an optimal speed, corresponding to its highest efficiency. In addition, battery cells contained in the battery modules mentioned, can buffer the surplus of generated electrical energy or aid the electric generator EG in case of lack of power production. The battery cells comprised in the battery module of each smart battery module can be charged by the electric generator EG during the operation, where the difference between the produced power and consumed power (by the motor 94) charges the battery cells. In case of failure/turn off of the electric generator EG, the motor 94 can continue seamless operation solely by being supplied by the smart battery modules. No configuration change is required in either case, as the process is inherent to the converter architecture. All of the above advantages are achieved by using the strings 710, 711, 720, 721, 730, 731 in the configuration as described above. The control unit 400 can also provide other functions not mentioned earlier by simply adapting the software, leading to further advantages.

Figure 23B:
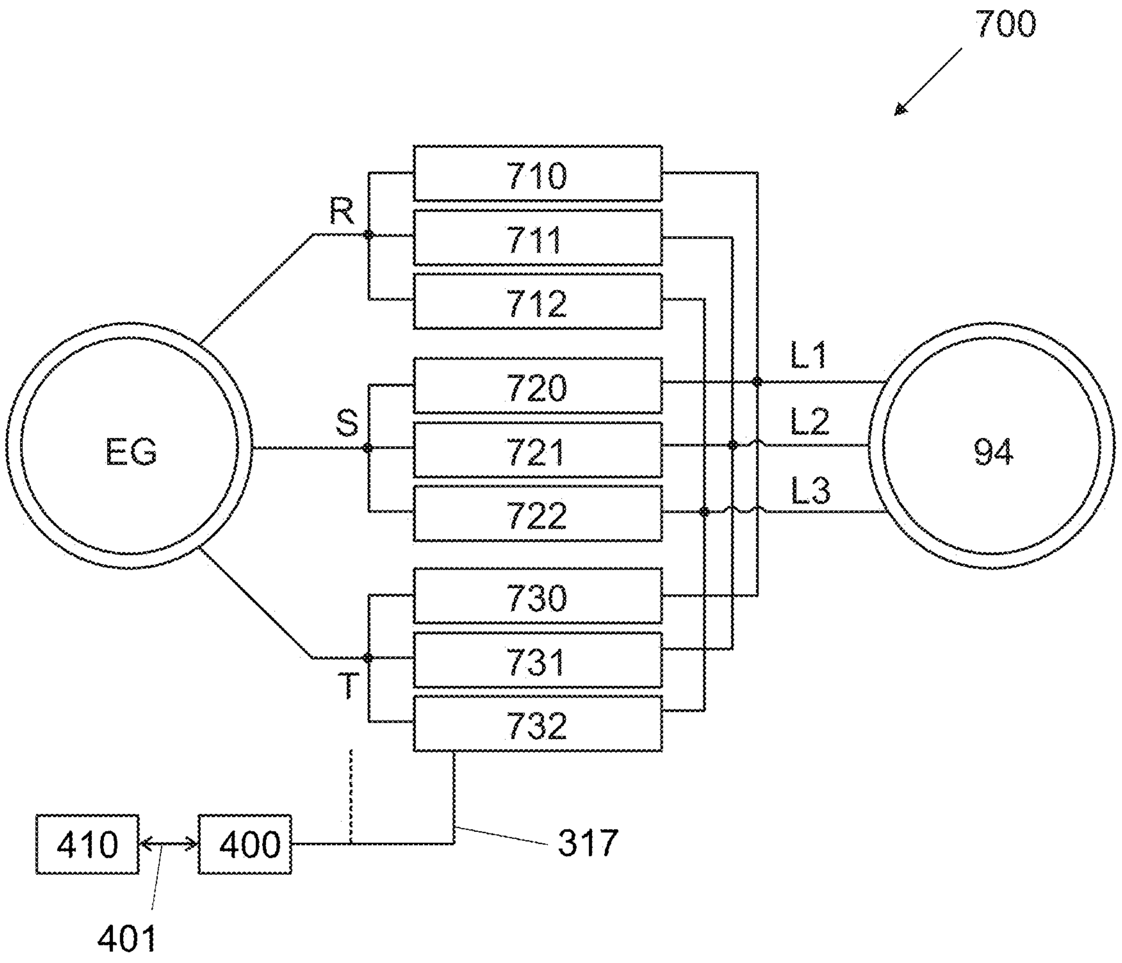

FIG. 23B illustrates an alternative example of the electrical power supply and conversion system 700 illustrated in FIG. 23A. All the considerations mentioned in FIG. 23A. The electrical power supply and conversion system 700 as illustrated, comprises nine strings 710, 711, 712, 720, 721, 722, 730, 731, 732 (instead of six). This topology can provide a higher redundancy in case of a failure in one of the strings.

Figure 24A:
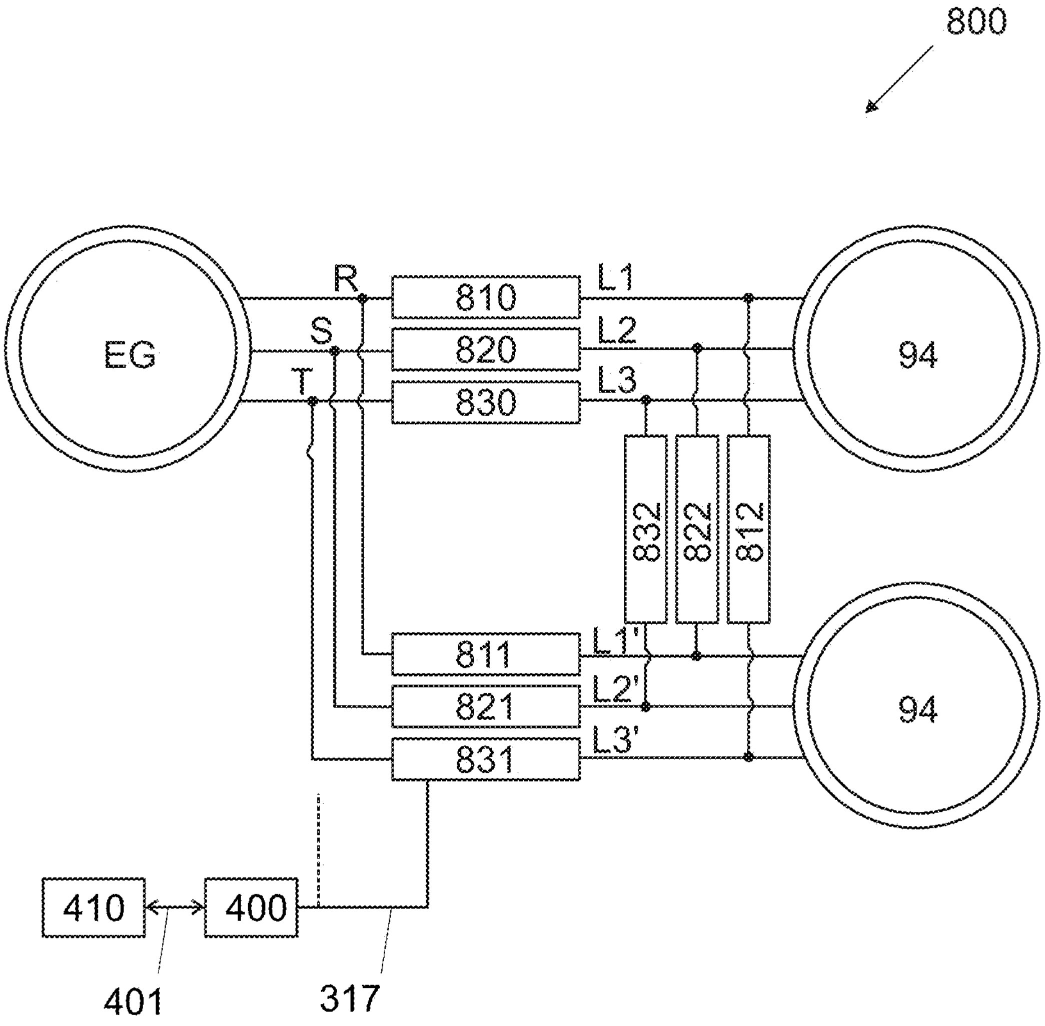

FIG. 24A illustrates an electrical power supply and conversion system 800 arranged to convert the electrical energy supplied by the electric generator EG into electrical energy sufficient for the motor 94. Even though two distinct motors are illustrated, the motor coils can be contained in one common housing with a common rotor and can equally contribute to the motor torque when energised. The strings 810, 811, 812, 820, 821, 822, 830, 831, 832 are similarly configured as explained for FIG. 23A. The control unit 400 and the higher-level vehicle control unit 410 also provide the same functionality. All stator coils (six in total) are energised for the nominal motor operation in the absence of a coil failure (e.g. insulation fault), and in the presence of a failure, the remaining healthy stator coils continue to be energized. The operation of the motor 94 can be continued with or without degrading.

Figure 24B:
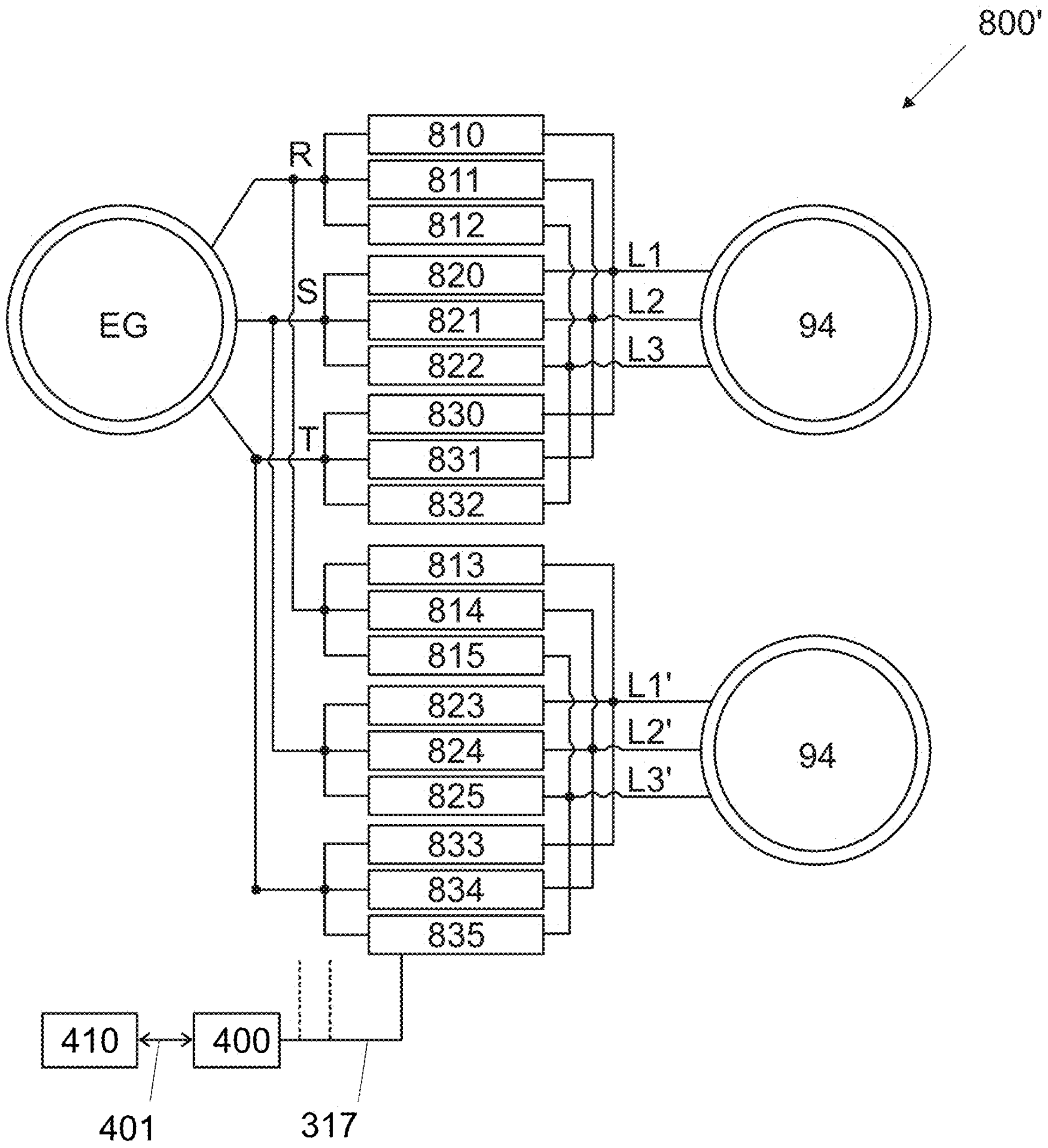

FIG. 24B illustrates a variant of the example of the electrical power supply and conversion system 800 of FIG. 24A, providing a higher redundancy. The electrical power supply and conversion system 800 comprises in total eighteen strings, in fact, the doubled number of strings compared to FIG. 24A, thereby providing a high redundancy.

FIGS. 25A and 25B illustrates two exemplary embodiment of electrical supply systems 1500*a*, 1500*b* according to the present disclosure, comprising of a plurality of smart battery modules 300 and a control unit 400. The electrical supply system 1500*a* illustrated in FIG. 25A comprises a string 510 of smart battery modules 300 with dedicated bidirectional communication channels 317 between each of the respective smart battery modules 300 in string 510 (more specifically between the controller (314, as shown in FIG. 20B) of each respective smart battery module 300) and the control unit 400. The electrical supply system 1500*b* illustrated in FIG. 25B comprises a string 510 of smart battery modules 300 with a ring communication configuration, via a bidirectional communication channel 317, between the smart battery modules 300 (more specifically between the controllers (314, as shown in FIG. 20B) of each respective smart battery module 300) in the string 510 and the control unit 400.

The electrical supply systems each 1500*a*, 1500*b* comprise at least one string 510 of a plurality of smart battery modules 300 connected in series. Preferably each of the smart batter modules are low-voltage smart battery module. Each of the smart battery modules 300 may have the features illustrated in FIGS. 20A-20C; although other configurations of the smart battery modules 300 are possible, such as, for example the exemplary smart battery module configurations shown in FIGS. 25C and 25D. The exemplary smart battery module 300 shown in FIG. 25C comprises a converter configuration with only a semiconductor stage 311 and an input filter 312; this configuration is simple and robust. The exemplary smart battery module 300 shown in FIG. 25D comprises a semiconductor stage 311 and a boost stage 312*b* which controls the stable voltage across the terminals (C+, C−) irrespectively of the battery state of charge. It should be understood the smart battery modules 300 may have any suitable input filter configuration, and may have any suitable boost stage 312*b* configuration, and may have any suitable semiconductor stage configuration. FIG. 25E provides some examples of some possible Boost Stage 312*b* configurations; and FIG. 25F provides some possible Semiconductor stage 311 configurations. However, it should be understood that the present disclosure is not limited to the configurations shown in FIGS. 25C, 25D, 25E and 25F.

In each of the electrical supply systems 1500*a*, 1500*b*, the string 510 can supply a total voltage corresponding to the sum of the individual output voltages supplied by the smart battery modules 300 in the string 510. The number of strings 510, and the number of smart battery modules 300, shown in FIG. 25A,25B is for illustrative purposes only and not limiting; in other words the electrical supply systems 1500*a*, 1500*b* may each comprise any number of strings 510 and any number of smart battery modules 300. Each of the electrical supply systems 1500*a*, 1500*b* comprises a control unit 400 which is operably connected to the controller (314, as shown in FIG. 20B) of each respective smart battery module 300 in the string 510.

In the electrical supply system 1500*a*, 1500*b* the switch 313 in each respective smart battery module 300 may be selectively closed to by-pass that smart battery module 300 (in other words the switch 313 acts as a by-pass switch). The switch 313 of each smart battery module 300 is operably connected to the local controller 314 of its respective smart battery module 300 so that the local controller 314 can selectively open or close its switch 313. The switch 313 may act as a bypass switch. In an embodiment the local controller 314 can selectively open or close the switch 313 of the smart battery module 300 based on commands/signals that the local controller 314 receives from the control unit 400. Alternatively, each by-pass switch 313 is operably connected to the control unit 400 so that the control unit 400 can selective open or close each by-pass switch 313.

It should be understood that the electrical supply system 1500*a*, 1500*b* may have any of the features of the electrical supply system embodiments described in the present disclosure. The smart battery modules 300 of the electrical supply systems 1500*a*, 1500*b* may have any of the features of the smart battery modules describe in the present disclosure.

Figure 26:
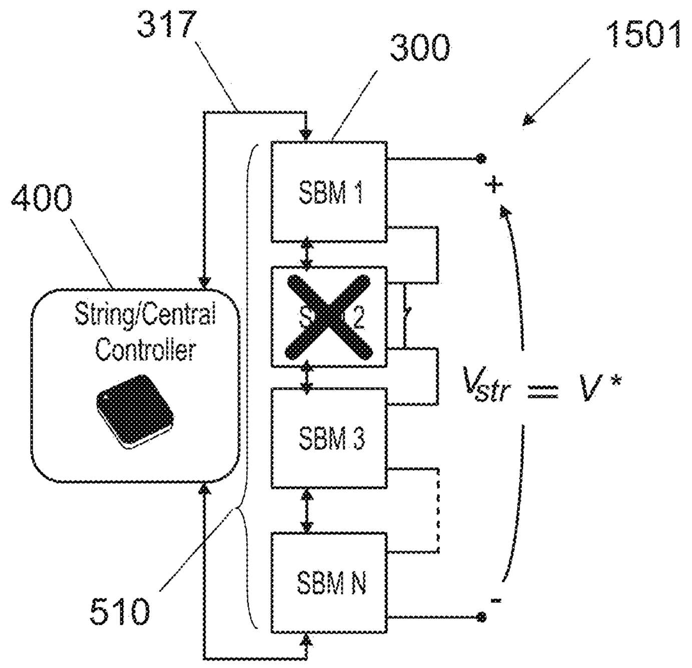
FIG. 26 illustrates an electrical supply system, in which a failed smart battery module is bypassed, according to an embodiment of the present disclosure.

FIG. 26 illustrates an electrical supply system 1501 according to an embodiment of the present disclosure. The electrical supply system 1501 has many of the same features as the electrical supply system 1500*b* shown in FIG. 25B and like features are awarded the same reference numbers.

The controller (314, as shown in FIG. 20B) of each respective smart battery module 300 in the string 510 is operably connected over the bi-directional communication line 317 to the control unit 400. The bi-directional communication line 317 can be configured as a communication bus, such as a field bus (including safety or real-time field bus).

Possible but not exclusive configuration and control modes are discussed in the following.

The control unit 400 sends recurring or periodic synchronisation signals to all controllers of each respective smart battery module 300 so they can synchronize their internal clock with the synchronisation signal sent by the control unit 400. The synchronisation signal can be sent at a much lower frequency than the internal clock of the controller (314, as shown in FIG. 20B) of each respective smart battery module 300 in the string 510, for example less than one every minute. This can save bandwidth if a communication bus is used.

In return, the controller (314, as shown in FIG. 20B) of each respective smart battery module 300 sends the measured input voltage, corresponding to the DC voltage supplied by the related battery module, to the control unit 400 over the bi-directional communication line 317. The control unit 400 calculates a corresponding control value or a set of control values for each controller, and the individual control value(s) is sent to the controller of each smart battery module 300.

In the configuration that twenty smart battery modules 300 per string 510 (as a non-limiting example) are connected in series, each battery module comprised in the corresponding smart battery module supplies a voltage of 40V, and the desired DC voltage VDC* provided by the electrical supply system 500 corresponds to 600V, the control unit 400 sends a control value of 30 V to each controller. Alternatively, the output voltage feed-forward setpoint and the DC current command are sent by the control unit 400. In return, each smart battery module 300 controls its output voltage average to 30 V (by setting or controlling the pulse width correspondingly), such that the average of the sum of the output voltages of the in series connected smart battery modules 300 accumulates to the required DC voltage VDC* supplied by the electrical supply system 1500. When the DC current command is sent in addition, e.g. with a value of 20 A, the output current is controlled accordingly to this value, which can also result in an output voltage average of 30 V. Suppose the input voltages of each smart battery module 300 vary over time due to a change in the state of charge, the control unit 400 can determine and vary each control value correspondingly, such that the DC voltage VDC* is output independent from the state of charge of the battery module contained in the related smart battery module 300. The said independence is given as long as the level of the output voltage average is lower than the input voltages.

In the exemplary control mode presented, the first semiconductor switch of each smart battery module 300 switches are synchronised. This can lead to a high voltage ripple in the DC voltage VDC* supplied. More preferably, the smart battery modules 300 of each string 510 switch each first semiconductor switch with a time delay, so that the voltage ripple is reduced. For this purpose, the control unit 400 can send a switching sequence, for example in the form of a delay time, to each controller of each smart battery modules 300. Since the controllers are synchronised with each other due to the synchronisation signal provided by the control unit 400, each controller can delay for a time specified by control unit 400 before a switching action of the first semiconductor switch (and the second semiconductor switch) is carried out. This can considerably reduce the ripple of the voltage. In summary, the first semiconductor switches of the smart battery modules 300 are switched staggered to each other. The same strategy can be followed when the semiconductor stage is configured as a full bridge, cf. FIG. 20D. The control mode of delaying the switching sequence (or successive switching cycles) unfolds its full potential when a large number of smart battery modules 300 are connected in series to form the string 510. Then the slope of the voltage change of the common output voltage can be finely adjusted.

In the example illustrated in FIG. 26, the respective local controller 314 in each of the respective smart battery modules 300 may be configured to detect a fault, such as an electrical fault for example, in that respective smart battery module. In response to detecting a fault, each local controller 314 is configured to send a fault detection signal to the control unit 400. The control unit 400 is configured to adjust the operation of one or more of the smart battery modules 300 in the string 510 in response to receiving a fault detection signal from the local controller 314. The local controller 314 of a smart battery module can be configured to detect module-level faults, such as: permanent overvoltage or undervoltage (2.45 V per battery cell typically) of its battery assembly 1400; or when the battery assembly 1400 reached the minimal state-of-health defined by the application (typically 80%); or the overtemperature of its battery assembly 1400 or any of its conversion stages or auxiliary components is detected; or when the measured state-of-charge is outside the range 5-100%; or when there is a significant imbalance between the battery cells within the battery assembly 1400; or when a battery current sensor (such as the second current sensor) detects an uncontrolled battery overcurrent; or when the local controller 314 experienced a communication issue, where the communication with the central controller 400 is interrupted or considered invalid; or when the local controller detected failure of any of its internal switching converters, like semiconductor stage 311 or boost stage 312*b*, or of their parts (semiconductors, gate-drivers, voltage and current measurements). For example, the battery assembly permanent overvoltage or undervoltage can be detected by measuring the battery assembly 1400 voltage by means of a voltage sensor (such as said third voltage sensor), and by filtering this voltage to remove possible noise influence. Such filtered voltage is compared with the overvoltage threshold of 4.2V and in case the filtered voltage is higher than the threshold, the overvoltage fault is detected. The same strategy is applied to detect a permanent undervoltage, where the filtered battery assembly voltage is compared with the undervoltage threshold of typically 2.45V and in case it is lower than the threshold, the undervoltage fault is detected. In an embodiment, in response to detecting a fault in a smart battery module, the local controller of that smart battery module will to open the switches in the semiconductor stages 311 of that smart battery module, and may close the switch 313 (wherein switch 313 acts as a bypass switch). In addition, the local controller of that smart battery module may inform the control unit 400 about the fault by sending a fault detection signal to the control unit 400. Alternatively, upon detecting a fault, the local controller 314 will send a fault detection signal to the control unit 400; and the local controller 314 will maintain the smart battery module in operation until receiving a command from the control unit 400 to open the switches in the semiconductor stages 311 of that smart battery module, and may close the bypass switch 313. In an embodiment in response to detecting a fault in a smart battery module, the local controller of that smart battery module can close the by-pass switch 313 corresponding to that faulty smart battery module 300, so that faulty smart battery module 300 is by-passed. Alternatively or in addition, the control unit 400 can be configured to detect the faulty smart battery module, such as in case of faulty communication with the smart battery module, or a smart battery module where the local controller 314 has lost controllability over the converter 310 and/or the bypass switch 313. For example, failed communication with the smart battery module can be detected by receiving messages not coherent with the defined communication protocol. In response to detecting a fault in the smart battery module by the local controller 314, the local controller 314 can command to open its semiconductor stage 311, and close the bypass switch 313. In addition, it will inform the control unit 400 about the fault. Alternatively, the upon detecting a fault, the local controller 314 can inform the control unit 400 about the fault and remain in operation until receiving a command from the control unit 400 to stop its semiconductor stage 311 and bypass its terminals by closing the bypass switch 313. In response to detecting a fault in one of the smart battery modules by the control unit 400, the control unit will command to stop the operation of the semiconductor stage 311 and close the by-pass switch 313 corresponding to that faulty smart battery module 300, so that faulty smart battery module 300 is by-passed.

Additionally, the control unit 400 is configured to send a modified voltage setpoint (or in case of current control maintains the same current setpoint) to the other smart battery modules 300 in the string 510 (i.e. the smart batter module 300 that are without fault), which maintains the total voltage/string current at the output at the level prior to the fault occurring. This is particularly advantageous as a failure/fault in one of the smart battery modules 300 only leads to the partial loss of energy capacity, in the order of several percents. If the electrical supply system 1501 is used in an electric vehicle, such as an electric or hybrid aircraft, flight of the aircraft can be continued without emergency landing, even if a smart battery module 300 suffers a failure/fault. Additionally, in case of a bypass of a smart battery module, the control unit can adjust the delay between the switching cycles of the remaining smart battery modules with the aim of minimizing the voltage and current ripple in the string.

Figure 27:
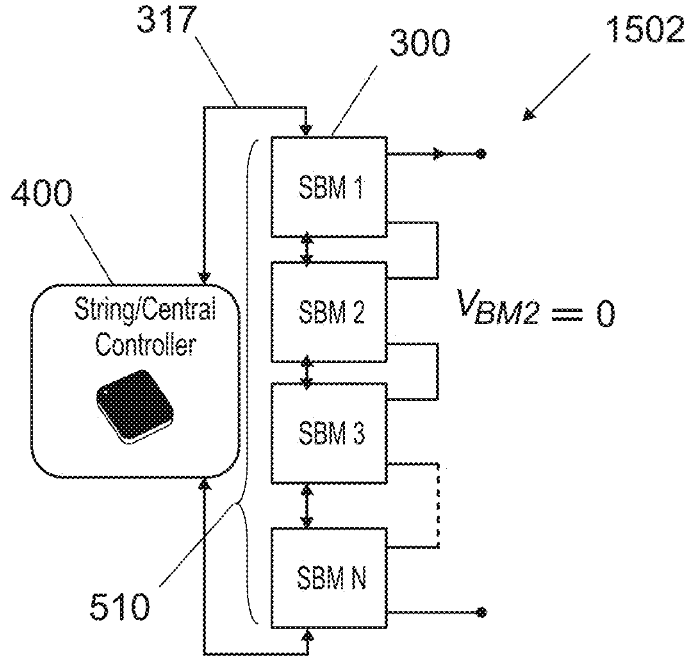
FIG. 27 illustrates an electrical supply system, in which a smart battery module in a string provides proportionally lower output voltage (e.g. zero output voltage), according to an embodiment of the present disclosure.

FIG. 27 illustrates an electrical supply system 1502 according to a further embodiment of the present disclosure. The electrical supply system 1502 has many of the same feature as the electrical supply system 1500*b* shown in FIG. 25B and like features are awarded the same reference numbers.

It should be understood that the electrical supply system 1502 may have any of the features of the electrical supply system embodiments described in the present disclosure. The smart battery modules 300 of the electrical supply system 1502 may have any of the features of the smart battery modules described in the present disclosure.

In the example illustrated in FIG. 27, local controllers 314 of the smart battery modules 300 in the string 510 are configured to monitor the health of its respective battery assembly.

For example, health monitoring of a smart battery module can be achieved by measuring its temperature, or by measuring the static resistance of the smart battery module, or by performing real-time impedance spectrometry, or by any combination of the above. For example, static resistance of the smart battery module can be measured by: measuring the average battery current and its terminal voltage, followed by controlling the average battery current to zero by the boost stage 312*b* and/or semiconductor stage 311, and measuring the battery terminal voltage thereafter. The difference between the new and previous battery terminal voltage divided by the measured average battery current represents the battery static resistance. By characterizing the battery assembly static resistance as a function of its state-of-health and storing it in a form of a polynomial or a look-up-table in the local controller 314 or the control unit 400, the state of health of each smart battery module can be tracked. Simultaneously to measuring the static voltage drop across the battery cell its temperature can be monitored and used as a second input to the polynomial or look-up table to determine the state of health with more accuracy.

The control unit 400 can be configured to receive the state of health information from each smart battery module through the communication link 317 and calculate the average value of the state of health all the smart battery modules in the string. The control unit can further be configured to send the average state of health of the string modules to all the modules of the respective string. The local controllers 314 can further be configured to stress its smart battery module more or less, proportionally to the difference between its state-of-health and the average state of health. Preferably, the local controller 314 of a smart battery module 300 will operate the semiconductor stage 311 to generate a higher average voltage at its respective output terminals if its state of health is higher than the average state of health. Similarly, the local controller will operate the semiconductor stage 311 to generate a lower average voltage at its respective output terminals in case when its state of health is lower than the average state of health. For example, if the state of health of a smart battery module is 93%, and the average state of health is 91%, the local controller 314 will increase the pulse duration W of that respective smart battery module for k*2%, where k can be a number like ‘0.05’, ‘0.1’, ‘0.2’, or any other agreed by the application. For example, if k is selected as k=0.1, and the pulse duration of the smart battery module was calculated as 0.6 for the battery voltage of 3.6V, then the modified pulse duration will be equal to:

$$W_{mod} = W + k\frac{SOH(\%) - SOH_{avg}(\%)}{V_{bat}(V)}$$

$$W_{mod} = 0.6 + 0.1\frac{92\% - 90\%}{3.6} = 0.655$$

Therefore, the smart battery module will increase its pulse duration W to stress more itself in case its state of health is above average. It is important to recognize that this pulse adjustment will not impact the voltage and current setpoint of the string, as the influences of all the smart battery modules will mutually cancel.

If, for example, the electrical supply system 1502 is used in an electric vehicle, such as an electric or hybrid aircraft, the state of health of the smart battery modules 300 within the string 510 may diverge due to the different locations/positions of the smart battery modules 300 within the aircraft. For example, smart battery modules 300 which are located in the nose of the aircraft may heat more compared to the smart battery modules 300 located in the aircraft wings; thus, the state of health of the smart battery modules 300 located in the nose may deteriorate faster than the state of health of the smart battery modules 300 located in the wings.

In addition or alternatively to state of health, the modules can be balanced in terms of their temperatures or battery assembly voltages, in a similar way as described above for the state of health. Consider a case wherein the battery voltage of a battery module 300 in the string 510 has reached a limit voltage of 2.5 V. In this case conventional battery strings would need to cease its operation; in contrast, the electrical supply system 1502 of FIG. 27 can continue its operation normally because the local controller will adjust the pulse width of that smart battery module to zero, thus not drawing any power from that smart battery module. The control unit 400 may then adapt the other, more healthy, smart battery modules 300 in the string 510 to provide more power so as to compensate, or at least partially compensate, for the power loss caused by setting the output voltage of the unhealthy smart battery module to zero.

Similar benefits can be achieved during charging of the smart battery modules 300 in the string 510. In case of conventional battery strings the charging process is completed once one battery module (or battery cell) in the string reaches its maximal charging voltage (4.2 V for example). In case that the battery modules (or battery cell) in the string have different states of health, some of the battery modules (or battery cells) may charge sooner than others. In the electrical supply system 1502 of FIG. 27 the local controller 314 (or the control unit 400) may be configured to detect when a smart battery module 300 in the string 510 is fully charged, and will selectively stop further charging of the detected fully charge battery module 300 without stopping the further charging of the other battery modules 300 in the string 510 which have not yet been fully charged.

During the charging process, the string 510 can generate a desired voltage at its output thus effectively emulating a uniformly charged battery string. During this process, the voltages of the battery assembly 1400 of a smart battery modules 300 are measured by their respective voltage sensors (such as said third voltage sensors) and the local controller 314, and communicated to the control unit 400 through the communication channel 317. The control unit calculates the average voltage of all the smart battery modules in the string and communicates it to all the smart battery modules. Then the local controller adjusts the pulse duration of its semiconductor stage 311 by using the following formula, where the coefficient m can be selected as '1', '2', '5' or other:

$$W_{mod} = W + m\frac{V_{avg}(V) - V_{bat}(V)}{V_{bat}(V)}$$

For example, if the average battery voltage is 3.9V, while the given module measures the battery voltage of 4.1V, and the coefficient m is selected as '5', while the nominal pulse duration W is 0.6, then the modified pulse duration equals:

$$W_{mod} = 0.6 + 5\frac{3.9 - 4.1}{4.1} = 0.356$$

Lower pulse duration results in less power delivered to that smart battery module and thus slower charging. It can be observed that the local controller 314 in conjunction with the smart battery module will tend to balance the charging rates of individual smart battery modules. In extreme case when the battery assembly voltage reaches the charging threshold, the pulse duration of the respective smart battery module will be set to zero by the local controller 314, thus preventing further charging of the smart battery module. This is illustrated in FIG. 27. In such a case, the control unit will increase the output voltage setpoint of the remaining smart battery modules 300 in the string such that the total voltage presented by the string is constant and emulates the total state of charge of the string.

Advantageously the electrical supply system 1502 of FIG. 27 can increase the battery range throughout the lifecycle of the electrical supply system 1502, where the smart battery modules 300 age differently.

Figure 28:
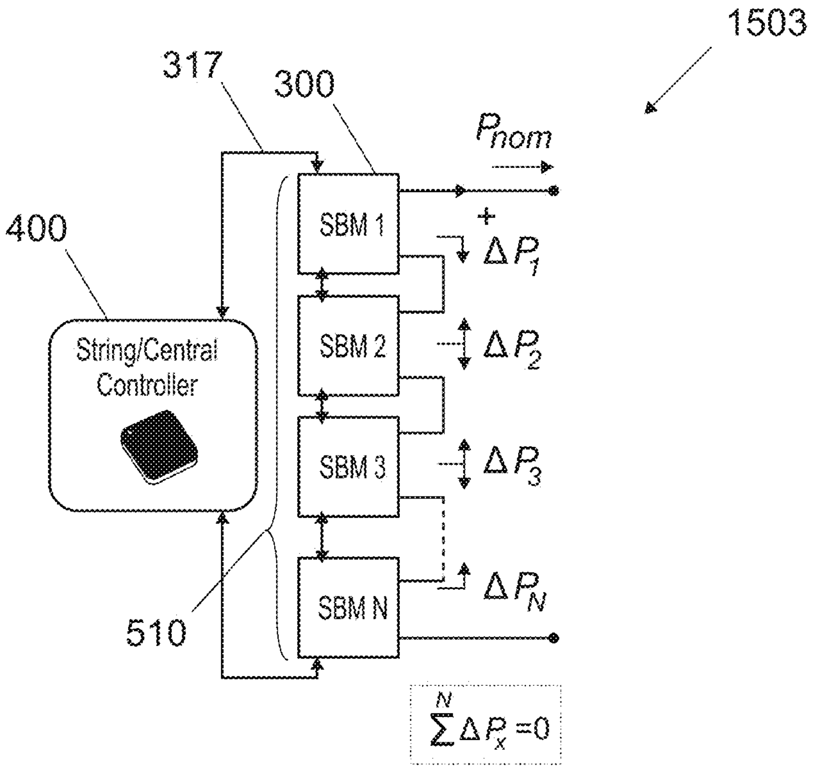
FIG. 28 illustrates an electrical supply system, in which the smart battery modules in the string have different power contributions according to an embodiment of the present disclosure.

FIG. 28 illustrates an electrical supply system 1503 according to a further embodiment of the present disclosure. The electrical supply system 1503 has many of the same feature as the electrical supply systems **1500*b*, shown in FIGS. 25**B, and like features are awarded the same reference numbers.

It should be understood that the electrical supply system 1503 may have any of the features of the electrical supply system embodiments described in the present disclosure. The smart battery modules 300 of the electrical supply system 1503 may have any of the features of the smart battery modules described in the present disclosure.

In the example illustrated in FIG. 28, the local controller 314 of a smart battery module 300 is configured to measure the voltage of its battery assembly 1400 by means of the voltage sensor 315, and communicate this value to the string control unit 400. In addition the control unit 400 is configured to receive the measured battery voltages $V_{bat}$ of the individual smart battery modules 300 in the string 510, through the communication channel 317, and calculate the average battery voltage. Average battery module voltage level $V_{avg}$ is communicated from the control unit 400 to the local controllers 314 and local controllers adapt the pulse duration of the semiconductor stage 311 according to the following law:

$$W_{mod} = W + n\frac{V_{bat}(V) - V_{avg}(V)}{V_{bat}(V)}$$

where n can be a number such as '0.5', '1', '2' or other, depending on the voltage margin the user chooses to allocate to the voltage balancing action. For example, if the user chooses to allocate 2% of the voltage margin to voltage balancing actions, and if the expected maximal battery voltage deviation is +2V, where the average battery assembly voltage is 36V, then the number n should be selected as follows:

$$\Delta W = n\frac{\Delta V(V)}{V_{bat}(V)} = 2\% = 0.02$$

$$n = 0.02\frac{38V}{2V} = 0.38$$

The control action has an opposite effect to the smart battery module balancing during charging. In this case, the local controller increases the pulse duration of the modules with higher battery voltage and reduces the pulse duration of the modules with the lower battery voltage.

As all the modules in the string share the same string current I, the power of the string influenced by the deviation of the pulse duration of the individual smart battery modules can be calculated as:

$$\Delta P = \sum \Delta W \cdot V_{bat} \cdot I = I \cdot \sum n\frac{\Delta V}{V_{bat}} \cdot V_{bat} = I \cdot \sum n\frac{\Delta V}{V_{bat}} \cdot V_{bat} = I \cdot n \cdot \sum \Delta V$$

-continued $$\Delta P = I \cdot n \cdot \sum (V_{bat} - V_{avg}) = 0$$

It can be concluded that the balancing action has no influence on the total power delivered by the string, but only on the power delivered by the individual smart battery modules. Therefore, the power is only redistributed between the smart battery modules, as illustrated in FIG. 28, while the string power remains equal to the demanded power.

Alternatively, instead of measuring the battery voltages of the smart battery modules 300, local controllers 314 can be configured to measure or estimate the battery state of charge and communicate this information to the control unit 400. In a similar way, the control unit and the local controllers 314 of the smart battery modules 300 of the string 510 can be configured to achieve balancing between the smart battery modules with respect to the state of charge, by adapting the pulse duration of the individual smart battery modules, according to the following law:

$$W_{mod} = W + p\frac{SOC_{bat}(\%) - SOC_{avg}(\%)}{V_{bat}(V)}$$

Similarly to the other balancing actions, the parameter p can be selected based on the allocated pulse duration margin for this particular balancing action. Given that it is 2% and given that the maximal expected unbalance is +2% for an average battery voltage of 36V (assuming the battery pack 1400 composed of 10 series connected cells) the parameter p equals 0.36. Similarly to the case of voltage balancing, or other balancing action, this particular action does not influence the total power delivered by the string 510 but only acts on power distribution between the individual smart battery modules 300.

In conventional electrical supply systems, the voltages between battery modules are typically balanced using the balancing resistor; namely, in case when a battery module has higher voltage than average, the excess energy is dissipated into resistors which are connected in parallel with that battery module—this reduces the efficiency of the electrical supply system, and moreover creates significant temperature increases inside the battery module which might lead to overheating certain electronic components. Advantageously, compared to such conventional electrical supply systems, the electrical supply system 1502 illustrated in FIG. 28 maintains the balance between the individual smart battery modules without reducing the efficiency of the electrical supply system and without increasing the temperature inside the battery module.

Figure 29:
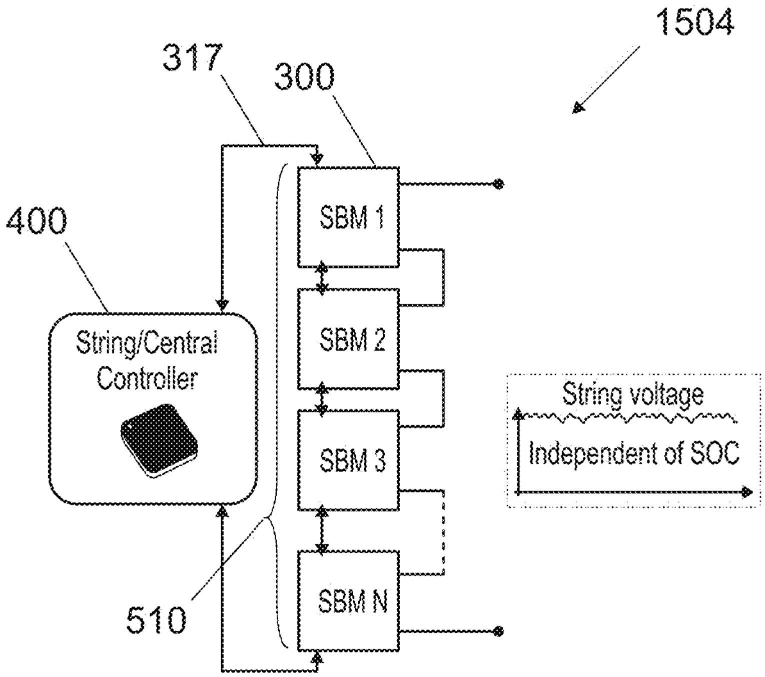
FIG. 29 illustrates an electrical supply system, illustrating the independency of the common output voltage (string voltage) of the state-of-charge of the individual batteries within the smart battery modules, according to an embodiment of the present disclosure.

FIG. 29 illustrates an electrical supply system 1504 according to a further embodiment of the present disclosure. The electrical supply system 1504 has many of the same feature as the electrical supply system 1500*b* shown in FIG. 25B, and like features are awarded the same reference numbers.

It should be understood that the electrical supply system 1504 may have any of the features of the electrical supply system embodiments described in the present disclosure. The smart battery modules 300 of the electrical supply system 1504 may have any of the features of the smart battery modules described in the present disclosure.

In the example illustrated in FIG. 29, the control unit 400 is configured to control the output voltage (i.e. the output voltage of the string 510) independently of the state of charge of the smart battery modules. This can be achieved by the local controller 314 being configured to regulate the local dc link voltage provided by the respective battery assembly 1400 of each smart battery modules 300 of the string 510; in an embodiment in which the smart battery module has a boost stage 312*b* then the stage boost stage 312*b* can play a role to control the local dc link voltage independently of the state of charge of the smart battery module. Preferably, the local de link voltage provided by the respective battery assemblies 1400 of the respective smart battery modules is regulated so that it is a predefined amount higher (e.g. approximately 10% higher) thana predefined target (i.e. desired) string voltage divided by the total number of operational smart battery modules in the string (an operational smart battery modules are, for example, those that did not experience a fault). For example, if the target (i.e. desired) string voltage is 600V in DC or if the amplitude of the target (i.e. desired) string voltage is 600 V in ac application, and if the number of operational smart battery modules is '12', then by taking 10% of voltage reserve for control and balancing, each individual smart battery module should regulate its internal local dc link voltage provided by the respective battery assemblies 1400 to the value of 55V. In addition, the control unit 400 will preferably provide an output voltage setpoint to each smart battery module, wherein preferably the voltage setpoint is the target string voltage setpoint divided by the number of operational modules. This can be achieved by regulating the pulse duration of the boost stage 312*b*, which ensures that the dc voltage is kept at 55V irrespectively of the battery assembly 1400 state of charge. Even in case of failure of one smart battery module in the string 510, when one smart battery module is bypassed (by closing the switch 313 of that smart battery module), the control unit 400 will provide a new target string voltage setpoint for all the '11' remaining operational smart battery modules, which would, in this particular example be 60V per smart battery module. In addition, the control unit 400 may be configured to provide a new output voltage setpoint to each smart battery modules by dividing the string voltage setpoint by the number of operational smart battery modules (which is this example is '11'). The control unit 400 can be further configured to adjust the time delays of the switching cycles between different smart battery modules in order to minimize the voltage ripple. Typical time delays between each two subsequent smart battery modules are preferably equal to one quarter of the switching period divided by the number of operational smart battery modules, or equal to one half of the switching period divided by the number of operational modules, or equal to the full switching period divided by the number of the operational battery modules.

Advantageously the electrical supply system 1504 of FIG. 29 the output voltage (i.e. the output voltage of the string 510) can be set to a value corresponding to the maximal efficiency of the electric drive (motor and motor controller). In addition, in cases where the efficiency may depend on the operating point of the motor (torque and speed), the output voltage (i.e. the output voltage of the string 510) can also be varied accordingly to maintain the highest possible efficiency. Furthermore, due to decoupling between the output voltage of a smart battery module and its contained energy, it is possible to tailor the string 510 according to both criteria: desired output voltage and desired energy.

In any of the electrical supply systems of the present disclosure that have at least one string of smart battery modules 300 and a control unit 400 (for example, in any of electrical supply systems 1500*a,b*-1504), the control unit

400 may be configured (or further configured) to carry out real-time health monitoring of each of the smart battery modules in the string. In another embodiment the local controller 314 of each respective smart battery module is configured to carry out real-time health monitoring and to communicate the results of the monitoring to the control unit 400; the control unit 400 will process the results to identify those smart battery modules which have better health than others. Preferably the control unit 400 will stress the smart battery modules 300 in the string 510 which have a better state of health more than the other smart battery modules 300 in the string 510. In other words, the control unit 400 will operate the smart battery modules 300 which have a higher state of health to provide a higher voltage at their respective output terminals, than the smart battery modules 300 that have a lower state of health. Preferably the control unit 400 will operate the smart battery modules 300 which have a higher state of health to provide a higher voltage at their respective output terminals, than the smart battery modules 300 that have a lower state of health, to maintain the total voltage/string current at the output at a predefined level, or within a predefined range (e.g. +−5% of a predefined voltage/current level).

If the electrical supply system is used in an electric vehicle, such as an electric or hybrid aircraft, control unit 400 may be configured (or further configured) to carry out real-time health monitoring of the smart battery modules during the flight of the aircraft and/or when the aircraft is at standstill.

Real-time health monitoring of the smart battery modules in the string advantageously allows to selectively charge each battery module up to its maximum and not have the modules with low state of health limit the utilization of the string. Another benefit is that no specific procedures, personnel and equipment for state of health monitoring is needed during the regular maintenance periods. In addition, the modules with lower state of health can be stressed proportionally to their state of health thus extending the life of the string, and reducing the overall maintenance and ownership costs. For example, the control unit 400 may be further configured to operate each of the smart battery modules 300 to output a volage which is proportional to the state of health of that smart battery module 300. In this case smart battery modules 300 which have a higher state of health will be operated to provide a higher voltage at their respective output terminals, than the smart battery modules 300 that have a lower state of health. Preferably the voltage provided by the smart battery modules 300 which have a higher state of health at least partially compensates the lower voltage provide by the smart battery modules 300 that have a lower state of health.

Figure 30A:
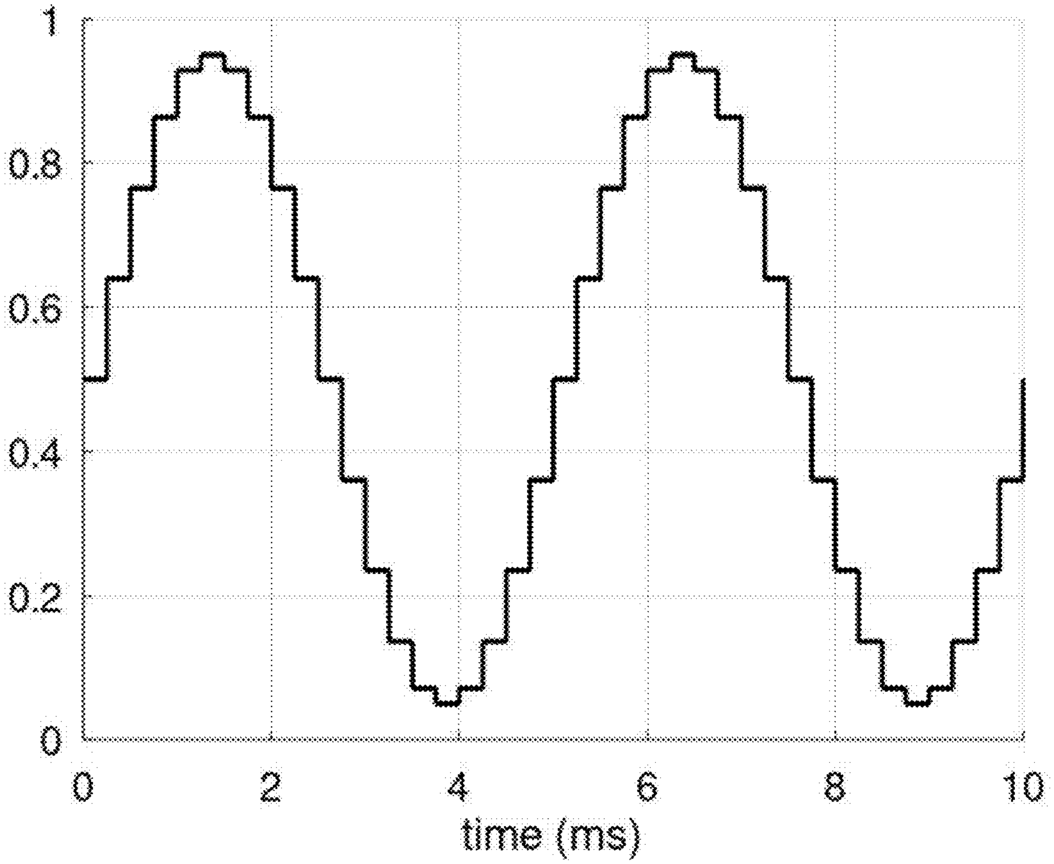
FIG. 30A illustrates a voltage waveform that can be generated by a string of an electrical supply system of the present disclosure, comprising both the DC and the AC voltage.
Figure 30B:
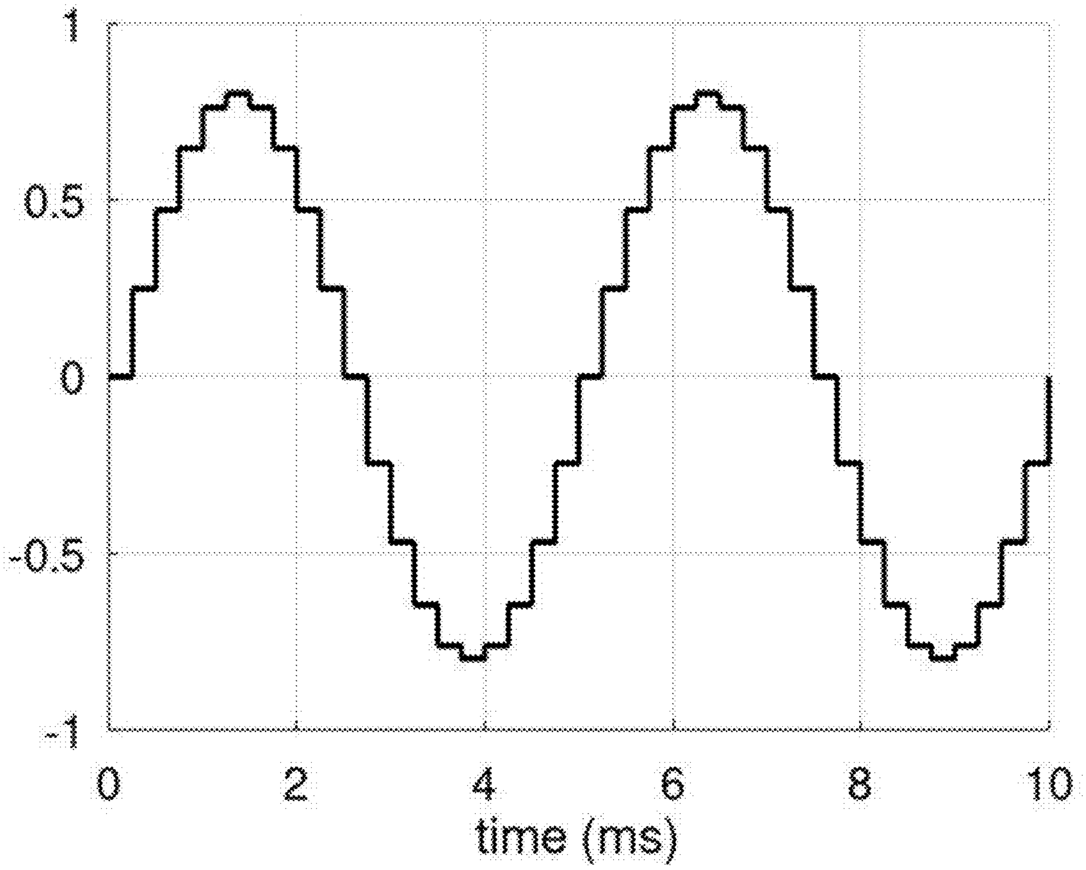
FIG. 30B illustrates a voltage waveform that can be generated by the string of an electrical supply system of the present disclosure, comprising only the AC voltage.

In any of the electrical supply systems of the present disclosure that have at least one string 510 of smart battery modules 300 and a control unit 400 (for example, in any of electrical supply systems 1500*a,b*-1504) owing to the converter stage of each smart battery module 300 in the string 510, the smart battery modules 300 can generate DC voltage of arbitrary average value, which can change in real-time. As a result, at the string 510 level, voltage waveforms such as the waveforms shown in FIGS. 30A and 30B can be generated. This permits the string 510 of smart battery modules 300 to be used to supply a motor phase directly from the batteries without inverter (as in FIG. 22A), generating the voltage as shown in FIG. 30A or FIG. 30B (corresponding to FIG. 22B). Three such strings 510,520, 530 can be used as shown in FIG. 22A to supply a three-phase motor directly from the smart battery modules 300. Advantageously, this allows for weight reduction; lower costs; lower losses (e.g. lower losses in the motor); elimination of inverter faults; lower EMI emissions; lower insulation stress; reduction in current ripple an torque ripple in the motor.

Figure 31:
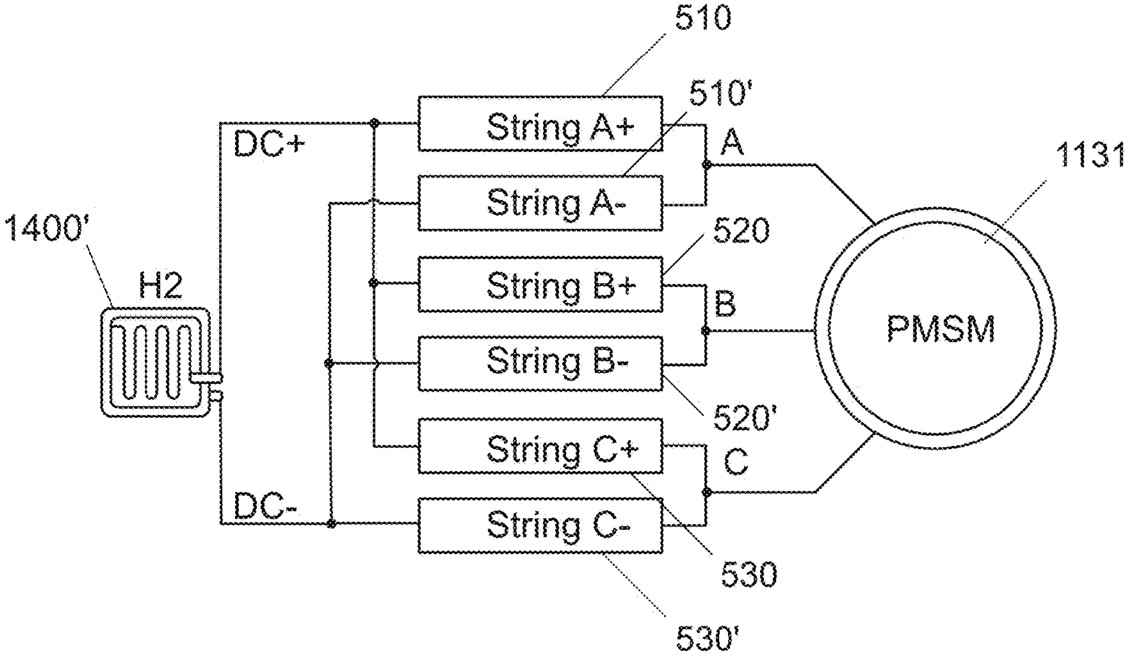
FIG. 31 illustrates an exemplary electrical supply system with six strings of smart battery modules that supply a three-phase motor (PMSM) directly from a DC source.

In any of the electrical supply systems of the present disclosure that have at least one string 510 of smart battery modules 300 and a control unit 400 (for example, in any of electrical supply systems 1500*a,b*-1504) owing to the converter stage of each smart battery module 300 in the string 510, the electrical supply system can be operated to generate DC voltage of arbitrary average value along with superimposed AC voltage of arbitrary magnitude and frequency, which can change in real-time. As a result, at the string 510 level, voltage waveforms such as the waveforms shown in FIG. 30A can be generated. This permits the string 510 of smart battery modules 300 to be used to supply a motor phase directly from the HV dc source, as illustrated in FIG. 31, without the need for an inverter (as is used in FIG. 22A). As illustrated in the example shown in FIG. 31 six such strings 510,520, 530, 510', 520'. 530' of smart battery modules are provided; and they supply a three-phase motor (PMSM) 1131 directly from a dc source 1400', such as a fuel cell stack. In addition, the batteries inside each of the smart battery modules 300 of each of the strings 510,520,530,510', 520',530' smart battery modules can be used as an energy buffer to offset the difference in power production and power consumption rates. Advantageously, this allows for weight reduction; lower costs; lower losses (e.g. lower losses in the motor); elimination of inverter faults; lower EMI emissions; lower insulation stress; reduction in current ripple an torque ripple in the motor; reduction in power peaks from a DC energy source such as fuel cells.

Figure 32:
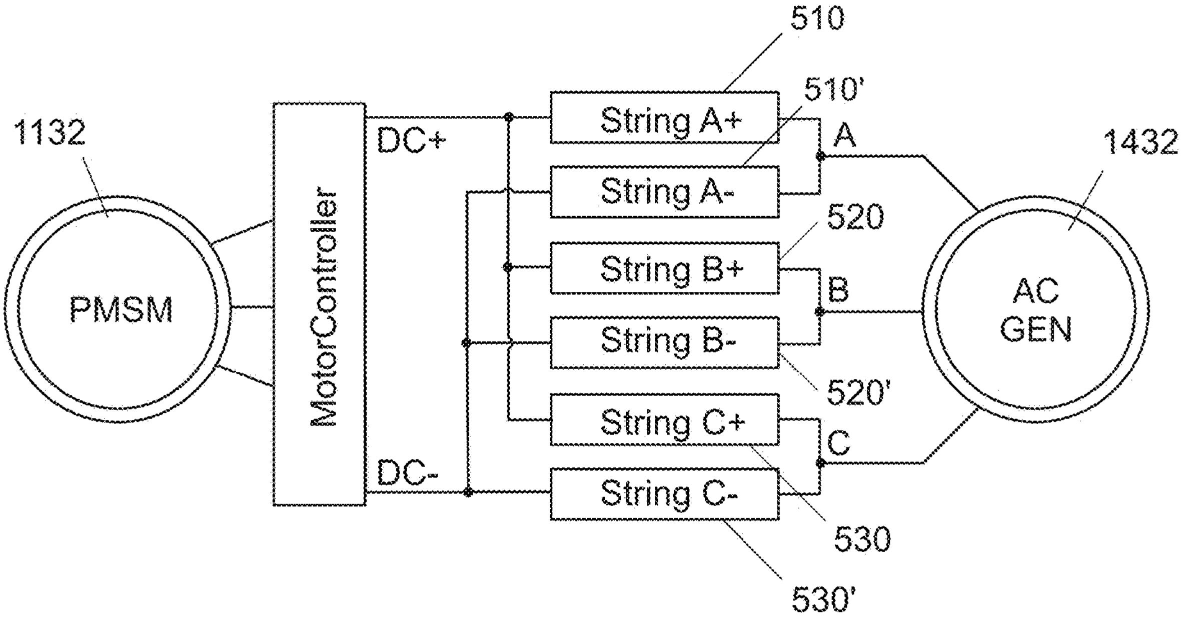
FIG. 32 illustrates an exemplary electrical supply system with six strings of smart battery modules that supply a DC load, directly from the AC source.

In any of the electrical supply systems of the present disclosure that have at least one string 510 of smart battery modules 300 and a control unit 400 (for example, in any of electrical supply systems 1500*a,b*-1504) owing to the converter stage of each smart battery module 300 in the string 510, the electrical supply systems can operated generate DC voltage of arbitrary average value along with superimposed AC voltage of arbitrary magnitude and frequency, which can change in real-time. As a result, at the string 510 level, voltage waveforms such as the waveforms shown in FIG. 30A can be generated. This permits the string 510 of smart battery modules 300 to be used to supply a DC load directly from an AC source, as illustrated in FIG. 32, without the need of a rectifier. As illustrated in the example shown in FIG. 32 six such strings 510,520, 530, 510', 520'. 530' of battery modules are provided; and they supply a DC load 1132, such as for example the input dc terminals of an inverter operably coupled to the electric motor, directly from the ac source 1432, such as a generator or a utility grid for example. In addition, the batteries inside the smart battery modules 300 of the strings s 510,520, 530, 510', 520'. 530' can be used as an energy buffer to offset the difference in power production and power consumption rates. Alternatively, or in addition, the de load 1132 can be supplied solely by the batteries inside the smart battery modules, and the batteries can also be charged by a generator; if the electrical supply system is used in an vehicle such as an aircraft, said charging of the batteries may be done while the aircraft is grounded or during flight, or charging may be done from an AC utility source on the ground. Advantageously, this allows for weight reduction; lower costs; lower losses (e.g lower losses in the motor); elimination of inverter faults; lower EMI emissions; lower insulation stress; reduction in current ripple an torque ripple in the motor; operation of the ac source at its optimal operating speed, independently of the motor speed; possibility to charge the batteries directly from the AC mains without a dedicated charger.

Figure 30C:
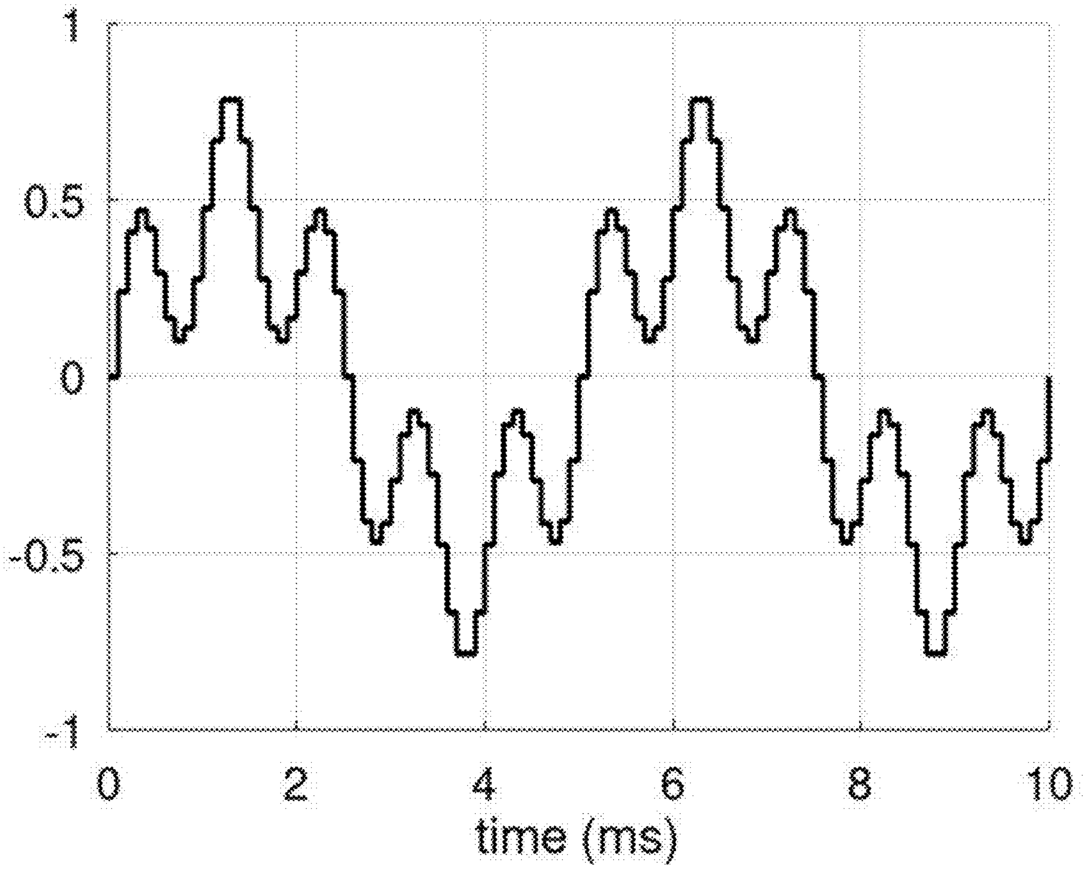
FIG. 30C illustrates a voltage waveform containing two AC frequency components, that can be generated (and output) from an electrical supply system of the present disclosure.

In any of the electrical supply systems 1500*a,b*-1504 of FIGS. 25-29 the string 510 of smart battery modules 300 can further be used to generate a voltage containing two AC frequency components, such as the waveform shown in FIG. 30C. Such a string 510 of smart battery modules 300 can be utilized to realize an AC/AC converter between an AC generator or any AC source (single phase or three-phase voltage source), and a 3PH or multiphase AC motor, operating in general at different voltages magnitudes and shapes and frequencies, as shown in FIG. 23A, FIG. 23B, FIG. 24A and FIG. 24B. In addition, in such settings, the string 510 of smart battery modules 300 can act as both the frequency converters and the energy buffers. Namely, in case when the AC source is providing the power, either full or part of the power can be delivered to the motor, while the remaining power is stored in the batteries. The converter can provide power from the batteries to either the motor, back to the source (utility grid for example, while charging by the AC charger), or both. Examples of the strings used in such applications are given in FIGS. 23A,23B, 24A and 24B.

In any of the electrical supply systems 1500*a,b*-1504 of FIGS. 25-29 the control unit 400 may be configured to disable any one or more of, or all, the smart battery modules 300 in the string 510. This can happen, for example when the de load is decoupled by the contactor and an aircraft is not in operation. Smart battery modules 300 of a string 510 may be disabled by the control unit sending the command to the local controller of smart battery modules to stop switching the semiconductor stage 311 and bypass their by-pass switch 313. Consequently, the electrical supply systems 1500*a,b*-1504 if the smart battery modules 300 are disabled, do not present any HV at the string terminals, thus not presenting any potential hazard during maintenance or replacement. Due to the fact that the smart battery modules 300 have inbuilt current limiting or current control feature, no fuses are needed to protect against short circuits or excessive currents; these can be avoided. Pre-charge relays, contactors and resistors become redundant owing to the current limiting feature of the smart battery modules. Due to the active current control by the control unit 400, diodes are not needed as each string can actively control its current.

In any of the electrical supply systems 1500*a,b*-1504 of FIGS. 25-29 regardless of the fact that the total string voltage $V_{str}$ can reach high values (e.g. several hundreds or even thousands of volts) the voltage between the smart battery module 300 terminals as well as within the smart battery module 300 may be within a low voltage range (e.g. below 100 V, more preferably below 60V DC). This allows the smart battery modules 300 of the electrical supply systems of the present disclosure to be safe to manipulate during production, installation and maintenance. Furthermore, the smart battery modules 300 of the electrical supply systems of the present disclosure use low-voltage electronic components in monitoring and control, irrespective of the system voltage. This increases the pool of electronic components suitable for the design, thus reducing the price of the monitoring and protection circuitry. In addition, it reduces creepage and clearance requirements, particularly sensitive to the altitude and environmental conditions in the aviation industry.

Additional Features and Terminology

Although examples provided herein may be described in the context of an aircraft, such as an electric or hybrid aircraft, one or more features may further apply to other types of vehicles usable to transport passengers or goods. For example, the one or more futures can be used to enhance construction or operation of automobiles, trucks, boats, submarines, spacecraft, hovercrafts, or the like.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms).

The various illustrative logical blocks, modules, and algorithm steps described herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

The invention claimed is:

1. An electrical power supply system for an electric or hybrid aircraft comprising:
- a plurality of smart battery modules connected in series, wherein the plurality of smart battery modules is configured to provide an output voltage;
- wherein each of the smart battery modules comprises:
  - terminals for outputting a local output voltage;
  - a battery configured to supply a DC voltage between two poles;
  - a power converter, comprising a semiconductor stage, electrically connected to the terminals and the poles, wherein the power converter is configured to convert the DC voltage from the battery into the local output voltage at the terminals, and
  - a controller operably coupled to the semiconductor stage and configured to:

control the semiconductor stage for regulating voltage conversion of the DC voltage into the local output voltage;

monitor a state of the smart battery module; and responsive to detecting a fault in the smart battery module, cause a bypass switch to close to short-circuit the terminals of the smart battery module; and a control unit operably coupled to the controller of each smart battery module and configured to control the local output voltage or a local current setpoint or limit for each controller individually or configured to control the output voltage or a current setpoint or limit for all controllers collectively.

2. The electrical power supply system of claim 1, wherein the output voltage corresponds to a sum of output voltages outputted by each smart battery module.

3. The electrical power supply system of claim 1, comprising an inductance connected in series with the plurality of smart battery modules.

4. The electrical power supply system of claim 3, wherein the inductance is provided as a conductor or cable of which a given parasitic inductance and resistance are used to establish a required impedance.

5. The electrical power supply system of claim 1, wherein the plurality of smart battery modules comprises a first set and the electrical power supply system comprises a plurality of sets of smart battery modules, wherein the plurality of sets are connected in parallel, wherein the parallel connected sets of smart battery modules are configured to supply a common output current corresponding to a sum of output currents outputted by each set of smart battery modules.

6. The electrical power supply system of claim 1, wherein the control unit is configured to set the output voltage and/or current setpoint or limit to a predetermined fixed value, or the control unit is configured to vary the output voltage and/or current setpoint or limit or setpoints in dependency of a control value provided by a control instance external to the electrical power supply system.

7. The electrical power supply system of claim 1, wherein the control unit is configured to provide a synchronisation signal to the controllers of the smart battery modules for synchronising timing of consecutive switching cycles of the smart battery modules, and/or the control unit is configured to provide a timing setpoint to the controllers of the smart battery modules for varying the timing of each switching cycle with reference to the timing synchronised.

8. The electrical power supply system of claim 1, wherein a control value of the output voltage setpoint and/or current provided by a control instance external to the electrical power supply system is a time-invariant control value.

9. The electrical power supply system of claim 8, wherein the output voltage is a DC voltage with a residual periodic variation of the DC voltage for supplying a DC load external to the electrical power supply system.

10. The electrical power supply system of claim 8, wherein a control value of the output voltage and/or current setpoint provided by a control instance external to the electrical power supply system is a time-variant control value.

11. The electrical power supply system of claim 10, wherein the output voltage is an AC voltage for supplying an AC load external to the electrical power supply system.

12. The electrical power supply system of claim 1, wherein the battery of each respective smart battery module comprises a plurality of battery cells and/or a plurality of ultracapacitors for storing and releasing electrical energy.

13. The electrical power supply system of claim 1, wherein in each respective smart battery module the power converter is configured to switchably connect one pole of the battery to one of the terminals for converting the DC voltage into the output voltage.

14. The electrical power supply system of claim 1, wherein in each respective smart battery module the power converter is configured as a non-isolated DC/DC converter, comprising an input end arranged with an input filter stage, wherein the input end is connected to the poles of the battery and the power converter comprises a semiconductor stage configured to switchably connect the input filter stage to one of the terminals.

15. The electrical power supply system of claim 14, wherein in each respective smart battery module the input filter stage comprises an inductor connected to one pole of the battery, wherein the semiconductor stage is arranged to switchably connect the inductor to one of the terminals.

16. An electrical power supply system for an electric or hybrid aircraft comprising:

a plurality of smart battery modules, wherein the plurality of smart battery modules is configured to provide an output voltage;

wherein each of the smart battery modules comprises:

terminals for outputting a local output voltage;

a battery configured to supply a DC voltage between two poles;

a power converter, comprising a semiconductor stage, electrically connected to the terminals and the poles, wherein the power converter is configured to convert the DC voltage from the battery into the local output voltage at the terminals, and a controller operably coupled to the semiconductor stage and configured to control the semiconductor stage for regulating voltage conversion of the DC voltage into the local output voltage; and a control unit operably coupled to the controller of each smart battery module and configured to set the local output voltage or a local current setpoint or limit for each controller individually or configured to set an output voltage or a current setpoint or limit for all controllers collectively, wherein the control unit is configured to carry out real-time monitoring of a state of each of the smart battery modules in the plurality of smart battery modules and to operate each of the smart battery modules to output a local voltage which is proportional to an energy available in that smart battery module.

17. The electrical power supply system of claim 16, wherein the output voltage corresponds to a sum of output voltages outputted by each smart battery module.

18. The electrical power supply system of claim 16, comprising an inductance connected in series with the plurality of smart battery modules.

19. The electrical power supply system of claim 18, wherein the inductance is provided as a conductor or cable of which a given parasitic inductance and resistance are used to establish a required impedance.

20. The electrical power supply system of claim 16, wherein the plurality of smart battery modules comprises a first set and the electrical power supply system comprises a plurality of sets of smart battery modules, wherein the plurality of sets are connected in parallel, wherein the parallel connected sets of smart battery modules are configured to supply a common output current corresponding to a sum of output currents outputted by each set of smart battery modules.

21. The electrical power supply system of claim 20, comprising a plurality of inductances, wherein at least one inductance is connected in series with a corresponding set of smart battery modules.

22. The electrical power supply system of claim 16, wherein the control unit is configured to set the output voltage and/or current setpoint or limit to a predetermined fixed value, or the control unit is configured to vary the output voltage and/or current setpoint or limit or setpoints in dependency of a control value provided by a control instance external to the electrical power supply system.

23. The electrical power supply system of claim 16, wherein the control unit is configured to provide a synchronisation signal to the controllers of the smart battery modules for synchronising timing of consecutive switching cycles of the smart battery modules, and/or the control unit is configured to provide a timing setpoint to the controllers of the smart battery modules for varying the timing of each switching cycle with reference to the timing synchronised.

24. The electrical power supply system of claim 16, wherein a control value of the output voltage setpoint and/or current provided by a control instance external to the electrical power supply system is a time-invariant control value.

25. The electrical power supply system of claim 24, wherein the output voltage is a DC voltage with a residual periodic variation of the DC voltage for supplying a DC load external to the electrical power supply system.

26. The electrical power supply system of claim 24, wherein a control value of the output voltage and/or current setpoint provided by a control instance external to the electrical power supply system is a time-variant control value.

27. The electrical power supply system of claim 26, wherein the output voltage is an AC voltage for supplying an AC load external to the electrical power supply system.

28. The electrical power supply system of claim 16, wherein the battery of each respective smart battery module comprises a plurality of battery cells and/or a plurality of ultracapacitors for storing and releasing electrical energy.

29. The electrical power supply system of claim 16, wherein in each respective smart battery module the power converter is configured to switchably connect one pole of the battery to one of the terminals for converting the DC voltage into the output voltage.

30. The electrical power supply system of claim 16, wherein in each respective smart battery module the power converter is configured as a non-isolated DC/DC converter, comprising an input end arranged with an input filter stage, wherein the input end is connected to the poles of the battery and the power converter comprises a semiconductor stage configured to switchably connect the input filter stage to one of the terminals.

31. An electrical power supply system for an electric or hybrid aircraft comprising:

a plurality of smart battery modules connected in series, wherein the plurality of smart battery modules is configured to provide an output voltage;

wherein each of the smart battery modules comprises:

terminals for outputting a local output voltage;

a battery configured to supply a DC voltage between two poles;

a power converter, comprising a semiconductor stage, electrically connected to the terminals and the poles, wherein the power converter is configured to convert the DC voltage from the battery into the local output voltage at the terminals;

a controller operably coupled to the semiconductor stage and configured to:

control the semiconductor stage for regulating voltage conversion of the DC voltage into the local output voltage;

a control unit operably coupled to the controller of each smart battery module and configured to control the local output voltage or a local current setpoint or limit for each controller individually or configured to control the output voltage or a current setpoint or limit for all controllers collectively; and each of the respective controllers of the smart battery modules being configured to carry out real-time monitoring of a state of its respective smart battery module in the plurality of smart battery modules and to operate its respective smart battery module to output a voltage which is proportional to energy available in said smart battery module, or wherein the control unit is configured to carry out real-time monitoring of the state of each of the smart battery modules and to operate each of the smart battery modules to output a voltage which is proportional to the energy available in the respective smart battery modules.

* * * * *